(12) United States Patent
Khoshnevisan et al.

(10) Patent No.: US 12,041,613 B2
(45) Date of Patent: Jul. 16, 2024

(54) TECHNIQUES FOR CONTROL CHANNEL REPETITION FOR CROSS-CARRIER SCHEDULING

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 17/582,473

(22) Filed: Jan. 24, 2022

(65) Prior Publication Data
US 2022/0304030 A1  Sep. 22, 2022

Related U.S. Application Data

(60) Provisional application No. 63/163,522, filed on Mar. 19, 2021.

(51) Int. Cl.
*H04W 72/20* (2023.01)
*H04L 1/08* (2006.01)
*H04L 5/00* (2006.01)

(52) U.S. Cl.
CPC .............. *H04W 72/20* (2023.01); *H04L 1/08* (2013.01); *H04L 5/001* (2013.01)

(58) Field of Classification Search
CPC ........... H04W 72/20; H04L 1/08; H04L 5/001

USPC ........................................................ 370/329
See application file for complete search history.

(56) References Cited

U.S. PATENT DOCUMENTS

2021/0045147 A1 * 2/2021 Zhou ................. H04W 52/0235

OTHER PUBLICATIONS

R1-2005621 (Year: 2020).*
International Search Report and Written Opinion—PCT/US2022/013620—ISA/EPO—May 6, 2022.
(Continued)

*Primary Examiner* — Intekhaab A Siddiquee
(74) *Attorney, Agent, or Firm* — Holland & Hart LLP

(57) ABSTRACT

Methods, systems, and devices for wireless communications are described. A user equipment (UE) may receive control signaling identifying a scheduling configuration indicating a first search space set and a second search space set of a scheduling component carrier for scheduling communications on a scheduled component carrier, and may identify a search space set linking configuration for a group of search space sets of the scheduled component carrier based on the scheduling configuration. The UE may identify a set of decoding candidates within the first and second search space sets which are allocated for cross-carrier scheduling of the scheduled component carrier based on the search space set linking configuration. The UE may then receive at least one control message schedules a communication between the base station and the UE over the scheduled component carrier within at least one decoding candidate, and may perform the scheduled communication over the scheduled component carrier.

86 Claims, 20 Drawing Sheets

(56) References Cited

OTHER PUBLICATIONS

Mediatek Inc: "Enhancements on Multi-TRP for PDCCH, PUSCH AND PUCCH", 3GPP Draft, R1-2005621, 3GPP TSG RAN WG1 #102-e, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020 (Aug. 8, 2020), XP051917597, 5 Pages, Retrieved from the Internet: URL: https://ftp.3gpp.org/tsg_ran/WG1_RL1/TSGR1_102-e/Docs/R1-2005621.zip R1-2005621 Multi-TRP operation.docx [retrieved on Aug. 8, 2020] the whole document.

* cited by examiner

TECHNIQUES FOR CONTROL CHANNEL REPETITION FOR CROSS-CARRIER SCHEDULING

CROSS REFERENCE

The present Application for Patent claims the benefit of U.S. Provisional Patent Application No. 63/163,522 by KHOSHNEVISAN et al., entitled "TECHNIQUES FOR CONTROL CHANNEL REPETITION FOR CROSS-CARRIER SCHEDULING," filed Mar. 19, 2021, assigned to the assignee hereof, and expressly incorporated by reference herein.

FIELD OF TECHNOLOGY

The following relates to wireless communications, including techniques for control channel repetition for cross-carrier scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may enable communications within a component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). In some cases, search space sets on a scheduling component carrier may be linked together for control channel repetition to improve transmission diversity and reliability of wireless communications. However, some wireless communications exhibit limitations on the ability of a scheduled component carrier to be scheduled via control channel repetition performed on a scheduling component carrier.

SUMMARY

The described techniques relate to improved methods, systems, devices, and apparatuses that support techniques for control channel repetition for cross-carrier scheduling. Generally, the aspects of the present disclosure provide techniques for cross-carrier scheduling using control channel repetition. In particular, aspects of the present disclosure provide techniques and configurations which enable multiple search space sets on a scheduled component carrier to be linked for control channel repetition to multiple search space sets on a scheduling component carrier to provide for cross-carrier scheduling. As such, techniques described herein enable communications to be scheduled on a scheduled component carrier via control channel repetition across search space sets of a scheduling component carrier.

A method for wireless communication at a user equipment (UE) is described. The method may include receiving, from a base station, control signaling identifying a scheduling configuration indicating a first search space set and a second search space set of a scheduling component carrier for scheduling communications on a scheduled component carrier that is different from the scheduling component carrier, identifying a search space set linking configuration for a set of multiple search space sets of the scheduled component carrier based on the scheduling configuration, identifying, based on the search space set linking configuration, a set of decoding candidates within the first search space set and the second search space set of the scheduling component carrier which are allocated for cross-carrier scheduling of the scheduled component carrier, receiving, from the base station and within at least one decoding candidate of the set of decoding candidates, at least one control message via the scheduling component carrier that schedules a communication between the base station and the UE via the scheduled component carrier, and transmitting or receiving the communication with the base station via the scheduled component carrier based on the at least one control message.

An apparatus for wireless communication at a UE is described. The apparatus may include a processor, memory coupled with the processor, and instructions stored in the memory. The instructions may be executable by the processor to cause the apparatus to receive, from a base station, control signaling identifying a scheduling configuration indicating a first search space set and a second search space set of a scheduling component carrier for scheduling communications on a scheduled component carrier that is different from the scheduling component carrier, identify a search space set linking configuration for a set of multiple search space sets of the scheduled component carrier based on the scheduling configuration, identify, based on the search space set linking configuration, a set of decoding candidates within the first search space set and the second search space set of the scheduling component carrier which are allocated for cross-carrier scheduling of the scheduled component carrier, receive, from the base station and within at least one decoding candidate of the set of decoding candidates, at least one control message via the scheduling component carrier that schedules a communication between the base station and the UE via the scheduled component carrier, and transmit or receive the communication with the base station via the scheduled component carrier based on the at least one control message.

Another apparatus for wireless communication at a UE is described. The apparatus may include means for receiving, from a base station, control signaling identifying a scheduling configuration indicating a first search space set and a second search space set of a scheduling component carrier for scheduling communications on a scheduled component carrier that is different from the scheduling component carrier, means for identifying a search space set linking configuration for a set of multiple search space sets of the scheduled component carrier based on the scheduling configuration, means for identifying, based on the search space set linking configuration, a set of decoding candidates within the first search space set and the second search space set of the scheduling component carrier which are allocated for cross-carrier scheduling of the scheduled component carrier, means for receiving, from the base station and within at least one decoding candidate of the set of decoding candidates, at least one control message via the scheduling component carrier that schedules a communication between the base station and the UE via the scheduled component carrier, and means for transmitting or receiving the communication with the base station via the scheduled component carrier based on the at least one control message.

A non-transitory computer-readable medium storing code for wireless communication at a UE is described. The code may include instructions executable by a processor to receive, from a base station, control signaling identifying a scheduling configuration indicating a first search space set and a second search space set of a scheduling component carrier for scheduling communications on a scheduled component carrier that is different from the scheduling component carrier, identify a search space set linking configuration for a set of multiple search space sets of the scheduled component carrier based on the scheduling configuration, identify, based on the search space set linking configuration, a set of decoding candidates within the first search space set and the second search space set of the scheduling component carrier which are allocated for cross-carrier scheduling of the scheduled component carrier, receive, from the base station and within at least one decoding candidate of the set of decoding candidates, at least one control message via the scheduling component carrier that schedules a communication between the base station and the UE via the scheduled component carrier, and transmit or receive the communication with the base station via the scheduled component carrier based on the at least one control message.

In some examples of the method, apparatuses, and non-transitory computer-readable medium described herein, identifying the search space set linking configuration may include operations, features, means, or instructions for receiving, from the base station, additional control signaling indicating the search space set linking configuration.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the scheduling configuration indicating that the first search space set and the second search space set of the scheduling component carrier may be linked for control channel repetition.

Some examples of the method, apparatuses, and non-transitory computer-readable medium described herein may further include operations, features, means, or instructions for monitoring a first decoding candidate within the first search space set for a repetition of the control message and a second decoding candidate, that may be linked to the first decoding candidate, within the second search space set for a repetition of the control message based on the at least two search space sets being linked for control channel repetition.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the at least two search space sets being associated with first and second search space set indexes that may be respectively the same as first and second search space set indexes of the first and second search space sets of the scheduling component carrier.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the at least two search space sets being configured with a same quantity of decoding candidates per aggregation level.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition, and identifying that the at least two search space sets are configured with a same quantity of decoding candidates per aggregation level based on the at least two search space sets being linked for control channel repetition In some examples of the method, apparatuses, and non-transitory computer-readable medium described herein, the at least one decoding candidate of the set of decoding candidates includes a pair of decoding candidates and the method, apparatuses, and non-transitory computer-readable medium may include further operations, features, means, or instructions for identifying that the pair of decoding candidates may be linked for control channel repetition based on the pair of the decoding candidates corresponding to a same carrier indicator field (CIF), a same candidate index, and a same aggregation level.

Some examples of the method, apparatuses, and non-transitory computer-readable medium described herein may further include operations, features, means, or instructions for identifying that a third set of monitoring occasions within the first search space set of the scheduling component carrier and a fourth set of monitoring occasions within the second search space set of the scheduling component carrier may be unlinked for control channel repetition for intra-carrier scheduling.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be unlinked for control channel repetition.

Some examples of the method, apparatuses, and non-transitory computer-readable medium described herein may further include operations, features, means, or instructions for monitoring a first decoding candidate of the first search space set for the control message and a second decoding candidate of the second search space set for a second control message that differs from the control message based on identifying that the at least two search space sets of the set of multiple search space sets of the scheduled component carrier may be unlinked for control channel repetition.

Some examples of the method, apparatuses, and non-transitory computer-readable medium described herein may further include operations, features, means, or instructions for identifying, based on the search space set linking configuration, that a first decoding candidate of the first search space set may be unlinked for control channel repetition to a second decoding candidate of the second search space set for cross-carrier scheduling on the scheduled component carrier.

Some examples of the method, apparatuses, and non-transitory computer-readable medium described herein may further include operations, features, means, or instructions for identifying, based on the search space set linking configuration, that a third decoding candidate of the first search space set may be linked for control channel repetition to a fourth decoding candidate of the second search space set for intra-carrier scheduling on the scheduling component carrier.

Some examples of the method, apparatuses, and non-transitory computer-readable medium described herein may further include operations, features, means, or instructions for receiving the control signaling that indicates a first set of one or more monitoring occasions for the first search space set and a second set of one or more monitoring occasions for the second search space set.

In some examples of the method, apparatuses, and non-transitory computer-readable medium described herein, receiving the control signaling identifying the scheduling configuration may include operations, features, means, or instructions for receiving the control signaling indicating a first search space set index associated with the first search space set of the scheduling component carrier and a second search space set index associated with the second search space set of the scheduling component carrier.

In some examples of the method, apparatuses, and non-transitory computer-readable medium described herein, a third search space set and a fourth search space set of the set of multiple search space sets of the scheduled component carrier may be associated with the first search space set index and the second search space set index, respectively, and the search space set linking configuration indicates that the third search space set and the fourth search space set may be linked or unlinked for control channel repetition based on the first search space set and the second search space set being linked for control channel repetition.

In some examples of the method, apparatuses, and non-transitory computer-readable medium described herein, receiving the control signaling identifying the scheduling configuration may include operations, features, means, or instructions for receiving the control signaling indicating that at least two search space sets of the set of multiple search space sets of the scheduled component carrier may be configured within a first bandwidth part (BWP) of the scheduled component carrier and that the first search space set and the second search space set of the scheduling component carrier may be configured within a second BWP of the scheduling component carrier.

Some examples of the method, apparatuses, and non-transitory computer-readable medium described herein may further include operations, features, means, or instructions for receiving additional control signaling indicating that a first BWP associated with the first search space set and the second search space set of the scheduling component carrier may be active and that a second BWP associated with the set of multiple search space sets of the scheduled component carrier may be active and monitoring a first decoding candidate of the first search space set and a second decoding candidate of the second search space set for one or more repetitions of the control message based on the first BWP and the second BWP being active.

Some examples of the method, apparatuses, and non-transitory computer-readable medium described herein may further include operations, features, means, or instructions for monitoring a first decoding candidate of the first search space set for a second control message and a second decoding candidate of the second search space set for a repetition of the second control message based on the first search space set being linked for control channel repetition to the second search space set for intra-carrier scheduling on the scheduling component carrier, where the second control message schedules a second communication between the UE and the base station via the scheduling component carrier.

In some examples of the method, apparatuses, and non-transitory computer-readable medium described herein, where a first decoding candidate of the first search space set and a second decoding candidate of the second search space set may be associated with a first CIF value that corresponds to the scheduling component carrier and where a third decoding candidate of the first search space set and a fourth decoding candidate of the second search space set may be associated with a second CIF value different from the first CIF value that corresponds to the scheduled component carrier.

Some examples of the method, apparatuses, and non-transitory computer-readable medium described herein may further include operations, features, means, or instructions for receiving, from the base station, additional control signaling indicating a set of multiple component carriers including the scheduled component carrier which may be configured for cross-carrier scheduling via control channel repetition and identifying, based on the indication of the set of multiple component carriers, that a first decoding candidate of the first search space set may be linked for control channel repetition to a second decoding candidate of the second search space set for cross-carrier scheduling on the scheduled component carrier.

Some examples of the method, apparatuses, and non-transitory computer-readable medium described herein may further include operations, features, means, or instructions for receiving, from the base station, additional control signaling indicating a set of multiple component carriers including the scheduled component carrier which may be configured for cross-carrier scheduling via control channel repetition on the scheduling component carrier and identifying, based on the indication of the set of multiple component carriers, that a first decoding candidate of the first search space set may be linked for control channel repetition to a second decoding candidate of the second search space set for cross-carrier scheduling on the scheduled component carrier.

In some examples of the method, apparatuses, and non-transitory computer-readable medium described herein, where the set of multiple search space sets of the scheduled component carrier include a third search space set and a fourth search space set, where the first search space set of the scheduling component carrier and the third search space set of the scheduled component carrier may be associated with a first search space set index, and where the second search space set of the scheduling component carrier and the fourth search space set of the scheduled component carrier may be associated with a second search space set index different from the first search space set index.

A method for wireless communication at a base station is described. The method may include transmitting, to a UE, control signaling identifying a scheduling configuration indicating a first search space set and a second search space set of a scheduling component carrier for scheduling communications on a scheduled component carrier that is different from the scheduling component carrier, identifying a search space set linking configuration for a set of multiple search space sets of the scheduled component carrier based on the scheduling configuration, identifying, based on the search space set linking configuration, a set of decoding candidates within the first search space set and the second search space set of the scheduling component carrier which are allocated for cross-carrier scheduling of the scheduled component carrier, transmitting, to the UE and within at least one decoding candidate of the set of decoding candidates, at least one control message via the scheduling component carrier that schedules a communication between the base station and the UE via the scheduled component carrier, and transmitting or receiving the communication with the UE via the scheduled component carrier based on the at least one control message.

An apparatus for wireless communication at a base station is described. The apparatus may include a processor, memory coupled with the processor, and instructions stored in the memory. The instructions may be executable by the processor to cause the apparatus to transmit, to a UE, control signaling identifying a scheduling configuration indicating a first search space set and a second search space set of a scheduling component carrier for scheduling communications on a scheduled component carrier that is different from the scheduling component carrier, identify a search space set linking configuration for a set of multiple search space sets of the scheduled component carrier based on the scheduling configuration, identify, based on the search space set linking configuration, a set of decoding candidates within the first search space set and the second search space set of the scheduling component carrier which are allocated for cross-carrier scheduling of the scheduled component carrier, transmit, to the UE and within at least one decoding candidate of the set of decoding candidates, at least one control message via the scheduling component carrier that schedules a communication between the base station and the UE via the scheduled component carrier, and transmit or receive the communication with the UE via the scheduled component carrier based on the at least one control message.

Another apparatus for wireless communication at a base station is described. The apparatus may include means for transmitting, to a UE, control signaling identifying a scheduling configuration indicating a first search space set and a second search space set of a scheduling component carrier for scheduling communications on a scheduled component carrier that is different from the scheduling component carrier, means for identifying a search space set linking configuration for a set of multiple search space sets of the scheduled component carrier based on the scheduling configuration, means for identifying, based on the search space set linking configuration, a set of decoding candidates within the first search space set and the second search space set of the scheduling component carrier which are allocated for cross-carrier scheduling of the scheduled component carrier, means for transmitting, to the UE and within at least one decoding candidate of the set of decoding candidates, at least one control message via the scheduling component carrier that schedules a communication between the base station and the UE via the scheduled component carrier, and means for transmitting or receiving the communication with the UE via the scheduled component carrier based on the at least one control message.

A non-transitory computer-readable medium storing code for wireless communication at a base station is described. The code may include instructions executable by a processor to transmit, to a UE, control signaling identifying a scheduling configuration indicating a first search space set and a second search space set of a scheduling component carrier for scheduling communications on a scheduled component carrier that is different from the scheduling component carrier, identify a search space set linking configuration for a set of multiple search space sets of the scheduled component carrier based on the scheduling configuration, identify, based on the search space set linking configuration, a set of decoding candidates within the first search space set and the second search space set of the scheduling component carrier which are allocated for cross-carrier scheduling of the scheduled component carrier, transmit, to the UE and within at least one decoding candidate of the set of decoding candidates, at least one control message via the scheduling component carrier that schedules a communication between the base station and the UE via the scheduled component carrier, and transmit or receive the communication with the UE via the scheduled component carrier based on the at least one control message.

In some examples of the method, apparatuses, and non-transitory computer-readable medium described herein, identifying the search space set linking configuration may include operations, features, means, or instructions for transmitting, to the UE, additional control signaling indicating the search space set linking configuration.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the scheduling configuration indicating that the first search space set and the second search space set of the scheduling component carrier may be linked for control channel repetition.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the at least two search space sets being associated with first and second search space set indexes that may be respectively the same as first and second search space set indexes of the first and second search space sets of the scheduling component carrier.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on the at least two search space sets being configured with a same quantity of decoding candidates per aggregation level.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition, and identifying that the at least two search space sets are configured with a same quantity of decoding candidates per aggregation level based on the at least two search space sets being linked for control channel repetition In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be linked for control channel repetition based on each pair of decoding candidates across the first and second search space sets for two measurement monitoring occasions being linked for control channel repetition, each pair of the decoding candidates being linked for control channel repetition corresponding to a same CIF, a same candidate index, and a same aggregation level.

Some examples of the method, apparatuses, and non-transitory computer-readable medium described herein may further include operations, features, means, or instructions for identifying that a third set of monitoring occasions within the first search space set of the scheduling component carrier and a fourth set of monitoring occasions within the second search space set of the scheduling component carrier may be unlinked for control channel repetition for intra-carrier scheduling.

In some examples of the method, apparatuses, and non-transitory computer-readable medium described herein, identifying the search space set linking configuration may include operations, features, means, or instructions for identifying that at least two search space sets of the set of multiple search space sets of the scheduled component carrier may be unlinked for control channel repetition.

Some examples of the method, apparatuses, and non-transitory computer-readable medium described herein may further include operations, features, means, or instructions for identifying, based on the search space set linking configuration, that a first decoding candidate of the first search space set may be unlinked for control channel repetition to a second decoding candidate of the second search space set for cross-carrier scheduling on the scheduled component carrier.

Some examples of the method, apparatuses, and non-transitory computer-readable medium described herein may further include operations, features, means, or instructions for identifying, based on the search space set linking configuration, that a third decoding candidate of the first search space set may be linked for control channel repetition to a fourth decoding candidate of the second search space set for intra-carrier scheduling on the scheduling component carrier.

Some examples of the method, apparatuses, and non-transitory computer-readable medium described herein may further include operations, features, means, or instructions for transmitting the control signaling that indicates a first set of one or more monitoring occasions for the first search space set and a second set of one or more monitoring occasions for the second search space set.

In some examples of the method, apparatuses, and non-transitory computer-readable medium described herein, transmitting the control signaling identifying the scheduling configuration may include operations, features, means, or instructions for transmitting the control signaling indicating a first search space set index associated with the first search space set of the scheduling component carrier and a second search space set index associated with the second search space set of the scheduling component carrier.

In some examples of the method, apparatuses, and non-transitory computer-readable medium described herein, a third search space set and a fourth search space set of the set of multiple search space sets of the scheduled component carrier may be associated with the first search space set index and the second search space set index, respectively, and the search space set linking configuration indicates that the third search space set and the fourth search space set may be linked or unlinked for control channel repetition based on the first search space set and the second search space set being linked for control channel repetition.

In some examples of the method, apparatuses, and non-transitory computer-readable medium described herein, transmitting the control signaling identifying the scheduling configuration may include operations, features, means, or instructions for transmitting the control signaling indicating that at least two search space sets of the set of multiple search space sets of the scheduled component carrier may be configured within a first BWP of the scheduled component carrier and that the first search space set and the second search space set of the scheduling component carrier may be configured within a second BWP of the scheduling component carrier.

Some examples of the method, apparatuses, and non-transitory computer-readable medium described herein may further include operations, features, means, or instructions for transmitting additional control signaling indicating that a first BWP associated with the first search space set and the second search space set of the scheduling component carrier may be active and that a second BWP associated with the set of multiple search space sets of the scheduled component carrier may be active, where transmitting the at least one control message may be based on the first BWP and the second BWP being active.

In some examples of the method, apparatuses, and non-transitory computer-readable medium described herein, where a first decoding candidate of the first search space set and a second decoding candidate of the second search space set may be associated with a first CIF value that corresponds to the scheduling component carrier and where a third decoding candidate of the first search space set and a fourth decoding candidate of the second search space set may be associated with a second CIF value different from the first CIF value that corresponds to the scheduled component carrier.

Some examples of the method, apparatuses, and non-transitory computer-readable medium described herein may further include operations, features, means, or instructions for transmitting, to the UE, additional control signaling indicating a set of multiple component carriers including the scheduled component carrier which may be configured for cross-carrier scheduling via control channel repetition and identifying, based on the indication of the set of multiple component carriers, that a first decoding candidate of the first search space set may be linked for control channel repetition to a second decoding candidate of the second search space set for cross-carrier scheduling on the scheduled component carrier.

Some examples of the method, apparatuses, and non-transitory computer-readable medium described herein may further include operations, features, means, or instructions for transmitting, to the UE, additional control signaling indicating a set of multiple component carriers including the scheduled component carrier which may be configured for cross-carrier scheduling via control channel repetition on the scheduling component carrier and identifying, based on the indication of the set of multiple component carriers, that a first decoding candidate of the first search space set may be linked for control channel repetition to a second decoding candidate of the second search space set for cross-carrier scheduling on the scheduled component carrier.

In some examples of the method, apparatuses, and non-transitory computer-readable medium described herein, where the set of multiple search space sets of the scheduled component carrier include a third search space set and a fourth search space set, where the first search space set of the scheduling component carrier and the third search space set of the scheduled component carrier may be associated with a first search space set index, and where the second search space set of the scheduling component carrier and the fourth search space set of the scheduled component carrier may be associated with a second search space set index different from the first search space set index.

DETAILED DESCRIPTION

Figure 1:
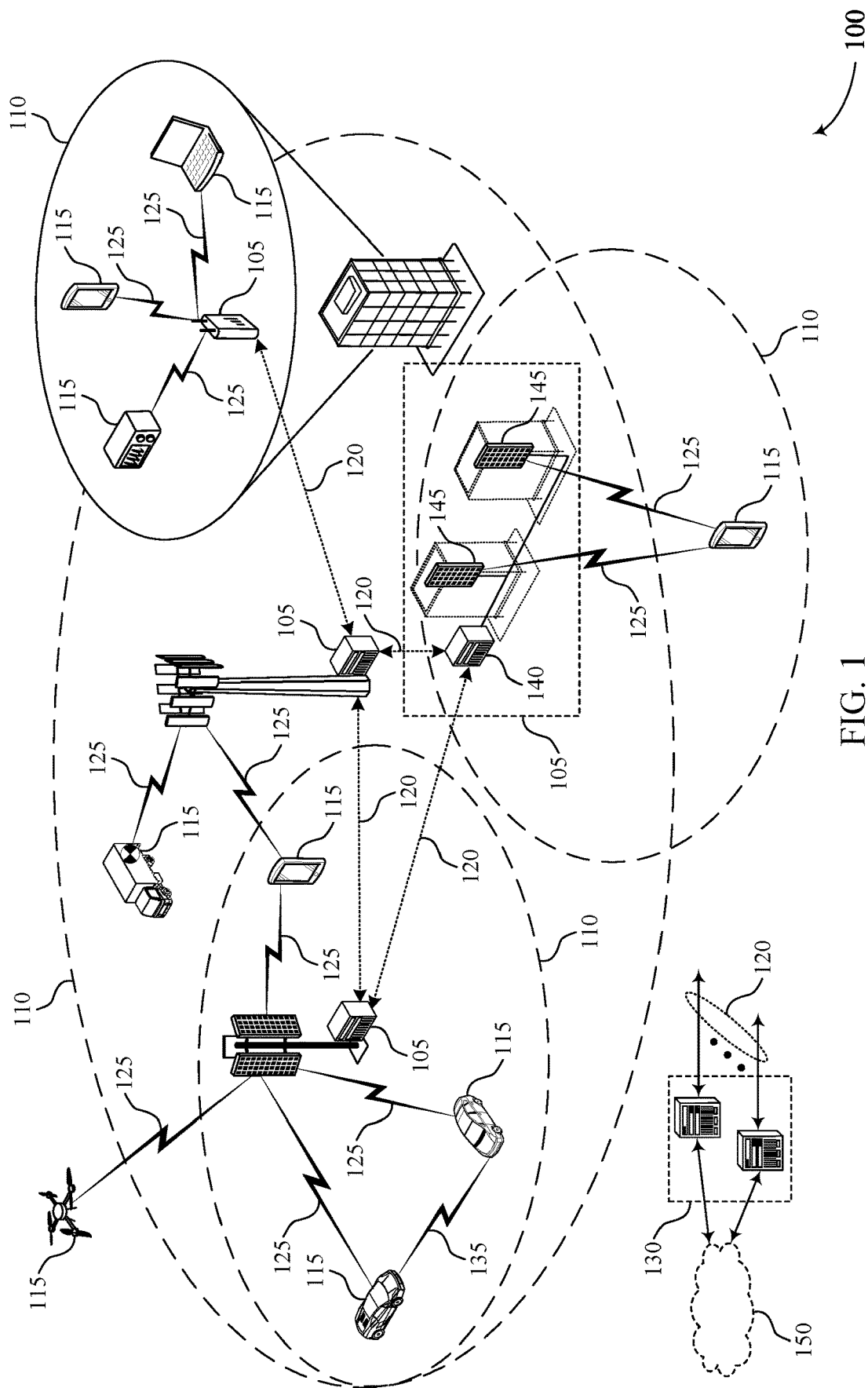
FIG. 1 illustrates an example of a wireless communications system that supports techniques for control channel repetition for cross-carrier scheduling in accordance with aspects of the present disclosure.

Some wireless communications systems may enable communications within a component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). A carrier indicator field (CIF) within control signaling (e.g., downlink control information (DCI) messages) may indicate whether the control signaling schedules communications within the same component carrier or a different component carrier. In some cases, a "scheduled component carrier" which is scheduled via control signaling on a "scheduling component carrier" may not be configured with control resource sets (CORESETs), and may only be configured with search space sets. Moreover, in some implementations, search space sets on a scheduling component carrier may be linked together for control channel repetition to improve transmission diversity and reliability of wireless communications. However, in such cases, some wireless communications systems do not provide techniques or configurations which enable cross-carrier scheduling via control channel repetition on linked search space sets of a scheduling component carrier. That is, some wireless communications systems do not enable communications to be scheduled on a scheduled component carrier via repetitions of control messages on linked search space sets of a scheduling component carrier.

Accordingly, aspects of the present disclosure provide techniques for cross-carrier scheduling using control channel repetition (e.g., physical downlink control channel (PDCCH) repetition). More specifically, aspects of the present disclosure provide techniques and configurations which enable multiple search space sets on a scheduled component carrier to be linked for control channel repetition to multiple search space sets on a scheduling component carrier to provide for cross-carrier scheduling. As such, techniques described herein enable communications to be scheduled on a scheduled component carrier via control channel repetition across search space sets of a scheduling component carrier.

For example, a UE may receive a scheduling configuration for cross-carrier scheduling of a scheduled component carrier via control signaling on a scheduling component carrier. The UE may also receive a search space set linking configuration indicating decoding candidates of search space sets of the scheduling component carrier which may be used to schedule communications within search space sets on the scheduled component carrier. In some aspects, decoding candidates in different search spaces which are "linked" for control channel repetition may be used for communicating multiple repetitions of the same control message (e.g., for cross-carrier or intra-carrier scheduling). The UE may attempt to decode signals received within each of the PDCCH candidates of a search space set to determine if a cyclic redundancy check (CRC) passes for any of the candidates. Subsequently, the UE may receive one or more control messages within the decoding candidates of the scheduling component carrier which schedule communications on the scheduled component carrier, and may perform the scheduled communication over the scheduled component carrier. A UE that successfully decodes at least one of the linked decoding candidates receives at least one repetition of a control message for cross-carrier or intra-carrier scheduling.

In some aspects, the decoding candidates within different search space sets on the scheduling component carrier are used for cross-carrier scheduling of the scheduled component carrier. The search space sets on the scheduling component carrier may include decoding candidates for intra-carrier scheduling and inter-carrier (e.g., cross-carrier) scheduling. In some cases, decoding candidates on the search space sets of the scheduling component carrier may be linked for control channel repetition for both cross-carrier scheduling and intra-carrier scheduling. In other cases, decoding candidates on the search space sets of the scheduling component carrier may be linked for control channel repetition for only intra-carrier scheduling, or for only cross-carrier scheduling. In some implementations, the UE may determine which decoding candidates are linked for control channel repetition based on control signaling from the base station or the standard may define linking/unlinking of decoding candidates for cross carrier scheduling within different search space sets based on whether search space sets of the configured scheduling component carrier are indicated to be linked/unlinked for control channel repetition.

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for control channel repetition for cross-carrier scheduling.

FIG. 1 illustrates an example of a wireless communications system 100 that supports techniques for control channel repetition for cross-carrier scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured with up to three CORESETS within a given BWP of a serving cell (e.g., within a given BWP of a component carrier). In some cases (e.g., Release 16), a UE 115 may be configured with up to five CORESETs in a BWP of a serving cell. A CORESET may be associated with one or more transmission configuration indicator (TCI) states for PDCCH repetition, and may be associated with a quantity of resource blocks (RBs) in the frequency domain, and a quantity of symbols or other TTI in the time domain (e.g., quantity of OFDM symbols). Moreover, each CORESET may be associated with one active TCI state. In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with one CORESET, and may include a set of monitoring occasions. In some aspects, a search space set may include a set of control channel monitoring occasions. For example, a search space set may include a set of monitoring occasions, with a monitoring occasion occurring at regular or irregular periodicities (e.g., monitoring occasion every 10 ms). The UE 115 may be configured to blindly decode signals received in the respective monitoring occasions to determine whether CRC passes in the respective monitoring occasions. Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105 (e.g., via RRC signaling), or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s < k_s$), or any combination thereof. A UE 115 of the wireless communications system 100 may determine a number/quantity of PDCCH monitoring occasions (e.g., PDCCH candidates) within a slot $\eta_{s,f}^\mu$ and a frame $\eta_f$ if $\eta_f \cdot N_{slot}^{frame,\mu} + \eta_{s,f}^\mu o_s \mod k_s = 0$. In some aspects, when monitoring a control channel, a UE 115 may be configured to monitor control channel candidates (e.g., PDCCH candidates) for a search space set s for $T_s$ consecutive slots, starting from slot $\eta_{s,f}^\mu$, and may refrain from monitoring control channel candidates for the search space set s for the next $k_s - T_s$ consecutive slots. Quantities of control channel candidates (e.g., PDCCH candidates) may be based on an aggregation level (e.g., number of CCEs) of wireless communications at the UE 115.

These search space set parameters may be configured (e.g., pre-configured) at the UE 115, indicated to the UE 115 via a base station 105 (e.g., via RRC signaling), or both. For example, RRC signaling may be used to configure parameters of a search space set at a UE 115, including with which CORESET the search space set is associated, a periodicity of monitoring occasions of the search space set, an offset of the monitoring occasions, DCI formats to monitor, a number of PDCCH candidates for a given aggregation level of the search space set, and the like.

Each search space set may be associated with a search space set index. In some implementations, PDCCH candidates may be defined as part of the search space set configuration. For example, a search space set include a set of PDCCH candidates, where each PDCCH candidate is associated with a given aggregation level and candidate index. In some aspects, a UE 115 may be configured to monitor PDCCH candidates in configured search space sets. The UE 115 may be configured to blindly decode the PDCCH candidates (e.g., monitoring occasions) within a search space set. In cases where the UE 115 receive a DCI message within a PDCCH candidate, the UE 115 may identify a CRC pass for the UE 115 (e.g., successfully decoding), and the UE 115 may act in accordance with the received DCI message (e.g., perform a communication scheduled by the DCI message).

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol (s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions (e.g., PDCCH candidates) within each slot that the search space set exists. Moreover, the UE 115 may be configured to determine that the three monitoring occasions begin at the second, seventh, and eleventh symbols of each respective slot that the search space set exists.

In some aspects, multiple search space sets and/or multiple PDCCH candidates may be linked together (e.g., associated with one another) for possible repetitions of the same control channel transmission (e.g., repetitions of DCI). PDCCH candidates which are linked together may be used to transmit/receive repetitions of the same control message. In other words, PDCCH candidates may be linked together for "PDCCH repetitions." In the context of PDCCH repetitions, the payload (e.g., DCI payload) received within two PDCCH candidates (e.g., two PDCCH repetitions) may be the same. For example, a first PDCCH candidate may be related to, or linked with, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally, or alternatively, the UE 115 may receive and/or decode both the first and second repetitions of DCI by performing soft-combining of the first and second repetitions of DCI, and the UE may be aware of the linking before decoding. In some aspects, related/linked PDCCH candidates may have the same aggregation level (e.g., same number of CCEs).

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

The wireless communications system 100 may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., physical downlink shared channel (PDSCH), physical uplink shared channel (PUSCH)) on a different component carrier (e.g., scheduling component carrier, scheduling cell). Conversely, intra-carrier scheduling, or self-scheduling, refers to cases in which control signaling transmitted/received on a component carrier is used to schedule communications on the same component carrier (e.g., same cell).

In some aspects, a search space set may include control channel candidates (e.g., PDCCH candidates) which are configured for self-scheduling, cross-carrier scheduling, or both. The CCEs associated with control channel candidates for different scheduled component carriers (e.g., PDCCH candidates for self-scheduling, PDCCH candidates for cross-carrier scheduling) within a monitoring occasion of a search space set may be separately identified based on a number of candidates for each aggregation level. The number/quantity of candidates for each aggregation level may be configured in a scheduled component carrier, and may be monitored in the scheduling component carrier. For example, a monitoring occasion for a search space set includes a set of PDCCH candidates with an aggregation level of two (e.g., two CCEs for each PDCCH candidate). In this example, the set of PDCCH candidates may include a first subset of PDCCH candidates configured for self-scheduling (e.g., subset of PDCCH candidates with CIF=0), and a second subset of PDCCH candidates for cross-carrier scheduling (e.g., subset of PDCCH candidates with CIF=1). In this regard, a single search space set may include PDCCH candidates which are configured for self-scheduling, cross-carrier scheduling, or both.

Some wireless communications systems do not provide techniques or configurations which enable cross-carrier scheduling via control channel repetition on linked search space sets of a scheduling component carrier. That is, some wireless communications systems do not enable communications to be scheduled on a scheduled component carrier via repetitions of control messages on linked search space sets of a scheduling component carrier.

Accordingly, the UEs 115 and the base stations 105 of the wireless communications system 100 may support techniques for cross-carrier scheduling using control channel repetition (e.g., PDCCH repetition). More specifically, the wireless communications system 100 may support techniques and configurations which enable multiple search space sets on a scheduled component carrier to be linked for control channel repetition to multiple search space sets on a scheduling component carrier to provide for cross-carrier scheduling. As such, techniques described herein enable communications to be scheduled on a scheduled component carrier via control channel repetition across search space sets of a scheduling component carrier.

For example, a UE 115 of the wireless communications system 100 may receive a scheduling configuration for cross-carrier scheduling of a scheduled component carrier via control signaling on a scheduling component carrier. The UE 115 may also receive a search space set linking configuration indicating decoding candidates of search space sets of the scheduling component carrier which may be used to schedule communications within search space sets on the scheduled component carrier. In some aspects, decoding candidates in different search spaces which are "linked" for control channel repetition may be used for communicating multiple repetitions of the same control message (e.g., for cross-carrier or intra-carrier scheduling). Subsequently, the UE 115 may receive one or more control messages within the decoding candidates of the scheduling component carrier which schedule communications on the scheduled component carrier, and may perform the scheduled communication over the scheduled component carrier.

In some aspects, the decoding candidates within different search space sets on the scheduling component carrier are used for cross-carrier scheduling of the scheduled component carrier. The search space sets on the scheduling component carrier may include decoding candidates for intra-carrier scheduling and inter-carrier (e.g., cross-carrier) scheduling. In some cases, decoding candidates on the search space sets of the scheduling component carrier may be linked for control channel repetition for both cross-carrier scheduling and intra-carrier scheduling. In other cases, decoding candidates on the search space sets of the scheduling component carrier may be linked for control channel repetition for only intra-carrier scheduling, or for only cross-carrier scheduling. In some implementations, the UE 115 may determine which decoding candidates are linked for control channel repetition based on control signaling from the base station 105 or the standard may define linking/unlinking of decoding candidates for cross carrier scheduling within different search space sets based on whether search space sets of the configured scheduling component carrier are indicated to be linked/unlinked for control channel repetition.

Techniques described herein may provide for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 2:
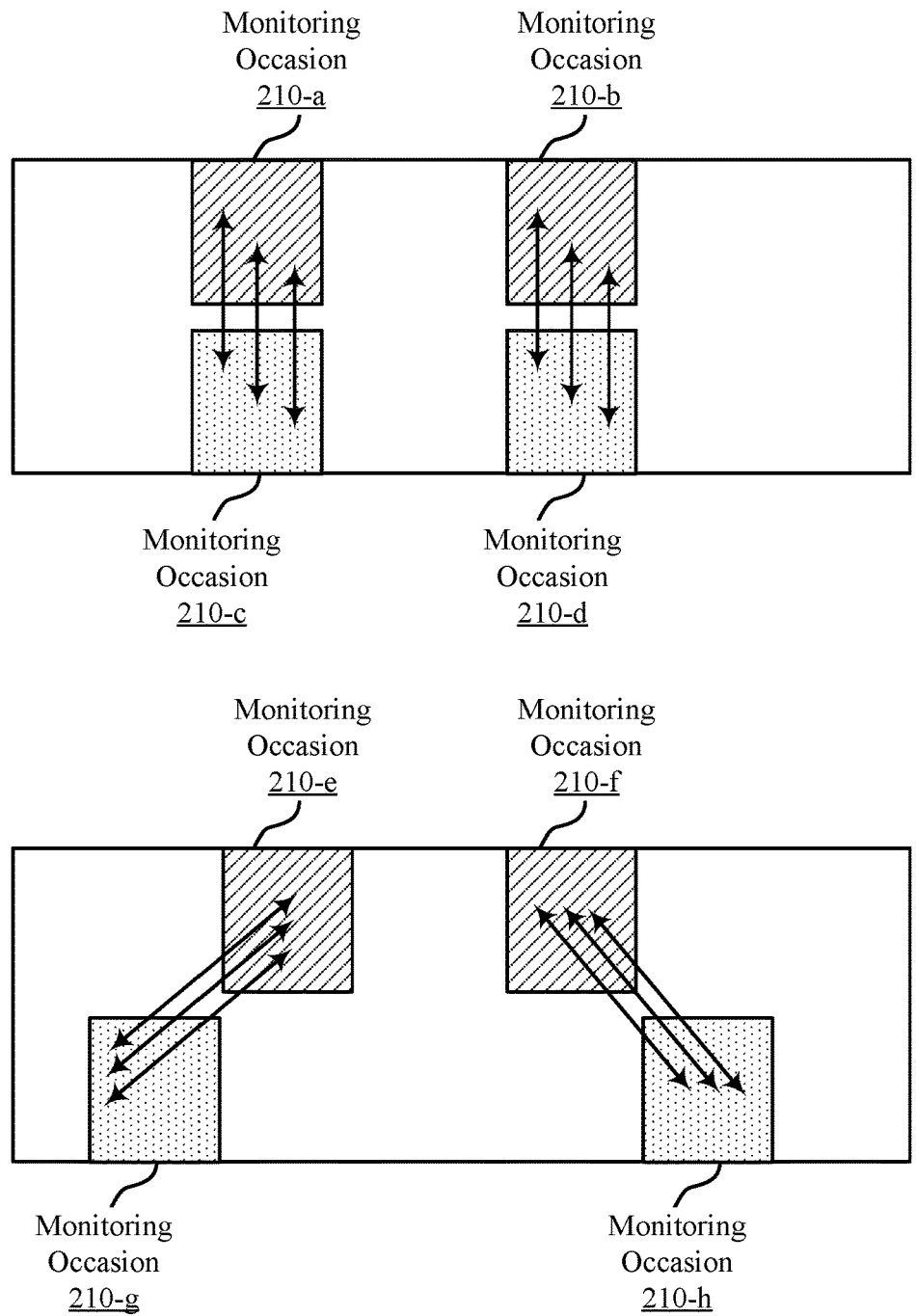
FIG. 2 illustrates an example of a resource configuration that supports techniques for control channel repetition for cross-carrier scheduling in accordance with aspects of the present disclosure.

FIG. 2 illustrates an example of a resource configuration 200 that supports techniques for control channel repetition for cross-carrier scheduling in accordance with aspects of the present disclosure. Aspects of the resource configuration 200 may implement, or be implemented, by wireless communications system 100.

As noted previously herein, multiple search space sets 205 may be linked together for control channel repetition (e.g., PDCCH repetition). For example, as shown in the resource configuration 200, a first search space set 205-a may be linked to a second search space set 205-b. In particular, monitoring occasions 210 associated with the first search space set 205-a (e.g., monitoring occasions 210-a, 210-b, 210-e, 210-f) may be linked with monitoring occasions 210 associated with the second search space set 205-b (e.g., monitoring occasions 210-c, 210-d, 210-g, 210-h). In some aspects, related PDCCH candidates in the respective search space sets 205 (e.g., PDCCH candidates within the monitoring occasions 210 of the respective search space sets 205) which are associated with corresponding CORESETs may be linked together (e.g., related) for PDCCH repetition.

In some cases, two PDCCH candidates with a same candidate index across two related search space sets 205 may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

Associations (e.g., links) between search space sets 205 and/or between PDCCH candidates may be configured (e.g., pre-configured) at the UE 115, signaled to the UE 115 by the base station 105 (e.g., via RRC signaling), or both. For example, a UE 115 may receive an RRC message which indicates that a first PDCCH candidate in the first search space set 205-a is linked with (e.g., related to) a second PDCCH candidate in the second search space set 205-b. By way of another example, a UE 115 may receive an RRC message which indicates that the first search space set 205-a is linked with (e.g., related to) a second search space set 205-b for PDCCH repetition. In this example, PDCCH candidates with the same aggregation level and same candidate index between the first and second search space sets 205 may be linked. In particular, the first search space set 205-a and the second search space set 205-b may include a first set of PDCCH candidates (first set of monitoring occasions 210) and a second set of PDCCH candidates (second set of monitoring occasions 210), respectively, where the first set of PDCCH candidates are linked to the second set of PDCCH candidates.

In some cases, the first and second sets of monitoring occasions 210 may include the same quantity of monitoring occasions/PDCCH candidates (e.g., one-to-one mapping of monitoring occasions). For example, the monitoring occasion 210-a associated with the first search space set 205-a may include the same quantities of PDCCH candidates as the monitoring occasion 210-c associated with the second search space set 205-b. Similarly, the monitoring occasions 210-b, 210-e, and 210-f associated with the first search space set may include the same quantities of PDCCH candidates as the monitoring occasions 210-d, 210-g, and 210-h associated with the second search space set 205-b, respectively. Moreover, the first and second search space sets 205-a, 205-b may be configured with the same quantity of PDCCH candidates for each aggregation level.

In some aspects, the resource configuration 200 may support techniques for control channel repetition (e.g., PDCCH repetition) in the context of cross-carrier scheduling, which may enable search space sets 205 on a scheduled component carrier to be scheduled via signaling transmitted/received on linked search space sets 205 of a scheduling component carrier. In particular, aspects of the resource configuration 200 may support techniques and configurations which enable multiple search space sets 205 on a scheduled component carrier to be linked for control channel repetition to multiple search space sets 205 on a scheduling component carrier to provide for cross-carrier scheduling, as will be described in further detail herein with respect to FIGS. 4-8.

Figure 3:
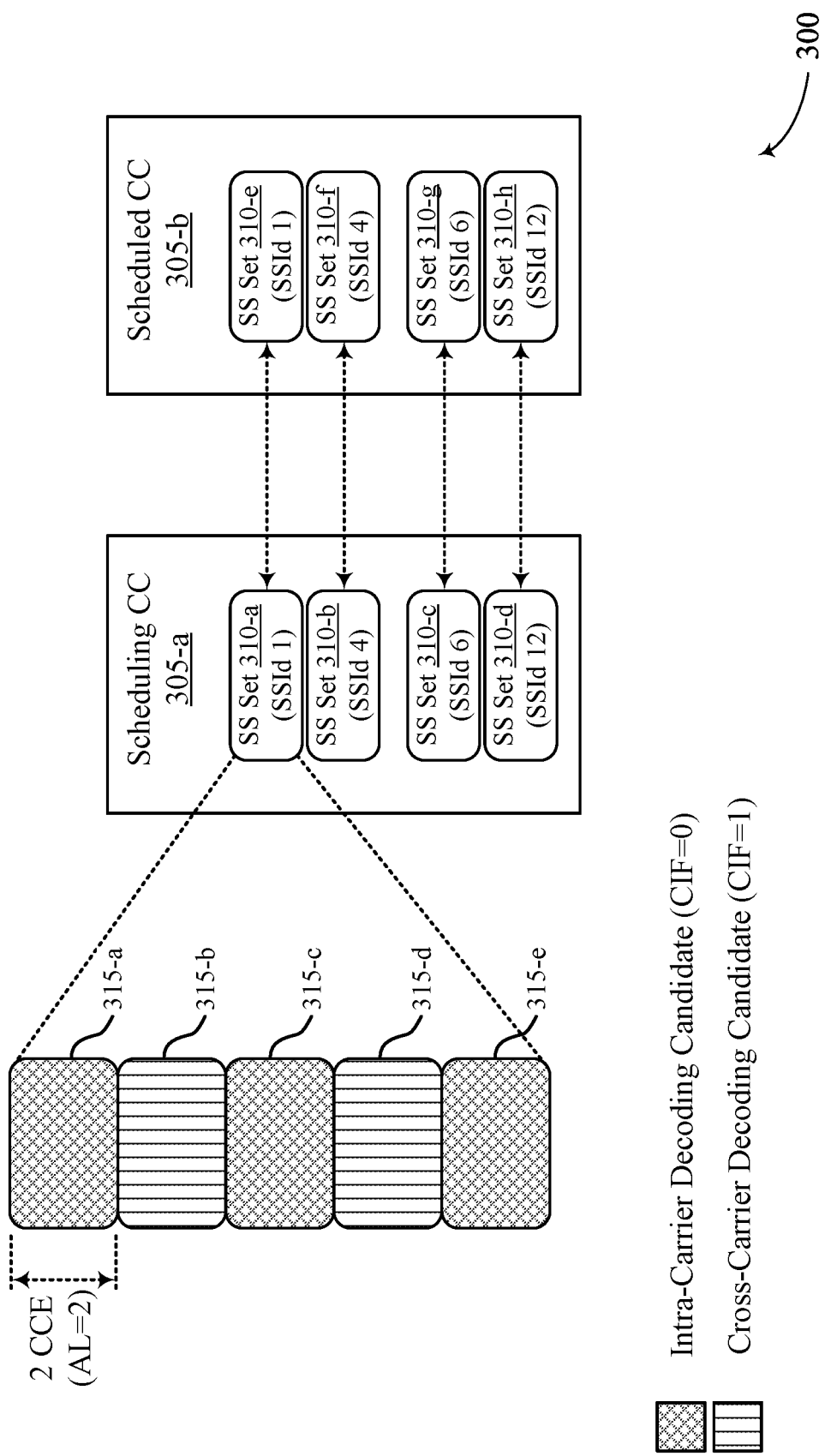
FIG. 3 illustrates an example of a resource configuration that supports techniques for control channel repetition for cross-carrier scheduling in accordance with aspects of the present disclosure.

FIG. 3 illustrates an example of a resource configuration 300 that supports techniques for control channel repetition for cross-carrier scheduling in accordance with aspects of the present disclosure. Aspects of the resource configuration 200 may implement, or be implemented, by wireless communications system 100, resource configuration 200, or both. The resource configuration 300 illustrates configurations for intra-carrier and inter-carrier (e.g., cross-carrier) scheduling.

In some aspects, some wireless communications systems (e.g., wireless communications system 100) may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., PDSCH, PUSCH) on a different component carrier (e.g., scheduling component carrier, scheduling cell). Conversely, intra-carrier scheduling, or self-scheduling, refers to cases in which control signaling transmitted/received on a component carrier is used to schedule communications on the same component carrier (e.g., same cell).

For example, as shown in resource configuration 300, a scheduling component carrier 305-a may be associated with search space sets 310-a, 310-b, 310-c, 310-d which are configured to schedule communications on a scheduled component carrier 305-b. In this regard, the search space sets 310 of the scheduling component carrier 305-a may be configured for cross-carrier scheduling on the scheduled component carrier 305-b.

In some implementations, search space sets 310 with the same search space set index (searchSpaceId) within the scheduling component carrier 305-a (e.g., scheduling cell) and the scheduled component carrier 305-b (e.g., scheduled cell) may be associated with (e.g., linked to) one another. For example, the first search space set 310-a with a first search space set index (e.g., searchSpaceId=1) on the scheduling component carrier 305-a may be linked to the second search space set 310-e with the first search space set index (e.g., searchSpaceId=1) on the scheduled component carrier 305-b for cross-carrier scheduling. In particular, search space sets 310 within the scheduled component carrier 305-b may be linked to search space sets 310 within the scheduling component carrier 305-a, where the configuration of the search space sets 310 within the scheduled component carrier 305-b may be used to determine the number of decoding candidates which are to be monitored within the scheduling component carrier 305-*a*.

As such, the terms "linked," "linking," and like terms, may be used throughout the present disclosure in two different contexts. First, related PDCCH candidates within different search space sets 310 may be said to be "linked" for PDCCH repetition, in which case multiple repetitions of the same control message may be transmitted/received within the linked PDCCH candidates. Second, search space sets 310 within a scheduled component carrier 305-*b* may be said to be "linked" to search space sets 310 within a scheduling component carrier 305-*a* for cross-carrier scheduling, in which case the configuration of the search space sets 310 within the scheduled component carrier 305-*b* may be used to determine the number of decoding candidates which are to be monitored within the search space sets 310 of the scheduling component carrier 305-*a*.

In some aspects, cross-carrier scheduling may be performed only if the BWPs associated with linked search space sets 310 in scheduling component carrier 305-*a* and the scheduled component carrier 305-*b* are both active. Stated differently, and continuing with the example above, a UE 115 may be configured to apply a search space set 310 in the scheduling component carrier 305-*a* for scheduling the scheduled component carrier 305-*b* only if the downlink BWPs in which the linked search space sets 310 of the scheduled component carrier 305-*b* and the scheduling component carrier 305-*a* are both active.

For example, a UE 115 may be configured with a first search space set 310-*a* on the scheduling component carrier 305-*a* and a second search space set 310-*e* on the scheduled component carrier 305-*b*, where the first and second search space sets 310-*a*, 310-*e* are linked for cross-carrier scheduling. In this example, the UE 115 may be configured to perform cross-carrier scheduling (e.g., apply the first search space set 310-*a* of the scheduling component carrier 305-*a* for the scheduled component carrier 305-*b* for cross-carrier scheduling) only if a first BWP associated with the first search space set 310-*a* and a second BWP associated with the second search space set 310-*e* are both active. In some cases, the first BWP and the second BWP for the linked search space sets 310-*a*, 310-*e* may be the same.

The search space sets 310 of the scheduling component carrier 305-*a* may additionally, or alternatively, be configured for intra-carrier scheduling. In particular, a search space set 310 may include control channel candidates (e.g., PDCCH candidates) which are configured for self-scheduling, cross-carrier scheduling, or both. For example, the first search space set 310-*a* may include a first set of control channel candidates 315-*a*, 315-*c*, 315-*e* (e.g., PDCCH candidates, decoding candidates) which are configured for intra-carrier scheduling (e.g., self-scheduling), and a second set of control channel candidates 315-*b*, 315-*d* which are configured for cross-carrier scheduling. In this regard, control signaling performed over the first set of control channel candidates 315-*a*, 315-*c*, 315-*e* may be used to schedule communications over the scheduling component carrier 305-*a*, whereas control signaling performed over the second set of control channel candidates 315-*b*, 315-*d* may be used to schedule communications over the scheduled component carrier 305-*b* (e.g., within the search space set 310-*e*).

In some aspects, a CIF within control signaling (e.g., DCI messages) may indicate whether the control signaling schedules communications within the same or different component carrier 305 on which the control signaling was transmitted/received. For example, a DCI with a CIF value of zero (e.g., CIF=0) may indicate that the DCI schedules a communication on the same component carrier 305 on which the DCI was transmitted/received. In this regard, a CIF value of zero may indicate self-scheduling. By way of another example, a DCI with a non-zero CIF value (e.g., CIF=1, 2, etc.) may indicate that the DCI schedules a communication on a different component carrier 305 from the component carrier 305 on which the DCI was transmitted/received. In this regard, a non-zero CIF value may indicate cross-carrier scheduling.

Moreover, the respective control channel candidates 315 may be associated with respective CIF values used for intra-carrier and cross-carrier scheduling. For example, as shown in resource configuration 300, the first set of control channel candidates 315-*a*, 315-*c*, 315-*e* may be associated with a first CIF value (e.g., CIF=0) configured for intra-carrier scheduling, and the second set of control channel candidates 315-*b*, 315-*d* may be associated with a second CIF value (e.g., CIF=1) configured for cross-carrier scheduling. In some aspects, a CIF may be configured with zero to three bits. In cases where a DCI includes a CIF which is configured with zero bits, the DCI may only support self-scheduling.

The CCEs associated with control channel candidates 315 for different scheduled component carriers 305 (e.g., first set of control channel candidates 315-*a*, 315-*c*, 315-*e* for self-scheduling, second set of control channel candidates 315-*b*, 315-*d* for cross-carrier scheduling) within a monitoring occasion of a search space set 310 may be separately identified based on a quantity of candidates for each aggregation level. The quantity of candidates for each aggregation level may be configured in the scheduled component carrier 305-*b*, and may be monitored in the scheduling component carrier 305-*a*. For example, the first search space set 310-*a* may include a monitoring occasion which includes a set of control channel candidates 315 with an aggregation level of two (e.g., two CCEs for each control channel candidate 315). In this example, the set of control channel candidates 315 may include the first subset of control channel candidates 315-*a*, 315-*c*, 315-*e* configured for self-scheduling (e.g., subset of PDCCH candidates with CIF=0), and a second subset of control channel candidates 315-*b*, 315-*d* for cross-carrier scheduling (e.g., subset of PDCCH candidates with CIF=1). In this regard, a single search space set 310 may include PDCCH candidates which are configured for self-scheduling, cross-carrier scheduling, or both. In some examples, time domain behavior, monitoring occasions, DCI formats to monitor, or any combination thereof, may be configured in search space sets 310 of the scheduling cells and the number of candidates for each aggregation level may configured in a search space set 310 (e.g., the search space set 310 with the same index) of the scheduled cell. For instance, the dotted arrows in FIG. 3 represent the association (linking) of search space sets 310 with the same search space set index in the scheduling cell and the scheduled cell (e.g., linking between the search space set 310-*a* of the scheduling component carrier 305-*a* and the search space set 310-*e* of the scheduled cell).

In some aspects, the scheduled component carrier 305-*b* (e.g., scheduled cell) may not be configured with a CORESET, but may be configured with search space sets 310 (e.g., search space sets 310-*e*, 310-*f*, 310-*g*, 310-*h*). For search space sets 310 configured in the scheduled component carrier 305-*b*, fields associated with search space set indexes (e.g., searchSpaceId) and quantities of control channel candidates per aggregation level (e.g., nrofCandidates) may be configured. Comparatively, other fields for search space sets 310 configured in the scheduled component carrier 305-*b* may be absent, or not configured, including fields associated with CORESETs, fields associated with time domain properties (e.g., periodicity, offset, duration, monitoring symbols per slot), fields associated with DCI formats to monitor, and the like. In particular, these fields (except for fields relating to quantities of control channel candidates for each aggregation level) may be defined for a search space set 310 of the scheduling component carrier 305-*a* (e.g., the search space set with the same index) which schedules the respective scheduled component carrier 305-*b*.

In some aspects, aspects of the resource configuration 300 may support techniques for control channel repetition (e.g., PDCCH repetition) in the context of cross-carrier scheduling, which may enable search space sets 310 on a scheduled component carrier 305-*b* to be scheduled via signaling transmitted/received on linked search space sets 310 of a scheduling component carrier 305-*a*. In particular, aspects of the resource configuration 300 may support techniques and configurations which enable multiple search space sets 310 on a scheduled component carrier 305-*b* to be linked for control channel repetition to multiple search space sets 310 on a scheduling component carrier 305-*a* to provide for cross-carrier scheduling, as will be described in further detail herein with respect to FIGS. 4-8.

Figure 4:
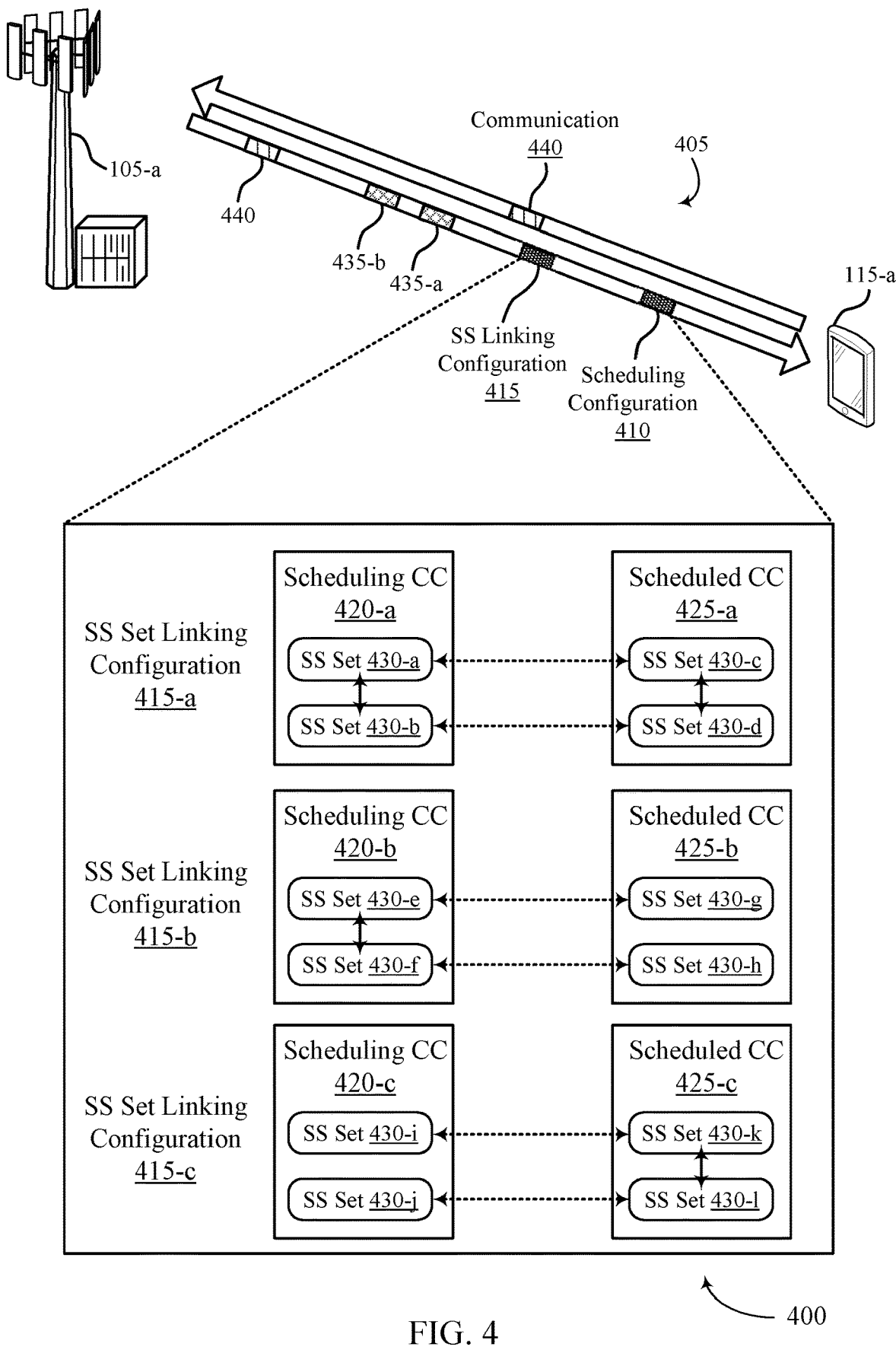
FIG. 4 illustrates an example of a wireless communications system that supports techniques for control channel repetition for cross-carrier scheduling in accordance with aspects of the present disclosure.

FIG. 4 illustrates an example of a wireless communications system 400 that supports techniques for control channel repetition for cross-carrier scheduling in accordance with aspects of the present disclosure. In some examples, wireless communications system 400 may implement, or be implemented by, aspects of wireless communications system 100, resource configuration 200, resource configuration 300, or any combination thereof. For example, wireless communications system 400 may support control configurations for linking search space sets across component carriers for control channel repetition and cross-carrier scheduling, as described in FIGS. 1-3.

The wireless communications system 400 may include a base station 105-*a* and a UE 115-*a*, which may be examples base stations 105 and UEs 115 as described with reference to FIG. 1. The UE 115-*a* may communicate with the base station 105-*a* using a communication link 405, which may be an example of an NR or LTE link between the UE 115-*a* and the base station 105-*a*. In some cases, the communication link 405 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals, to the base station 105-*a* using the communication link 405 and the base station 105-*a* may transmit downlink signals, such as downlink control signals or downlink data signals, to the UE 115-*a* using the communication link 405.

In some aspects, the UE 115-*a* and the base station 105-*b* of the wireless communications system 400 may support techniques for cross-carrier scheduling using control channel repetition (e.g., PDCCH repetition). In particular, the UE 115-*a* and the base station 105-*a* of the wireless communications system 400 may support techniques and configurations which enable multiple search space sets on a scheduled component carrier to be linked for control channel repetition to multiple search space sets on a scheduling component carrier to provide for cross-carrier scheduling. As such, techniques described herein enable communications to be scheduled on a scheduled component carrier via control channel repetition across search space sets of a scheduling component carrier.

In some aspects, the UE 115-*a* may receive control signaling (e.g., RRC message, DCI message) from the base station 105-*a*. In some aspects, the control signaling may indicate sets of component carriers (e.g., cell groups) which are configured for cross-carrier scheduling. In particular, the control signaling may indicate sets of component carriers which are configured for cross-carrier scheduling via control channel repetition (e.g., PDCCH repetition).

For example, the UE 115-*a* may receive RRC signaling which indicates a set of component carriers (e.g., cell group) including a scheduled component carrier 425 which are configured for cross-carrier scheduling via control channel repetition. By way of another example, the UE 115-*a* may receive RRC signaling which indicates a set of component carriers including a scheduled component carrier 425 which are configured for cross-carrier scheduling via control channel repetition on a scheduling component carrier 420. In this regard, the RRC signaling may indicate that cross-carrier scheduling via control channel repetition on the specified scheduling component carrier 420 applies to all component carrier within the set of component carriers (e.g., within the cell group). Additionally, or alternatively, the control signaling may indicate that the set of component carriers are configured for cross-carrier scheduling via control channel repetition on a given BWP (e.g., downlink BWP) of the scheduling component carrier 420. In other cases, the control signaling may indicate that search space sets within a downlink BWP of the scheduled component carrier 425 are configured for cross-carrier scheduling via control channel repetition.

In some aspects, the UE 115-*a* may receive, from the base station 105-*a*, control signaling (e.g., RRC message, DCI message) identifying a scheduling configuration 410 for scheduling communications 440 at the UE 115-*a*. In some aspects, the scheduling configuration 410 may indicate a first search space set 430 and a second search space set 430 of a scheduling component carrier 420 which are usable for scheduling communications 440 on a scheduled component carrier 425. In this regard, the scheduling configuration 410 may indicate a configuration for cross-carrier scheduling, where a scheduled component carrier 425 may be scheduled via communications 440 received over search space sets 430 of a scheduling component carrier 420. The scheduling configuration 410 may indicate any quantity of search space sets 430 on the scheduling component carrier 420 which may be used to schedule communications 440 over the scheduled component carrier 425.

In some aspects, the search space sets 430 of the scheduling component carrier 420 may include decoding candidates which are allocated for cross-carrier scheduling, intra-carrier scheduling, or both. The decoding candidates may be associated with CIF values which indicate whether the respective decoding candidates are configured for cross-carrier or intra-carrier scheduling. For example, decoding candidates associated with a first CIF value (e.g., CIF=0) may be configured for intra-carrier scheduling (e.g., schedule communications 440 over the scheduling component carrier 420), whereas decoding candidates associated with a second CIF value (e.g., CIF=1) may be configured for cross-carrier scheduling (e.g., schedule communications 440 over the scheduled component carrier 425).

In some aspects, the control signaling indicating the scheduling configuration 410 may further indicate one or more parameters associated with the scheduling configuration 410, including sets of monitoring occasions associated with each search space set 430, search space set indexes associated with search space sets 430 on the scheduling component carrier 420 and/or scheduled component carrier 425, BWPs associated with the respective search space sets 430, and the like.

For example, referring to a search space set linking configuration 415-a illustrated in FIG. 4, the control signaling indicating the scheduling configuration 410 may indicate a first search space set index associated with a first search space set 430-a of the scheduling component carrier 420-a and a second search space set index associated with a second search space set 430-b of the scheduling component carrier 420-a. By way of another example, the control signaling including the scheduling configuration 410 may indicate search space set indexes associated with a third search space set 430-c and a fourth search space set 430-d of the scheduled component carrier 425-a. Search space sets 430 of the scheduled component carrier 425 may be associated with the same or different search space set indexes as the search space sets 430 of the scheduling component carrier 420. For instance, continuing with reference to the search space set linking configuration 415-a illustrated in FIG. 4, the first search space set 430-a of the scheduling component carrier 420-a and the third search space set 430-c of the scheduled component carrier 425-a may be associated with the same search space set index (e.g., searchSpaceId 1), and the second search space set 430-b of the scheduling component carrier 420-a and the fourth search space set 430-d of the scheduled component carrier 425-a may be associated with the same search space set index (e.g., searchSpaceId 4).

As such, the terms "linked" may be used throughout the present disclosure in two different contexts to refer to PDCCH candidates which are linked for PDCCH repetition, and search space sets 430 which are linked for cross-carrier scheduling (e.g., search space sets 430 of a scheduled component carrier 425 which are used to determine decoding candidates which are to be monitored within a scheduling component carrier 420). Accordingly, vertical arrows between search space sets 430 shown in FIG. 4 illustrate "linking" for PDCCH repetition, whereas horizontal arrows between search space sets 430 on different component carriers 420, 425 shown in FIG. 4 illustrate "linking" for cross-carrier scheduling.

In some aspects, the control signaling indicating the scheduling configuration 410 may additionally or alternatively indicate BWPs of the respective search space sets 430 of the scheduling component carrier 420, the scheduled component carrier 425, or both. For example, referring to the first search space set linking configuration 415-a, the control signaling may indicate that the first search space set 430-a and the second search space set 430-b of the scheduling component carrier 420-a are configured within a first BWP of the scheduling component carrier 420-a. Similarly, the control signaling may indicate that at least two search space sets 430 of the scheduled component carrier 425-a (e.g., third search space set 430-c and fourth search space set 430-d) are configured within a second BWP of the scheduled component carrier 425-a. In some aspects, the first BWP of the scheduling component carrier 420-a and the second BWP of the scheduled component carrier 425-a may be different.

The UE 115-a may receive, from the base station 105-a control signaling (e.g., RRC message, DCI message) indicating a search space set linking configuration 415 for a set of search space sets 430 of the scheduled component carrier 425. The UE 115-a may receive the control signaling indicating the search space set linking configuration 415 based on receiving the control signaling including the scheduling configuration 410. Additionally, or alternatively, the scheduling configuration 410 and the search space set linking configuration 415 may be communicated within the same control signaling (e.g., via the same RRC message). Moreover, in some cases, the UE 115-a may be configured (e.g., pre-configured) with the search space set linking configuration 415.

In some aspects, the UE 115-a, the base station 105-a, or both, may identify the search space set linking configuration 415. In some aspects, the UE 115-a and/or the base station 105-a may identify the search space set linking configuration 415 based on transmitting/receiving the control singling indicating the search space set linking configuration 415. Additionally, or alternatively, the UE 115-a may identify the search space set linking configuration 415 based on transmitting/receiving the control signaling including the scheduling configuration 410. Moreover, in some cases, the UE 115-a may be configured (e.g., pre-configured) with the search space set linking configuration 415, and may therefore be configured to identify the search space set linking configuration 415 without control signaling from the base station 105-a.

In some aspects, the search space set linking configuration 415 may indicate whether the search space sets 430 on the scheduled component carrier 425 are linked or unlinked for control channel repetition. That is, the search space set linking configuration 415 may indicate whether control channel repetition over the search space sets 430 of the scheduling component carrier 420 may be used to schedule communications 440 within the search space sets 430 of the scheduled component carrier 425. If two or more search space sets 430 on the scheduling component carrier 420 are linked for control channel repetition, then control channel repetition on the scheduling component carrier 420 may be used to schedule communications 440 on the scheduled component carrier 425 with a number of PDCCH candidates that are determined from the two or more search space sets 430 of the scheduled component carrier 425. Conversely, if two or more search space sets 430 on the scheduling component carrier 420 are not linked (e.g., unlinked) for control channel repetition, then control channel repetition on the scheduling component carrier 420 may not be used to schedule communications 440 on the two or more search space sets 430 of the scheduled component carrier 425. In some aspects, due to the fact that the scheduled component carrier 425 is scheduled via control signaling on the scheduling component carrier 420, search space sets 430 of the scheduled component carrier 425 may not actually be monitored by the UE 115-a, and may therefore be referred to as "dummy" search space sets 430.

Accordingly, by identifying the search space set linking configuration 415, the UE 115-a and the base station 105-a may be configured to identify whether search space sets 430 of the scheduled component carrier 425 are linked or unlinked for control channel repetition. In some aspects, the UE 115-a and/or the base station 105-a may identify whether search space sets 430 of the scheduled component carrier 425 are linked or unlinked for control channel repetition based on explicit signaling, the scheduling configuration 410, based on search space set indexes associated with search space sets 430 of the scheduling component carrier 420 and/or scheduled component carrier 425, quantities of decoding candidates per aggregation level, predefined rules, or any combination thereof.

For example, referring to the first search space set linking configuration 415-a, the UE 115-a and/or the base station 105-a may identify that the search space sets 430-c, 430-d of the scheduled component carrier 425-a are linked for control channel repetition based on the scheduling configuration 410 indicating that the first search space set 430-a and the second search space set 430-b of the scheduling component carrier 420-a being linked for control channel repetition. In other words, the search space sets 430-c, 430-d of the scheduled component carrier 425-a may be linked (or unlinked) for PDCCH repetition based on the search space sets 430-a, 430-b of the scheduling component carrier 420-a being linked (or unlinked) for PDCCH repetition.

In other implementations, the search space sets 430 of the scheduled component carrier 425 may not be linked for control channel repetition despite the search space sets 430 of the scheduling component carrier 420 being linked for control channel repetition. For example, as shown in the second search space set linking configuration 415-b, the UE 115-a and/or the base station 105-b may determine that the search space sets 430-g, 430-h of the scheduled component carrier 425-b are not linked for control channel repetition despite the search space sets 430-e, 430-f of the scheduling component carrier 420-b being linked for control channel repetition.

Conversely, in other implementations, the search space sets 430 of the scheduled component carrier 425 may be linked for control channel repetition despite the search space sets 430 of the scheduling component carrier 420 being unlinked for control channel repetition for the purpose of scheduling the scheduling component carrier 420 (e.g., self-scheduling). For example, as shown in the third search space set linking configuration 415-c, the UE 115-a and/or the base station 105-b may determine that the search space sets 430-k, 430-l of the scheduled component carrier 425-c are linked for control channel repetition despite the search space sets 430-i, 430-j of the scheduling component carrier 420-c being unlinked for control channel repetition for the purpose of scheduling the scheduling component carrier 420-c (e.g., self-scheduling).

Additionally, or alternatively, the UE 115-a and/or the base station 105-a may identify that search space sets 430 of the scheduled component carrier 425 are linked for control channel repetition based on search space sets 430 within the scheduling component carrier 420 and scheduled component carrier 425 being associated with common search space set indexes. For example, the UE 115-a and/or the base station 105-a may identify that the search space sets 430 of the scheduled component carrier 425 are linked for control channel repetition based on the search space sets 430 being associated with search space set indexes that are respectively the same as the search space set indexes for the search space sets 430 of the scheduling component carrier 420. For instance, referring to the first search space set linking configuration 415-a, the first and second search space sets 430-a, 430-b of the scheduling component carrier 420-a may be associated with first and second search space set indexes, respectively. In this example, the UE 115-a may determine that a third and fourth search space set 430-c, 430-d of the scheduled component carrier 425-a are linked for control channel repetition based on determining that the third and fourth search space sets 430-c, 430-d are associated with the first and second search space set indexes, respectively.

In some aspects, the UE 115-a and/or the base station 105-a may determine whether search space sets 430 of the scheduled component carrier 425 are linked or unlinked for control channel repetition based on quantities of decoding candidates per aggregation level within the respective search space sets 430. For example, referring to the first search space set linking configuration 415-a, the UE 115-a and/or the base station 105-a may identify that the third search space set 430-c and the fourth search space set 430-d of the scheduled component carrier 425-a are linked for control channel repetition based on the third and fourth search space sets 430-c, 430-d being configured with a same quantity of decoding candidates per aggregation level. In other words, the third and fourth search space sets 430-c, 430-d may be linked for PDCCH repetition based on the respective search space sets having a one-to-one mapping of decoding candidates within each aggregation level.

In some aspects, the UE 115-a, the base station 105-a, or both, may identify a set of decoding candidates within the first and second search space sets 430 of the scheduling component carrier 420 which are allocated for cross-carrier scheduling of the scheduled component carrier 425. As noted previously herein, the search space sets 430 of the scheduling component carrier 420 may include decoding candidates which are allocated for cross-carrier scheduling, intra-carrier scheduling, or both. In this regard, the UE 115-a and/or base station 105-a may be configured to identify which decoding candidates of the first and second search space sets 430 of the scheduling component carrier 420 are allocated for cross-carrier scheduling of the scheduled component carrier 425. The UE 115-a and/or the base station 105-a may identify the set of decoding candidates which are allocated for cross-carrier scheduling of the scheduled component carrier 425 based on the search space set linking configuration 415, the scheduling configuration 410, or both.

Moreover, the UE 115-a, the base station 105-a, or both, may identify decoding candidates (e.g., sets or pairs of decoding candidates) within the search space sets 430 of the scheduling component carrier 420 which are linked (or unlinked) for control channel repetition. In particular, in cases where the scheduling configuration 410 indicates a first and second search space set 430 of the scheduling component carrier 420 (e.g., search space sets 430-a, 430-b of scheduling component carrier 420-a) which are configured for cross-carrier scheduling, the UE 115-a and/or the base station 105-a may identify decoding candidates within the first and second search space sets 430 which are linked or unlinked for control channel repetition. The UE 115-a, the base station 105-a, or both, may identify sets, or pairs, of decoding candidates which are linked for control channel repetition based on the scheduling configuration 410, the search space set linking configuration 415, or both.

Additionally, or alternatively, the UE 115-a and/or the base station 105-a may identify decoding candidates (e.g., sets or pairs of decoding candidates) which are linked for control channel repetition based on one or more parameters associated with the respective decoding candidates and/or search space sets 430, including CIF values of the decoding candidates, candidate indexes, aggregation levels, and the like. In particular, the UE 115-a and/or the base station 105-a may determine that sets/pairs of decoding candidates are linked or unlinked for cross-carrier scheduling and/or intra-carrier scheduling.

For example, referring to the first search space set linking configuration 415-a, the UE 115-a may determine that a pair of decoding candidates within the first and second search space sets 430-a, 430-b of the scheduling component carrier 420-a (e.g., pair of decoding candidates including a first and a second decoding candidate in the first search space set 430-a and second search space set 430-b, respectively) are linked for control channel repetition based on the pair of decoding candidates corresponding to a same CIF value (e.g., scheduling the same component carrier), a same candidate index, a same aggregation level, or any combination thereof. For example, in two linked monitoring occasions of search space sets 430-*a*, 430-*b* of the scheduling component carrier 420-*a*, each two PDCCH candidates corresponding to the same CIF value (corresponding to the same scheduled cell), the same candidate index, and the same AL are linked together for PDCCH repetition.

Conversely, the UE 115-*a* may determine that a pair of decoding candidates within the first and second search space sets 430 the scheduling component carrier 420 are unlinked for control channel repetition based on the pair of decoding candidates corresponding to a different CIF values (e.g., scheduling different component carriers 420), different candidate indexes, different aggregation levels, or any combination thereof. For example, referring to the second search space set linking configuration 415-*b*, the UE 115-*a* may determine that a pair of decoding candidates within the first and second search space sets 430-*e*, 430-*f* of the scheduling component carrier 420-*b* are unlinked for control channel repetition based on the pair of decoding candidates corresponding to a different CIF values (e.g., scheduling different component carriers 420), different candidate indexes, different aggregation levels, or any combination thereof.

In some aspects, sets/pairs of decoding candidates within the first and second search space sets 430 of the scheduling component carrier 420 may be linked for both intra-carrier scheduling and cross-carrier scheduling. In other cases, sets/pairs of decoding candidates within the first and second search space sets 430 of the scheduling component carrier 420 may be linked for intra-carrier scheduling, but not for cross-carrier scheduling (e.g., unlinked for cross-carrier scheduling). Conversely, in other cases, sets/pairs of decoding candidates within the first and second search space sets 430 of the scheduling component carrier 420 may be linked for cross-carrier scheduling, but not for intra-carrier scheduling (e.g., unlinked for intra-carrier scheduling). This will be described in further detail herein with respect to FIGS. 5-7.

In some aspects, the UE 115-*a* may receive, from the base station 105-*a*, control signaling which indicates active BWPs in each of the scheduling component carrier 420 and the scheduled component carrier 425. As noted previously herein, the scheduling configuration 410 may indicate BWPs associated with the search space sets 430 within the scheduling component carrier 420 and scheduled component carrier 425. For example, the scheduling configuration 410 may indicate that the search space sets 430-*a*, 430-*b* of the scheduling component carrier 420-*a* are associated with a first BWP, and that the search space sets 430-*c*, 430-*d* of the scheduled component carrier 425-*a* are associated with a second BWP. Moreover, the UE 115-*a* and/or base station 105-*a* may only be configured schedule communications 440 over the search space sets 430 of the scheduled component carrier 425 via control channel repetition over search space sets 430 of the scheduling component carrier 420 if the BWPs associated with the search space sets 430 of both the scheduling component carrier 420 and scheduled component carrier 425 are active. That is, in some implementations, cross-carrier scheduling via control channel repetition may only be performed if BWPs for the linked search space sets 430 are active on both the scheduling component carrier 420 and the scheduled component carrier 425.

For example, the scheduling configuration 410 may indicate a first search space set 430-*a* and a second search space set 430-*b* of the scheduling component carrier 420-*a* which are configured for cross-carrier scheduling. Additionally, the search space set linking configuration 415-*a* may indicate that a third search space set 430-*c* and a fourth search space set 430-*d* of the scheduled component carrier 425-*a* are linked for control channel repetition (e.g., may be scheduled via PDCCH repetition via the first and second search space sets 430-*a*, 430-*b*). In this example, control signaling may indicate that a first BWP associated with the first and second search space sets 430-*a*, 430-*b* of the scheduling component carrier 420-*a* is active, and that a second BWP associated with the third and fourth search space sets 430-*c*, 430-*d* of the scheduled component carrier 425-*a* is active. In this example, cross-carrier scheduling of the scheduled component carrier 425-*a* may be performed via PDCCH repetition on the scheduling component carrier 420-*a* based on the first and second BWPs on the scheduling component carrier 420-*a* and the scheduled component carrier 425-*a* both being active.

In some aspects, the UE 115-*a* may monitor decoding candidates within the search space sets 430 of the scheduling component carrier 420. In particular, the UE 115-*a* may monitor decoding candidates within the search space sets 430 of the scheduling component carrier 420 for one or more repetitions of a control message 435 which schedule communications 440 over the scheduled component carrier 425 based on the scheduling configuration 410 and/or the search space set linking configuration 415. In this regard, the UE 115-*a* may monitor the decoding candidates based on (e.g., in accordance with) the scheduling configuration 410, the search space set linking configuration 415, or both.

Additionally, or alternatively, the UE 115-*a* may monitor the decoding candidates within the search space sets 430 of the scheduling component carrier 420 based on determining that the decoding candidates are linked (or unlinked) for cross-carrier and/or intra-carrier scheduling, based on determining that the search spaces sets 430 of the scheduling component carrier 420 and the scheduled component carrier 425 are linked or unlinked for control channel repetition, based on the BWPs of the respective search space sets 430 being active within both the scheduling component carrier 420 and scheduled component carrier 425, or any combination thereof.

For example, referring to the first search space set linking configuration 415-*a*, the first and second search space sets 430-*a*, 430-*b* within the scheduling component carrier 420-*a* which are linked for control channel repetition may include first and second decoding candidates, respectively, which are linked for cross-carrier scheduling and control message 435 repetition. In this example, the UE 115-*a* may monitor the first and second decoding candidates for one or more repetitions of a control message 435 (e.g., one or more repetitions of the same control message 435) which schedule a communication 440 over the scheduled component carrier 425-*a*. By way of another example, the first and second search space sets 430-*a*, 430-*b* within the scheduling component carrier 420-*a* which may be unlinked for control channel repetition and may include first and second decoding candidates, respectively. In this example, the UE 115-*a* may monitor the first decoding candidate for a first control message 435 and the second decoding candidate for a second control message 435 which is different from the first decoding candidate based on the first and second search space sets 430 being unlinked for control channel repetition.

In some aspects, the UE 115-*a* may receive, from the base station 105-*a*, a first control message 435-*a* (e.g., first repetition of a control message 435-*a*). In some aspects, the control message 435-*a* may schedule a communication 440 between the UE 115-*a* and the base station 105-*a* over the scheduled component carrier 425. The communication 440 scheduled by the control message 435-*a* may include a PDSCH transmission, a PUSCH transmission, or both. As such, the control message 435-*a* may indicate a semi-persistent scheduling (SPS) release and/or a configured grant release (e.g., uplink Type 2 configured grant) on the scheduled component carrier 425. The control message 435-*a* may include a DCI message (e.g., DCI formats 0_1, 0_2, 1_1, and/or 1_2).

In some aspects, the UE 115-*a* may receive the first control message 435-*a* (e.g., first repetition of the control message 435-*a*) within a decoding candidate of a search space set 430 associated with the scheduling component carrier 420. Moreover, the UE 115-*a* may receive the first repetition of the control message 435-*a* within a first decoding candidate of a first search space set 430 (e.g., first search space set 430-*a*) which is linked to a second decoding candidate of a second search space set 430 (e.g., seconds search space set 430-*b*) which is liked or unlinked to the first search space set 430 for control channel repetition. In this regard, the UE 115-*a* may receive the first repetition of the control message 435-*a* based on (e.g., in accordance with) the scheduling configuration 410 and/or the search space set linking configuration 415.

In some implementations, the UE 115-*a* may receive, from the base station 105-*a*, a second control message 435-*b* (e.g., second repetition of the control message 435-*b*). In some aspects, the second control message 435-*b* may schedule a communication 440 (e.g., PDSCH/SPS release, PDSCH/configured grant release) between the UE 115-*a* and the base station 105-*a* over the first component carrier (e.g., scheduled component carrier 425). The control message 435-*b* may include a DCI message (e.g., DCI formats 0_1, 0_2, 1_1, and/or 1_2).

The control messages 435-*a*, 435-*b* may include same or different payloads based on whether the search space sets 430 and decoding candidates of the scheduling component carrier 420 are linked or unlinked for control channel repetition. For example, in cases where the search space sets 430 of the scheduling component carrier 420 are linked for control channel repetition, the second repetition of the control message 435-*b* may include a same data payload, and may schedule the same communication 440, as compared to the first repetition of the control message 435-*a*. By way of another example, in cases where the search space sets 430 of the scheduling component carrier 420 are unlinked for control channel repetition, the second control message 435-*b* may include a different data payload, and may schedule a different communication 440, as compared to the first repetition of the control message 435-*a*.

In some aspects, the UE 115-*a* may receive the second control message 435-*b* (e.g., second repetition of the control message 435-*b*) within a decoding candidate of a search space set 430 associated with the scheduling component carrier 420. Moreover, the UE 115-*a* may receive the second repetition of the control message 435-*b* within a second decoding candidate of a second search space set 430 (e.g., search space set 430-*b*) which is linked to a first decoding candidate of a first search space set 430 (e.g., first search space set 430-*a*) which is liked or unlinked to the first search space set 430 for control channel repetition. In this regard, the UE 115-*a* may receive the second repetition of the control message 435-*b* based on (e.g., in accordance with) the scheduling configuration 410 and/or the search space set linking configuration 415.

In some cases, the UE 115-*a* may receive both the first and second repetitions of the control message 435-*a*, 435-*b*. In other cases, the UE 115-*a* may receive only one of the first or second repetition of the control message 435-*a*, 435-*b*. In cases where the UE 115-*a* receives only the first or second repetition of the control message 435, the UE 115-*a* may demodulate/decode the single received repetition of the control message 435. In other cases where the UE 115-*a* receives both the first and second repetitions of the control message 435-*a*, 435-*b*, the UE 115-*a* may demodulate/decode only one of the first or second repetitions of the control message 435. Additionally, or alternatively, the UE 115-*a* may combine the first and second repetitions of the control message 435-*a*, 435-*b*.

For example, the UE 115-*a* may perform soft combining of the first and second repetitions of the control message 435-*a*, 435-*b*. In some aspects, the UE 115-*a* may perform soft combining (e.g., perform one or more soft combining procedures) in order to demodulate/decode the repetitions of the control message 435-*a*, 435-*b*. In particular, the UE 115-*a* may perform soft combining of a first signal (e.g., first repetition of the control message 435-*a*) received within a first search space set 430 with a second signal (e.g., second repetition of the control message 435-*b*) received within a second search space set 430 which is linked to the first search space set for control channel repetition.

Subsequently, the UE 115-*a* may perform (e.g., transmit, receive) the communication 440 which was scheduled by the one or more control messages 435-*a*, 435-*b* over the scheduled component carrier 425. For example, in cases where the scheduled communication 440 includes a PUSCH transmission, the UE 115-*a* may transmit the scheduled PUSCH transmission to the base station 105-*a* over the scheduled component carrier 425. By way of another example, example, in cases where the scheduled communication 440 includes a PDSCH transmission, the UE 115-*a* may receive the scheduled PDSCH transmission from the base station 105-*a* over the scheduled component carrier 425.

Techniques described herein may provide for improved cross-carrier scheduling. In particular, techniques described herein may enable the use of PDCCH repetition in the context of cross-carrier scheduling, which may enable search space sets 430 on a scheduled component carrier 425 to be scheduled via signaling transmitted/received on linked search space sets 430 of a scheduling component carrier 420. By enabling PDCCH repetition in the context of cross-carrier scheduling, techniques described herein may improve transmission diversity of control messages 435 used for cross-carrier scheduling. As such, techniques described herein may improve reliability of control signaling used for cross-carrier scheduling, which may enable more efficient and widespread use of cross-carrier scheduling.

Figure 5:
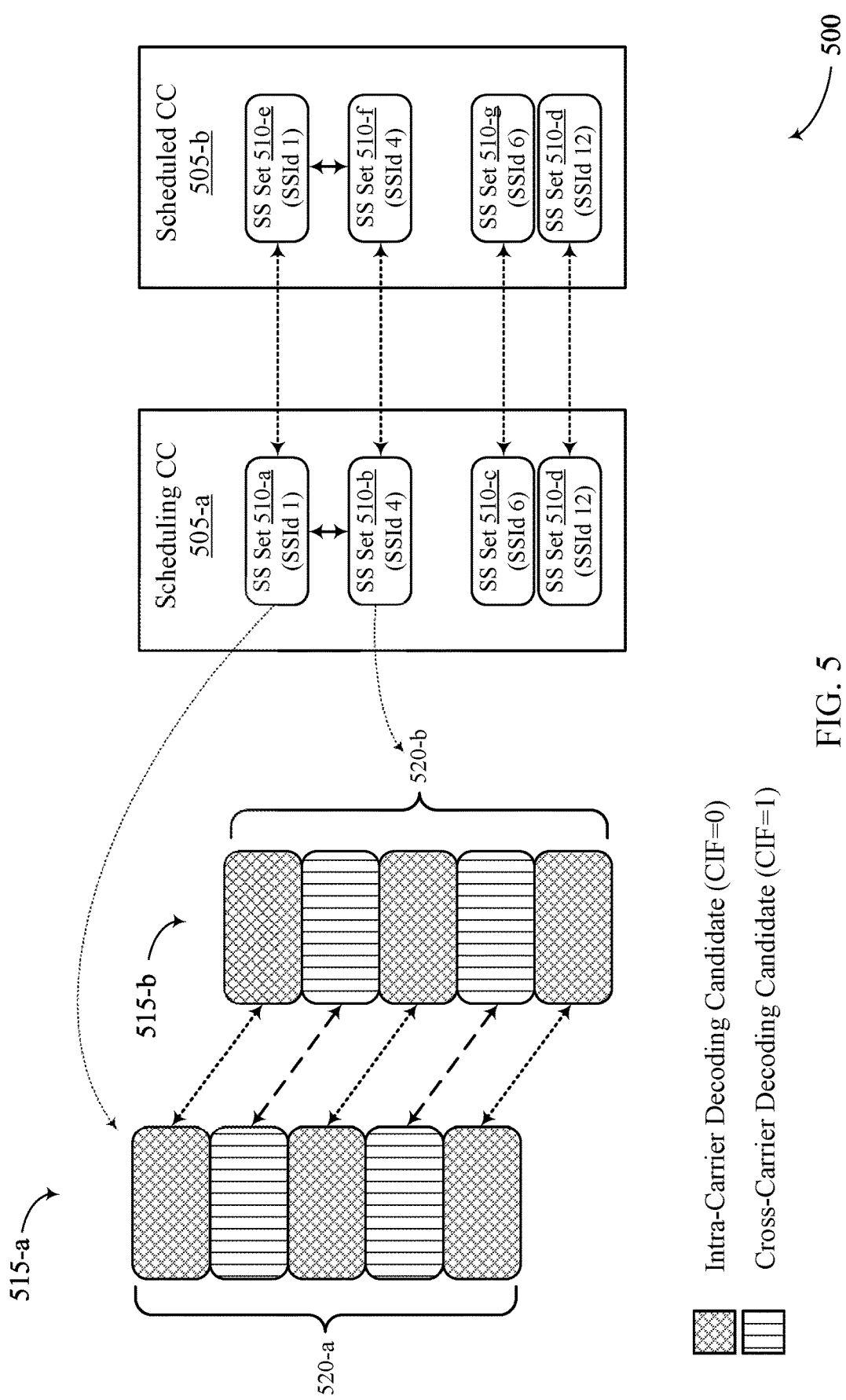
FIG. 5 illustrates an example of a resource configuration that supports techniques for control channel repetition for cross-carrier scheduling in accordance with aspects of the present disclosure.

FIG. 5 illustrates an example of a resource configuration 500 that supports techniques for control channel repetition for cross-carrier scheduling in accordance with aspects of the present disclosure. Aspects of the resource configuration 500 may implement, or be implemented by, wireless communications system 100, resource configuration 200, resource configuration 300, wireless communications system 400, or any combination thereof.

In some aspects, a UE 115 may receive/identify a scheduling configuration for cross-carrier scheduling which indicates a scheduling component carrier 505-*a* and a scheduled component carrier 505-*b*. As shown in FIG. 5, the scheduling component carrier 505-*a* may include search space sets 510-*a*, 510-*b*, 510-*c*, and 510-*d*. Similarly, the scheduled component carrier 505-*b* may include search space sets 510-*e*, 510-*f*, 510-*g*, and 510-*h*. In some aspects, control signaling received over the scheduling component carrier 505-*a* may be used to schedule communications over the scheduled component carrier 505-*b* (e.g., cross-carrier scheduling).

In some aspects, due to the fact that the scheduled component carrier 505-*b* is scheduled via control signaling on the scheduling component carrier 505-*a*, search space sets 510 of the scheduled component carrier 505-*b* may not actually be monitored by the UE 115, and may therefore be referred to as "dummy" search space sets 510. In some implementations, the configurations for the search space sets 510 of the scheduled component carrier 505-*b* may include only a number of decoding candidates for each aggregation level.

The respective search space sets 510 within each of the component carriers 505 may be associated with one or more BWPs. For example, referring to the scheduling component carrier 505-*a*, the first and second search space sets 510-*a* and 510-*b* may be associated with a first BWP of the scheduling component carrier 505-*a*, and the search space sets 510-*c*, 510-*d* may be associated with a second BWP of the scheduling component carrier 505-*a*. By way of another example, referring to the scheduled component carrier 505-*b*, the first and second search space sets 510-*e* and 510-*f* may be associated with a first BWP of the scheduled component carrier 505-*b*, and the search space sets 510-*g*, 510-*h* may be associated with a second BWP of the scheduled component carrier 505-*b*. In some implementations, first BWP of the scheduling component carrier 505-*a* including the first and second search space sets 510-*a*, 510-*b* may be different from the first BWP of the scheduled component carrier 505-*b* including the first and second search space sets 510-*e*, 510-*f*.

In some aspects, the first and second search space sets 510-*a*, 510-*b* of the scheduling component carrier 505-*a* may include monitoring occasions including decoding candidates (e.g., PDCCH candidates) which are configured for self-scheduling, cross-carrier scheduling, or both. For example, the first search space set 510-*a* may include a first monitoring occasion 515-*a* which is linked for control channel repetition to a second monitoring occasion 515-*b* associated with the second search space set 510-*b*. The first monitoring occasion 515-*a* may include a first set of decoding candidates 520-*a* and the second monitoring occasion 515-*b* may include a second set of decoding candidates 520-*b*. Each of the monitoring occasions 515 may include a subset of decoding candidates 520 which are configured for intra-carrier scheduling (e.g., self-scheduling), and a subset of decoding candidates which are configured for cross-carrier scheduling.

In this regard, control signaling performed over the first subsets of decoding candidates configured for intra-carrier scheduling may be used to schedule communications over the scheduling component carrier 505-*a*, whereas control signaling performed over the second subsets of decoding candidates configured for cross-carrier scheduling may be used to schedule communications over the scheduled component carrier 505-*b*. In some aspects, decoding candidates within the sets of decoding candidates 520-*a*, 520-*b* which are configured for intra-carrier scheduling may be associated with a first CIF value (e.g., CIF=0), whereas decoding candidates within the sets of decoding candidates 520-*a*, 520-*b* which are configured for cross-carrier scheduling may be associated with a second CIF value (e.g., CIF=1).

The first search space set 510-*a* (e.g., searchSpaceId 1) and the second search space set 510-*b* (e.g., searchSpaceId 4) of the scheduling component carrier 505-*a* may be linked together for control channel repetition for scheduling the scheduled component carrier 505-*b*. That is, multiple repetitions of the same control message (e.g., same DCI message) may be transmitted/received in the first and second search space sets 510-*a*, 510-*b*, where the multiple repetitions of the same control message schedule a communication over the scheduled component carrier 505-*b*.

In some aspects, the first search space set 510-*e* (e.g., searchSpaceId 1) and the second search space set 510-*f* (e.g., searchSpaceId 4) of the scheduled component carrier 505-*b* (e.g., dummy search space sets 510 on the scheduled component carrier 505-*b*) may be linked together for control channel repetition based on the first search space set 510-*a* and the second search space set 510-*b* of the scheduling component carrier 505-*a* being linked for control channel repetition. Moreover, the first search space set 510-*e* and the second search space set 510-*f* of the scheduled component carrier 505-*b* may be linked together for control channel repetition based on the first and second search space sets 510-*e*, 510-*f* being associated with the same search space set indexes as the first and second search space sets 510-*a*, 510-*b* of the scheduling component carrier 505-*a*. In other words, the first and second search space sets 510-*a*, 510-*b* of the scheduling component carrier 505-*a* and the first and second search spaces sets 510-*e*, 510-*f* of the scheduled component carrier may be linked for control channel repetition based on search space sets 510 with the same search space set indexes (e.g., searchSpaceId 1, searchSpaceId 4) being positioned within both the scheduling component carrier 505-*a* and the scheduled component carrier 505-*b*.

As shown in resource configuration 500, the linked monitoring occasions 515-*a*, 515-*b* associated with the first and second search space sets 510-*a*, 510-*b* may include sets (e.g., pairs) of linked decoding candidates corresponding to the same CIF value. Moreover, the linked monitoring occasions 515-*a*, 515-*b* may include sets (e.g., pairs) of linked decoding candidates corresponding to the same candidate index, the same aggregation level, or both. Moreover, because the first search space set 510-*a* and the second search space set 510-*b* are linked together for control channel repetition, the first and second search space sets 510-*a*, 510-*b* may be configured with the same number of decoding candidates for each aggregation level. For example, the first monitoring occasion 515-*a* and the second monitoring occasion 515-*b* may include a same quantity of decoding candidates which are linked for intra-carrier scheduling, and a same quantity of decoding candidates which are linked for cross-carrier scheduling.

In some aspects, a UE 115 may be configured to apply the linked search space sets 510-*a*, 510-*b* used for scheduling the scheduled component carrier 505-*b* (e.g., monitor decoding candidates corresponding to the scheduled component carrier 505-*b*) only if the downlink BWP in which the search space sets 510-*a*, 510-*b* are configured in the scheduling component carrier 505-*a* is active, and the downlink BWP in which the search space sets 510-*e*, 510-*f* are configured in the scheduled component carrier 505-*b* is active. That is, the UE 115 may be configured to monitor the first and second search space sets 510-*a*, 510-*b* of the scheduling component carrier 505-*a* for control scheduling which schedules communications within the first and second search space sets 510-*e*, 510-*f* of the scheduled component carrier only if a first BWP associated with the first and second search space sets 510-*a*, 510-*b* of the scheduling component carrier 505-*a* is active, and if a second BWP associated with the first and second search space sets 510-*e*, 510-*f* of the scheduled component carrier 505-*b* is active.

As such, the respective linked search space sets 510 in each of the scheduling component carrier 505-a and the scheduled component carrier 505-b may be associated with the same BWP. That is, the first and second search space sets 510-a, 510-b may be associated with a first BWP, and the first and second search space sets 510-e, 510-f may be associated with a second BWP, where the first and second BWPs may be different.

Figure 6:
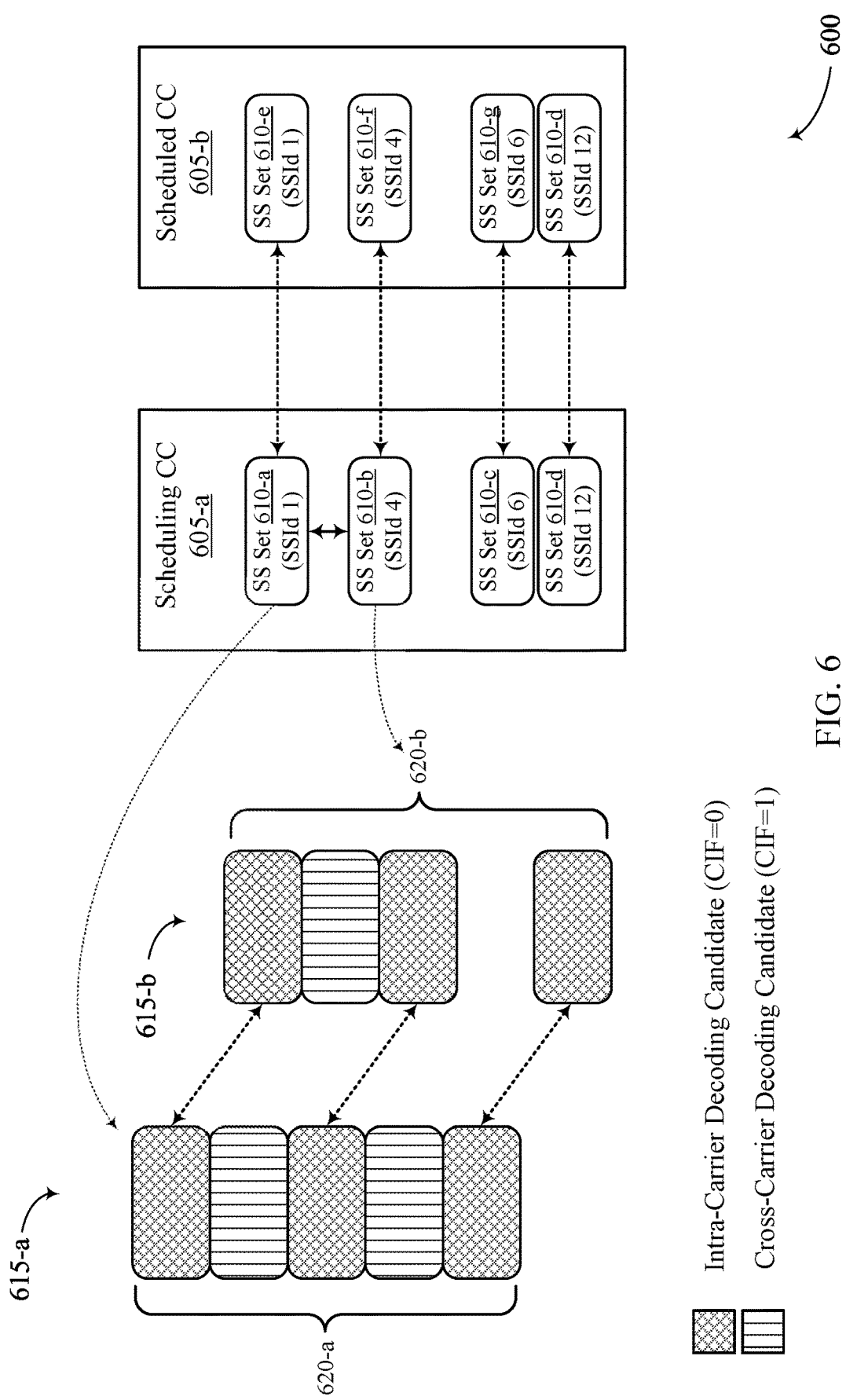
FIG. 6 illustrates an example of a resource configuration that supports techniques for control channel repetition for cross-carrier scheduling in accordance with aspects of the present disclosure.

FIG. 6 illustrates an example of a resource configuration 600 that supports techniques for control channel repetition for cross-carrier scheduling in accordance with aspects of the present disclosure. Aspects of the resource configuration 600 may implement, or be implemented by, wireless communications system 100, resource configuration 200, resource configuration 300, wireless communications system 400, or any combination thereof.

In some aspects, a UE 115 may receive/identify a scheduling configuration for cross-carrier scheduling which indicates a scheduling component carrier 605-a and a scheduled component carrier 605-b. As shown in FIG. 6, the scheduling component carrier 605-a may include search space sets 610-a, 610-b, 610-c, and 610-d. Similarly, the scheduled component carrier 605-b may include search space sets 610-e, 610-f, 610-g, and 610-h. In some aspects, control signaling received over the scheduling component carrier 605-a may be used to schedule communications over the scheduled component carrier 605-b (e.g., cross-carrier scheduling).

In some aspects, due to the fact that the scheduled component carrier 605-b is scheduled via control signaling on the scheduling component carrier 605-a, search space sets 610 of the scheduled component carrier 605-b may not actually be monitored by the UE 115, and may therefore be referred to as "dummy" search space sets 610. In some implementations, the configurations for the search space sets 610 of the scheduled component carrier 605-b may include only a number of decoding candidates for each aggregation level.

The respective search space sets 610 within each of the component carriers 605 may be associated with one or more BWPs. For example, referring to the scheduling component carrier 605-a, the first and second search space sets 610-a and 610-b may be associated with a first BWP of the scheduling component carrier 605-a, and the search space sets 610-c, 610-d may be associated with a second BWP of the scheduling component carrier 605-a. By way of another example, referring to the scheduled component carrier 605-b, the first and second search space sets 610-e and 610-f may be associated with a first BWP of the scheduled component carrier 605-b, and the search space sets 610-g, 610-h may be associated with a second BWP of the scheduled component carrier 605-b. In some implementations, first BWP of the scheduling component carrier 605-a including the first and second search space sets 610-a, 610-b may be different from the first BWP of the scheduled component carrier 605-b including the first and second search space sets 610-e, 610-f.

In some aspects, the first and second search space sets 610-a, 610-b of the scheduling component carrier 605-a may include monitoring occasions including decoding candidates (e.g., PDCCH candidates) which are configured for self-scheduling, cross-carrier scheduling, or both. For example, the first search space set 610-a may include a first monitoring occasion 615-a which is linked for control channel repetition to a second monitoring occasion 615-b associated with the second search space set 610-b. The first monitoring occasion 615-a may include a first set of decoding candidates 620-a and the second monitoring occasion 615-b may include a second set of decoding candidates 620-b. Each of the monitoring occasions 615 may include a subset of decoding candidates 620 which are configured for intra-carrier scheduling (e.g., self-scheduling), and a subset of decoding candidates which are configured for cross-carrier scheduling.

In this regard, control signaling performed over the first subsets of decoding candidates configured for intra-carrier scheduling may be used to schedule communications over the scheduling component carrier 605-a, whereas control signaling performed over the second subsets of decoding candidates configured for cross-carrier scheduling may be used to schedule communications over the scheduled component carrier 605-b. In some aspects, decoding candidates within the sets of decoding candidates 620-a, 620-b which are configured for intra-carrier scheduling may be associated with a first CIF value (e.g., CIF=0), whereas decoding candidates within the sets of decoding candidates 620-a, 620-b which are configured for cross-carrier scheduling may be associated with a second CIF value (e.g., CIF=1).

The first search space set 610-a (e.g., searchSpaceId 1) and the second search space set 610-b (e.g., searchSpaceId 4) of the scheduling component carrier 605-a may be linked together for control channel repetition for scheduling the scheduled component carrier 605-b. That is, multiple repetitions of the same control message (e.g., same DCI message) may be transmitted/received in the first and second search space sets 610-a, 610-b, where the multiple repetitions of the same control message schedule a communication over the scheduled component carrier 605-b.

In some aspects, the first search space set 610-e (e.g., searchSpaceId 1) and the second search space set 610-f (e.g., searchSpaceId 4) of the scheduled component carrier 605-b (e.g., dummy search space sets 610 on the scheduled component carrier 605-b) may not be linked together (e.g., may be unlinked) for control channel repetition despite the first and second search space sets 610-a, 610-b of the scheduling component carrier 605-a being linked for control channel repetition. In some cases, the first and second search space sets 610-e, 610-f of the scheduled component carrier 605-b may be unlinked for control channel repetition based on the first and second search space sets 610-a, 610-b of the scheduling component carrier 605-a being linked for control channel repetition.

In such cases, decoding candidates which are configured for intra-carrier scheduling (e.g., CIF=0) within the monitoring occasions 615-a, 615-b of the linked search space sets 610-a, 610-b of the scheduling component carrier 605-a may be linked for control channel repetition. As such, repetitions of the same control message which schedule communications over the scheduling component carrier 605-a may be transmitted/received within the linked decoding candidates of the first and second monitoring occasions 615-a, 615-b. In particular, sets of decoding candidates within the first and second monitoring occasions 615-a, 615-b may be linked for control channel repetition for self-scheduling based on the sets of decoding candidates being associated with the same CIF value, the same candidate index, and the same aggregation level. Accordingly, the first and second monitoring occasions 615-a, 615-b associated with the first and second search space sets 610-a, 610-b may include the same number of decoding candidates which are configured for self-scheduling.

Comparatively, the decoding candidates which are configured for cross-carrier scheduling (e.g., CIF=1) within the monitoring occasions 615-a, 615-b of the linked search space sets 610-a, 610-b may be unlinked for control channel repetition. In other words, multiple repetitions of the same control message which schedule a communication over the scheduled component carrier 605-b may not be transmitted/received within the unlinked decoding candidates configured for cross-carrier scheduling. As such, the UE 115 may be configured to individually monitor the decoding candidates configured for cross-carrier scheduling (e.g., monitor the respective decoding candidates for individual, distinct control messages which schedule communications over the scheduled component carrier 605-b).

Due to the fact that the decoding candidates configured for cross-carrier scheduling within the monitoring occasions 615-a, 615-b are unlinked for control channel repetition, the first and second search space sets 610-a, 610-b of the scheduling component carrier 605-a may be configured with a different number of decoding candidates configured for cross-carrier scheduling for each aggregation level. For example, as shown in the resource configuration 600, the first and second monitoring occasion 615-a, 615-b may include a different number of decoding candidates configured for cross-carrier scheduling (e.g., no one-to-one mapping of cross-carrier decoding candidates).

Figure 7:
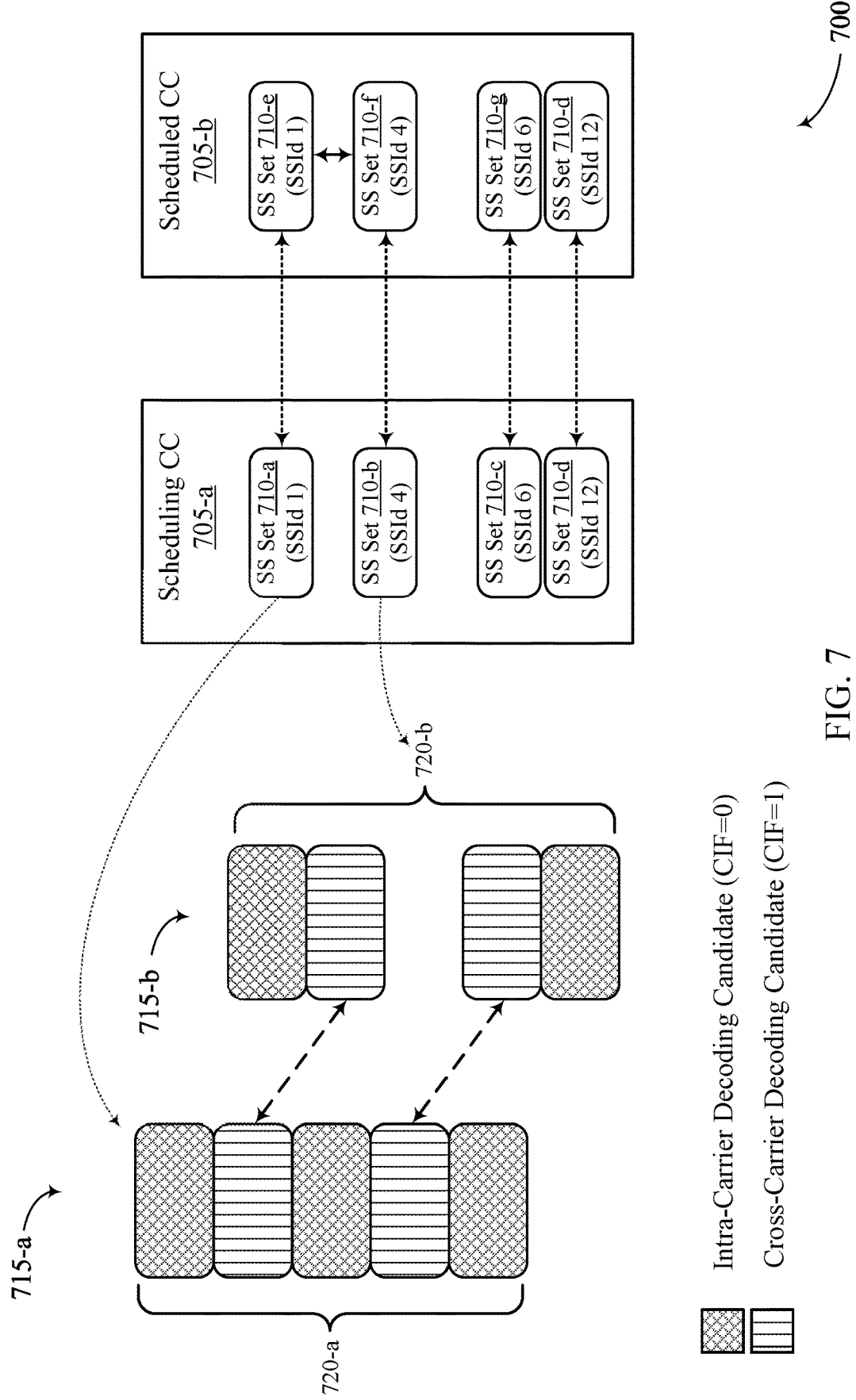
FIG. 7 illustrates an example of a resource configuration that supports techniques for control channel repetition for cross-carrier scheduling in accordance with aspects of the present disclosure.

FIG. 7 illustrates an example of a resource configuration 700 that supports techniques for control channel repetition for cross-carrier scheduling in accordance with aspects of the present disclosure. Aspects of the resource configuration 700 may implement, or be implemented by, wireless communications system 100, resource configuration 200, resource configuration 300, wireless communications system 400, or any combination thereof.

In some aspects, a UE 115 may receive/identify a scheduling configuration for cross-carrier scheduling which indicates a scheduling component carrier 705-a and a scheduled component carrier 705-b. As shown in FIG. 7, the scheduling component carrier 705-a may include search space sets 710-a, 710-b, 710-c, and 710-d. Similarly, the scheduled component carrier 705-b may include search space sets 710-e, 710-f, 710-g, and 710-h. In some aspects, control signaling received over the scheduling component carrier 705-a may be used to schedule communications over the scheduled component carrier 705-b (e.g., cross-carrier scheduling).

In some aspects, due to the fact that the scheduled component carrier 705-b is scheduled via control signaling on the scheduling component carrier 705-a, search space sets 710 of the scheduled component carrier 705-b may not actually be monitored by the UE 115, and may therefore be referred to as "dummy" search space sets 710. In some implementations, the configurations for the search space sets 710 of the scheduled component carrier 705-b may include only a number of decoding candidates for each aggregation level.

The respective search space sets 710 within each of the component carriers 705 may be associated with one or more BWPs. For example, referring to the scheduling component carrier 705-a, the first and second search space sets 710-a and 710-b may be associated with a first BWP of the scheduling component carrier 705-a, and the search space sets 710-c, 710-d may be associated with a second BWP of the scheduling component carrier 705-a. By way of another example, referring to the scheduled component carrier 705-b, the first and second search space sets 710-e and 710-f may be associated with a first BWP of the scheduled component carrier 705-b, and the search space sets 710-g, 710-h may be associated with a second BWP of the scheduled component carrier 705-b. In some implementations, first BWP of the scheduling component carrier 705-a including the first and second search space sets 710-a, 710-b may be different from the first BWP of the scheduled component carrier 705-b including the first and second search space sets 710-e, 710-f.

In some aspects, the first and second search space sets 710-a, 710-b of the scheduling component carrier 705-a may include monitoring occasions including decoding candidates (e.g., PDCCH candidates) which are configured for self-scheduling, cross-carrier scheduling, or both. For example, the first search space set 710-a may include a first monitoring occasion 715-a, and the second search space set 710-b may include a second monitoring occasion 715-b. The first monitoring occasion 715-a may include a first set of decoding candidates 720-a and the second monitoring occasion 715-b may include a second set of decoding candidates 720-b. Each of the monitoring occasions 715 may include a subset of decoding candidates 720 which are configured for intra-carrier scheduling (e.g., self-scheduling), and a subset of decoding candidates which are configured for cross-carrier scheduling.

In this regard, control signaling performed over the first subsets of decoding candidates configured for intra-carrier scheduling may be used to schedule communications over the scheduling component carrier 705-a, whereas control signaling performed over the second subsets of decoding candidates configured for cross-carrier scheduling may be used to schedule communications over the scheduled component carrier 705-b. In some aspects, decoding candidates within the sets of decoding candidates 720-a, 720-b which are configured for intra-carrier scheduling may be associated with a first CIF value (e.g., CIF=0), whereas decoding candidates within the sets of decoding candidates 720-a, 720-b which are configured for cross-carrier scheduling may be associated with a second CIF value (e.g., CIF=1).

In some aspects, the first search space set 710-e (e.g., searchSpaceId 1) and the second search space set 710-f (e.g., searchSpaceId 4) of the scheduled component carrier 705-b may be linked together for control channel repetition. That is, multiple repetitions of the same control message (e.g., same DCI message) may be used to schedule communications within the first and second search space sets 710-e, 710-f, of the scheduled component carrier 705-b.

In some aspects, the first search space set 710-a (e.g., searchSpaceId 1) and the second search space set 710-b (e.g., searchSpaceId 4) of the scheduling component carrier 705-a may not be linked together (e.g., may be unlinked) for control channel repetition despite the first and second search space sets 710-e, 710-f of the scheduled component carrier 705-b being linked for control channel repetition.

In such cases, decoding candidates which are configured for intra-carrier scheduling (e.g., CIF=0) within the monitoring occasions 715-a, 715-b of the linked search space sets 710-a, 710-b of the scheduling component carrier 705-a may be unlinked for control channel repetition. As such, repetitions of the same control message which schedule communications over the scheduling component carrier 705-a are not capable of being transmitted/received within the unlinked decoding candidates of the first and second monitoring occasions 715-a, 715-b. The UE 115 may therefore be configured to individually monitor the unlinked decoding candidates which are configured for self-scheduling. Moreover, because the decoding candidates configured for self-scheduling are unlinked, the first and second monitoring occasions 715-a, 715-b associated with the first and second search space sets 710-a, 710-b may include a different number of decoding candidates which are configured for self-scheduling, as shown in FIG. 7.

Comparatively, the decoding candidates which are configured for cross-carrier scheduling (e.g., CIF=1) within the monitoring occasions 715-a, 715-b of the linked search space sets 710-a, 710-b may be linked for control channel repetition. In other words, multiple repetitions of the same control message which schedule a communication over the scheduled component carrier 705-b may be transmitted/received within the linked decoding candidates configured for cross-carrier scheduling. In particular, sets of decoding candidates within the first and second monitoring occasions 715-a, 715-b may be linked for control channel repetition for cross-carrier scheduling based on the sets of decoding candidates being associated with the same CIF value, the same candidate index, and the same aggregation level.

As such, the UE 115 may expect that the first and second search space sets 710-a, 710-b in the scheduling component carrier 705-a to be configured with the same DCI formats to monitor, the same periodicity, the same slot offset (e.g., for intra-slot repetition), and the sane number of monitoring occasions per slot. Moreover, the UE 115 may be configured to monitor the linked decoding candidates which are configured for cross-carrier scheduling for the repetitions of the same control message (e.g., DCI message) which schedules communications within the scheduled component carrier 705-b (e.g., within the first and second search space sets 710-e, 710-f of the scheduled component carrier 705-b).

Due to the fact that the decoding candidates configured for cross-carrier scheduling within the monitoring occasions 715-a, 715-b are linked for control channel repetition, the first and second search space sets 710-a, 710-b of the scheduling component carrier 705-a may be configured with the same number of decoding candidates configured for cross-carrier scheduling for each aggregation level. For example, as shown in the resource configuration 700, the first and second monitoring occasion 715-a, 715-b may include a same number of decoding candidates configured for cross-carrier scheduling (e.g., one-to-one mapping of cross-carrier decoding candidates).

Figure 8:
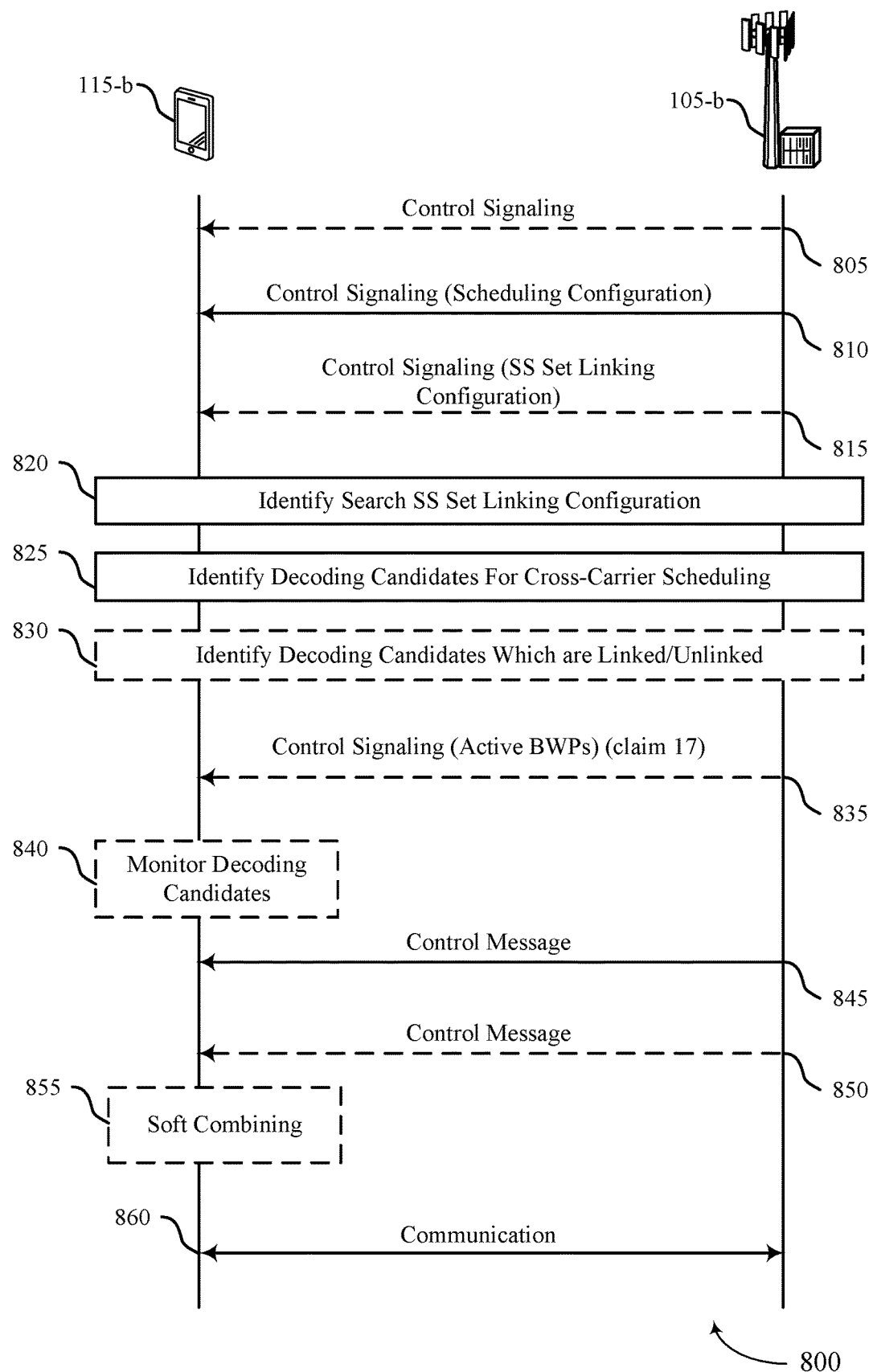
FIG. 8 illustrates an example of a process flow that supports techniques for control channel repetition for cross-carrier scheduling in accordance with aspects of the present disclosure.

FIG. 8 illustrates an example of a process flow 800 that supports techniques for control channel repetition for cross-carrier scheduling in accordance with aspects of the present disclosure. In some examples, process flow 800 may implement, or be implemented by, aspects of wireless communications systems 100, resource configuration 200, resource configuration 300, wireless communications system 400, resource configuration 500, resource configuration 600, resource configuration 700, or any combination thereof. For example, the process flow 800 may illustrate a UE 115-b receiving a scheduling configuration for cross-carrier scheduling of a first component carrier, receiving at least one repetition of a control message in accordance with the scheduling configuration, and performing a communication scheduled by the at least one repetition of the control message over the first component carrier, as described with reference to FIGS. 1-7.

In some cases, process flow 800 may include a UE 115-b and a base station 105-b, which may be examples of corresponding devices as described herein. In particular, the UE 115-b and the base station 105-b illustrated in FIG. 8 may include examples of the UE 115-a and the base station 105-a illustrated in FIG. 4.

In some examples, the operations illustrated in process flow 800 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 805, the UE 115-b may receive control signaling (e.g., RRC message, DCI message) from the base station 105-b. In some aspects, the control signaling may indicate sets of component carriers (e.g., cell groups) which are configured for cross-carrier scheduling. In particular, the control signaling may indicate sets of component carriers which are configured for cross-carrier scheduling via control channel repetition (e.g., PDCCH repetition).

For example, the UE 115-b may receive RRC signaling which indicates a set of component carriers (e.g., cell group) including a scheduled component carrier which are configured for cross-carrier scheduling via control channel repetition. By way of another example, the UE 115-b may receive RRC signaling which indicates a set of component carriers including a scheduled component carrier which are configured for cross-carrier scheduling via control channel repetition on a scheduling component carrier. In this regard, the RRC signaling may indicate that cross-carrier scheduling via control channel repetition on the specified scheduling component carrier applies to all component carrier within the set of component carriers (e.g., within the cell group). Additionally, or alternatively, the control signaling may indicate that the set of component carriers are configured for cross-carrier scheduling via control channel repetition on a given BWP (e.g., downlink BWP) of the scheduling component carrier. In other cases, the control signaling may indicate that search space sets within a downlink BWP of the scheduled component carrier are configured for cross-carrier scheduling via control channel repetition.

At 810, the UE 115-b may receive, from the base station 105-b, control signaling (e.g., RRC message, DCI message) identifying a scheduling configuration for scheduling communications at the UE 115-b. In some aspects, the scheduling configuration may indicate a first search space set and a second set of a scheduling component carrier which are usable for scheduling communications on a scheduled component carrier. In this regard, the scheduling configuration may indicate a configuration for cross-carrier scheduling, where a scheduled component carrier may be scheduled via communications received over search space sets of a scheduling component carrier. The scheduling configuration may indicate any quantity of search space sets on the scheduling component carrier which may be used to schedule communications over the scheduled component carrier.

In some aspects, the search space sets of the scheduling component carrier may include decoding candidates which are allocated for cross-carrier scheduling, intra-carrier scheduling, or both. The decoding candidates may be associated with CIF values which indicate whether the respective decoding candidates are configured for cross-carrier or intra-carrier scheduling. For example, decoding candidates associated with a first CIF value (e.g., CIF=0) may be configured for intra-carrier scheduling (e.g., schedule communications over the scheduling component carrier), whereas decoding candidates associated with a second CIF value (e.g., CIF=1) may be configured for cross-carrier scheduling (e.g., schedule communications over the scheduled component carrier).

The UE 115-b may receive the control signaling indicating the scheduling configuration at 810 based on receiving the control signaling at 805. Additionally, or alternatively, the control signaling shown at 805 and the control signaling shown at 810 may be communicated within the same control signaling (e.g., via the same RRC message). Moreover, in some cases, the UE 115-b may be configured (e.g., pre-configured) with the scheduling configuration, and may therefore be configured to identify the scheduling configuration without control signaling from the base station 105-*b*.

In some aspects, the control signaling at 810 may further indicate one or more parameters associated with the scheduling configuration, including sets of monitoring occasions associated with each search space set, search space set indexes associated with search space sets on the scheduling component carrier and/or scheduled component carrier, BWPs associated with the respective search space sets, and the like.

For example, the control signaling at 810 may indicate a first search space set index associated with the first search space set of the scheduling component carrier and a second search space set index associated with the second search space set of the scheduling component carrier. By way of another example, the control signaling including the scheduling configuration may indicate search space set indexes associated with a third search space set and a fourth search space set of the scheduled component carrier. Search space sets of the scheduled component carrier may be associated with the same or different search space set indexes as the search space sets of the scheduling component carrier. For instance, continuing with the same examples above, the first search space set of the scheduling component carrier and the third search space set of the scheduled component carrier may be associated with the same search space set index, and the second search space set of the scheduling component carrier and the fourth search space set of the scheduled component carrier may be associated with the same search space set index.

In some aspects, the control signaling indicating the scheduling configuration may additionally or alternatively indicate BWPs of the respective search space sets of the scheduling component carrier, the scheduled component carrier, or both. For example, the control signaling may indicate that the first search space set and the second search space set of the scheduling component carrier are configured within a first BWP of the scheduling component carrier. Similarly, the control signaling may indicate that at least two search space sets of the scheduled component carrier (e.g., third and fourth search space sets) are configured within a second BWP of the scheduled component carrier. In some aspects, the first BWP of the scheduling component carrier and the second BWP of the scheduled component carrier may be different.

At 815, the UE 115-*b* may receive, from the base station 105-*b* control signaling (e.g., RRC message, DCI message) indicating a search space set linking configuration for a set of search space sets of the scheduled component carrier. The UE 115-*b* may receive the control signaling indicating the search space set linking configuration at 815 based on receiving the control signaling at 805, the control signaling including the scheduling configuration at 810, or both. Additionally, or alternatively, the control signaling shown at 805, 810, 815, or any combination thereof, may be communicated within the same control signaling (e.g., via the same RRC message). Moreover, in some cases, the UE 115-*b* may be configured (e.g., pre-configured) with the search space set linking configuration.

At 820, the UE 115-*b*, the base station 105-*b*, or both, may identify the search space set linking configuration. In some aspects, the UE 115-*b* and/or the base station 105-*b* may identify the search space set linking configuration based on transmitting/receiving the control singling indicating the search space set linking configuration at 815. Additionally, or alternatively, the UE 115-*b* may identify the search space set linking configuration at 820 based on transmitting/receiving the control signaling at 805, transmitting/receiving the control signaling at 810, or both. Moreover, in some cases, the UE 115-*b* may be configured (e.g., pre-configured) with the search space set linking configuration, and may therefore be configured to identify the search space set linking configuration without control signaling from the base station 105-*b*.

In some aspects, the search space set linking configuration may indicate whether the search space sets on the scheduled component carrier are linked or unlinked for control channel repetition. That is, the search space set linking configuration may indicate whether control channel repetition over the search space sets of the scheduling component carrier may be used to schedule communications within the search space sets of the scheduled component carrier. If two or more search space sets on the scheduled component carrier are linked for control channel repetition, then control channel repetition on the scheduling component carrier may be used to schedule communications on the two or more search space sets of the scheduled component carrier. Conversely, if two or more search space sets on the scheduled component carrier are not linked (e.g., unlinked) for control channel repetition, then control channel repetition on the scheduling component carrier may not be used to schedule communications on the two or more search space sets of the scheduled component carrier. In some aspects, due to the fact that the scheduled component carrier is scheduled via control signaling on the scheduling component carrier, search space sets of the scheduled component carrier may not actually be monitored by the UE 115-*b*, and may therefore be referred to as "dummy" search space sets.

Accordingly, by identifying the search space set linking configuration, the UE 115-*b* and the base station 105-*b* may be configured to identify whether search space sets of the scheduled component carrier are linked or unlinked for control channel repetition. In some aspects, the UE 115-*b* and/or the base station 105-*b* may identify whether search space sets of the scheduled component carrier are linked or unlinked for control channel repetition based on explicit signaling, the scheduling configuration, based on search space set indexes associated with search space sets of the scheduling and/or scheduled component carrier, quantities of decoding candidates per aggregation level, pre-defined rules, or any combination thereof.

For example, in some cases, the UE 115-*b* and/or the base station 105-*b* may identify that two or more search space sets of the scheduled component carrier are linked for control channel repetition based on the scheduling configuration indicating that the first search space set and the second search space set of the scheduling component carrier being linked for control channel repetition. In other words, the search space sets of the scheduled component carrier may be linked (or unlinked) for PDCCH repetition based on the search space sets of the scheduling component carrier being linked (or unlinked) for PDCCH repetition. In other implementations, the search space sets of the scheduled component carrier may not be linked for control channel repetition despite the search space sets of the scheduling component carrier being linked for control channel repetition. In such cases, the UE 115-*b* and/or the base station 105-*b* may determine that two or more search space sets of the scheduled component carrier are not linked (e.g., unlinked) for control channel repetition despite the scheduling configuration indicating that the first and second search space sets of the scheduling component carrier are linked for control channel repetition.

Additionally, or alternatively, the UE 115-*b* and/or the base station 105-*b* may identify that search space sets of the scheduled component carrier are linked for control channel repetition based on search space sets within the scheduling and scheduled component carriers being associated with common search space set indexes. For example, the UE 115-*b* and/or the base station 105-*b* may identify that two or more search space sets of the scheduled component carrier are linked for control channel repetition based on the two or more search space sets being associated with search space set indexes that are respectively the same as the search space set indexes for the search space sets of the scheduling component carrier. For instance, the first and second search space sets of the scheduling component carrier may be associated with first and second search space set indexes, respectively. In this example, the UE 115-*b* may determine that a third and fourth search space set of the scheduled component carrier are linked for control channel repetition based on determining that the third and fourth search space sets are associated with the first and second search space set indexes, respectively.

In some aspects, the UE 115-*b* and/or the base station 105-*b* may determine whether search space sets of the scheduled component carrier are linked or unlinked for control channel repetition based on quantities of decoding candidates per aggregation level within the respective search space sets. For example, the UE 115-*b* and/or the base station 105-*b* may identify that a third search space set and a fourth search space set of the scheduled component carrier are linked for control channel repetition based on the third and fourth search space sets being configured with a same quantity of decoding candidates per aggregation level. In other words, the third and fourth search space sets may be linked for PDCCH repetition based on the respective search space sets having a one-to-one mapping of decoding candidates within each aggregation level.

At 825, the UE 115-*b*, the base station 105-*b*, or both, may identify a set of decoding candidates within the first and second search space sets of the scheduling component carrier which are allocated for cross-carrier scheduling of the scheduled component carrier. As noted previously herein, the search space sets of the scheduling component carrier may include decoding candidates which are allocated for cross-carrier scheduling, intra-carrier scheduling, or both. In this regard, at 825, the UE 115-*b* and/or base station 105-*b* may be configured to identify which decoding candidates of the first and second search space sets of the scheduling component carrier are allocated for cross-carrier scheduling of the scheduled component carrier.

The UE 115-*b* and/or the base station 105-*b* may identify the set of decoding candidates which are allocated for cross-carrier scheduling of the scheduled component carrier based on the search space set linking configuration, the scheduling configuration, or both. In this regard, the UE 115-*b* and/or the base station 105-*b* may identify the set of decoding candidates which are allocated for cross-carrier scheduling at 825 based on transmitting/receiving the control signaling at 805, 810, 815, or any combination thereof.

At 830, the UE 115-*b*, the base station 105-*b*, or both, may identify decoding candidates (e.g., sets or pairs of decoding candidates) within the search space sets of the scheduling component carrier which are linked (or unlinked) for control channel repetition. In particular, in cases where the scheduling configuration indicates a first and second search space set of the scheduling component carrier which are configured for cross-carrier scheduling, the UE 115-*b* and/or the base station 105-*b* may identify decoding candidates within the first and second search space sets which are linked or unlinked for control channel repetition.

The UE 115-*b*, the base station 105-*b*, or both, may identify sets, or pairs, of decoding candidates which are linked for control channel repetition at 830 based on the scheduling configuration, the search space set linking configuration, or both. As such, the UE 115-*b* and/or the base station 105-*b* may identify decoding candidates which are linked for control channel repetition based on transmitting/receiving the control signaling at 805, 810, and/or 815, identifying the search space set linking configuration at 820, identifying decoding candidates configured for cross-carrier scheduling at 825, or any combination thereof.

Additionally, or alternatively, the UE 115-*b* and/or the base station 105-*b* may identify decoding candidates (e.g., sets or pairs of decoding candidates) which are linked for control channel repetition based on one or more parameters associated with the respective decoding candidates and/or search space sets, including CIF values of the decoding candidates, candidate indexes, aggregation levels, and the like. In particular, the UE 115-*b* and/or the base station 105-*b* may determine that sets/pairs of decoding candidates are linked or unlinked for cross-carrier scheduling and/or intra-carrier scheduling.

For example, the UE 115-*b* may determine that a pair of decoding candidates within the first and second search space sets of the scheduling component carrier (e.g., pair of decoding candidates including a first and a second decoding candidate in the first and second search space sets, respectively) are linked for control channel repetition based on the pair of decoding candidates corresponding to a same CIF value (e.g., scheduling the same component carrier), a same candidate index, a same aggregation level, or any combination thereof. Conversely, the UE 115-*b* may determine that a pair of decoding candidates within the first and second search space sets of the scheduling component carrier are unlinked for control channel repetition based on the pair of decoding candidates corresponding to a different CIF values (e.g., scheduling different component carriers), different candidate indexes, different aggregation levels, or any combination thereof.

In some aspects, sets/pairs of decoding candidates within the first and second search space sets of the scheduling component carrier may be linked for both intra-carrier scheduling and cross-carrier scheduling. In other cases, sets/pairs of decoding candidates within the first and second search space sets of the scheduling component carrier may be linked for intra-carrier scheduling, but not for cross-carrier scheduling (e.g., unlinked for cross-carrier scheduling). Conversely, in other cases, sets/pairs of decoding candidates within the first and second search space sets of the scheduling component carrier may be linked for both cross-carrier scheduling, but not for intra-carrier scheduling (e.g., unlinked for intra-carrier scheduling).

At 835, the UE 115-*b* may receive, from the base station 105-*b*, control signaling indicating active BWPs. In particular, the UE 115-*b* may receive control signaling which indicates active BWPs in each of the scheduling component carrier and the scheduled component carrier. The control signaling used to indicate active BWPs may include a DCI message, a MAC-CE message, or both. The UE 115-*b* may receive the control signaling indicating the active BWPs at 835 based on receiving the control signaling at 805, 810, and/or 815, identifying the search space set linking configuration at 820, identifying the decoding candidates configured for cross-carrier scheduling at 825, identifying the decoding candidates which are linked/unlinked at 830, or any combination thereof. Additionally, or alternatively, the control signaling received at 805, 810, and/or 815 may indicate active BWPs within the scheduling and scheduled component carriers.

As noted previously herein, the scheduling configuration may indicate BWPs associated with the search space sets within the scheduling and scheduled component carriers. Moreover, the UE 115-*b* and/or base station 105-*b* may only be configured schedule communications over the search space sets of the scheduled component carrier via control channel repetition over search space sets of the scheduling component carrier if the BWPs associated with the search space sets of both the scheduling and scheduled component carriers are active. That is, in some implementations, cross-carrier scheduling via control channel repetition may only be performed if BWPs for the linked search space sets are active on both the scheduling component carrier and the scheduled component carrier.

For example, the scheduling configuration may indicate a first search space set and a second search space set of the scheduling component carrier which are configured for cross-carrier scheduling. Additionally, the search space set linking configuration may indicate that a third search space set and a fourth search space set of the scheduled component carrier are linked for control channel repetition (e.g., may be scheduled via PDCCH repetition via the first and second search space sets). In this example, the control signaling at 835 may indicate that a first BWP associated with the first and second search space sets of the scheduling component carrier is active, and that a second BWP associated with the third and fourth search space sets of the scheduled component carrier is active. In this example, cross-carrier scheduling of the scheduled component carrier may be performed via PDCCH repetition on the scheduling component carrier based on the first and second BWPs on the scheduling and scheduled component carriers both being active.

At 840, the UE 115-*b* may monitor decoding candidates within the search space sets of the scheduling component carrier. In particular, the UE 115-*b* may monitor decoding candidates within the search space sets of the scheduling component carrier for one or more repetitions of a control message which schedule communications over the scheduled component carrier based on the scheduling configuration and/or the search space set linking configuration. In this regard, the UE 115-*b* may monitor the decoding candidates based on (e.g., in accordance with) the scheduling configuration, the search space set linking configuration, or both.

As such, the UE 115-*b* may monitor the decoding candidates within the scheduling component carrier at 840 based on receiving the control signaling at 805, 810, and/or 815, identifying the search space set linking configuration at 820, identifying the decoding candidates configured for cross-carrier scheduling at 825, identifying the decoding candidates which are linked/unlinked at 830, receiving the control signaling at 835, or any combination thereof.

Additionally, or alternatively, the UE 115-*b* may monitor the decoding candidates within the search space sets of the scheduling component carrier based on determining that the decoding candidates are linked (or unlinked) for cross-carrier and/or intra-carrier scheduling, based on determining that the search spaces sets of the scheduling component carrier and the scheduled component carrier are linked or unlinked for control channel repetition, based on the BWPs of the respective search space sets being active within both the scheduling and scheduled component carriers, or any combination thereof.

For example, the first and second search space sets within the scheduling component carrier which are linked for control channel repetition may include first and second decoding candidates, respectively, which are linked for cross-carrier scheduling and control message repetition. In this example, the UE 115-*b* may monitor the first and second decoding candidates for one or more repetitions of a control message (e.g., one or more repetitions of the same control message) which schedule a communication over the scheduled component carrier. By way of another example, the first and second search space sets within the scheduling component carrier which may be unlinked for control channel repetition and may include first and second decoding candidates, respectively. In this example, the UE 115-*b* may monitor the first decoding candidate for a first control message and the second decoding candidate for a second control message which is different from the first decoding candidate based on the first and second search space sets being unlinked for control channel repetition.

At 845, the UE 115-*b* may receive, from the base station 105-*b*, a first control message (e.g., first repetition of a control message). In some aspects, the control message may schedule a communication between the UE 115-*b* and the base station 105-*b* over the scheduled component carrier. The communication scheduled by the control message may include a PDSCH transmission, a PUSCH transmission, or both. As such, the control message may indicate an SPS release and/or a configured grant release (e.g., uplink Type 2 configured grant) on the scheduled component carrier. The control message may include a DCI message (e.g., DCI formats 0_1, 0_2, 1_1, and/or 1_2).

In some aspects, the UE 115-*b* may receive the first control message (e.g., first repetition of the control message) within a decoding candidate of a search space set associated with the scheduling component carrier. Moreover, the UE 115-*b* may receive the first repetition of the control message within a first decoding candidate of a first search space set which is linked to a second decoding candidate of a second search space which is liked or unlinked to the first search space set for control channel repetition. In this regard, the UE 115-*b* may receive the first repetition of the control message based on (e.g., in accordance with) the scheduling configuration and/or the search space set linking configuration. As such, the UE 115-*b* may receive the first repetition of the control message at 845 based on receiving the control signaling at 55, 810, and/or 815, identifying the search space set linking configuration at 820, identifying the decoding candidates for cross-carrier scheduling at 825, identifying the decoding candidates which are linked or unlinked at 830, receiving the control signaling at 835, monitoring the decoding candidates at 840, or any combination thereof.

At 850, the UE 115-*b* may receive, from the base station 105-*b*, a second control message (e.g., second repetition of the control message). In some aspects, the second control message may schedule a communication (e.g., PDSCH/SPS release, PDSCH/configured grant release) between the UE 115-*b* and the base station 105-*b* over the first component carrier (e.g., scheduled component carrier). The control message may include a DCI message (e.g., DCI formats 0_1, 0_2, 1_1, and/or 1_2).

The control messages received at 845 and 850 may include same or different payloads based on whether the search space sets and decoding candidates of the scheduling component carrier are linked or unlinked for control channel repetition. For example, in cases where the search space sets of the scheduling component carrier are linked for control channel repetition, the second repetition of the control message received at 850 may include a same data payload, and may schedule the same communication, as compared to the first repetition of the control message received at 845. By way of another example, in cases where the search space sets of the scheduling component carrier are unlinked for control channel repetition, the second repetition of the control message received at 850 may include a different data payload, and may schedule a different communication, as compared to the first repetition of the control message received at 845.

In some aspects, the UE 115-*b* may receive the second control message (e.g., second repetition of the control message) within a decoding candidate of a search space set associated with the scheduling component carrier. Moreover, the UE 115-*b* may receive the second repetition of the control message within a second decoding candidate of a second search space set which is linked to a first decoding candidate of a first search space which is liked or unlinked to the first search space set for control channel repetition. In this regard, the UE 115-*b* may receive the second repetition of the control message based on (e.g., in accordance with) the scheduling configuration and/or the search space set linking configuration. As such, the UE 115-*b* may receive the second repetition of the control message at 845 based on receiving the control signaling at 55, 810, and/or 815, identifying the search space set linking configuration at 820, identifying the decoding candidates for cross-carrier scheduling at 825, identifying the decoding candidates which are linked or unlinked at 830, receiving the control signaling at 835, monitoring the decoding candidates at 840, receiving the first control message at 845, or any combination thereof.

In some cases, the UE 115-*b* may receive both the first and second repetitions of the control message at 845 and 850, respectively. In other cases, the UE 115-*b* may receive only one of the first or second repetition of the control message. In cases where the UE 115-*b* receives only the first or second repetition of the control message, the UE 115-*b* may demodulate/decode the single received repetition of the control message. In other cases where the UE 115-*b* receives both the first and second repetitions of the control message, the UE 115-*b* may demodulate/decode only one of the first or second repetitions of the control message. Additionally, or alternatively, the UE 115-*b* may combine the first and second repetitions of the control message, as described at 855 of process flow 800.

At 860, the UE 115-*b* may perform soft combining of the first and second repetitions of the control message received at 845 and 850. In some aspects, the UE 115-*b* may perform soft combining (e.g., perform one or more soft combining procedures) in order to demodulate/decode the repetitions of the control message. In particular, the UE 115-*b* may perform soft combining of a first signal (e.g., first repetition of the control message) received at 845 with a second signal (e.g., second repetition of the control message) received at 850.

At 860, the UE 115-*b* may perform (e.g., transmit, receive) the communication which was scheduled by the one or more control messages over the scheduled component carrier. For example, in cases where the scheduled communication includes a PUSCH transmission, the UE 115-*a* may transmit the scheduled PUSCH transmission to the base station 105-*b* at 860 over the scheduled component carrier. By way of another example, example, in cases where the scheduled communication includes a PDSCH transmission, the UE 115-*a* may receive the scheduled PDSCH transmission from the base station 105-*b* at 860 over the scheduled component carrier.

The UE 115-*b* and the base station 105-*b* may perform the scheduled communication at 860 based on receiving the control signaling at 55, 810, and/or 815, identifying the search space set linking configuration at 820, identifying the decoding candidates for cross-carrier scheduling at 825, identifying the decoding candidates which are linked or unlinked at 830, receiving the control signaling at 835, monitoring the decoding candidates at 840, receiving the control message(s) at 845 and/or 850, performing the soft combining at 855, or any combination thereof.

Techniques described herein may provide for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 9:
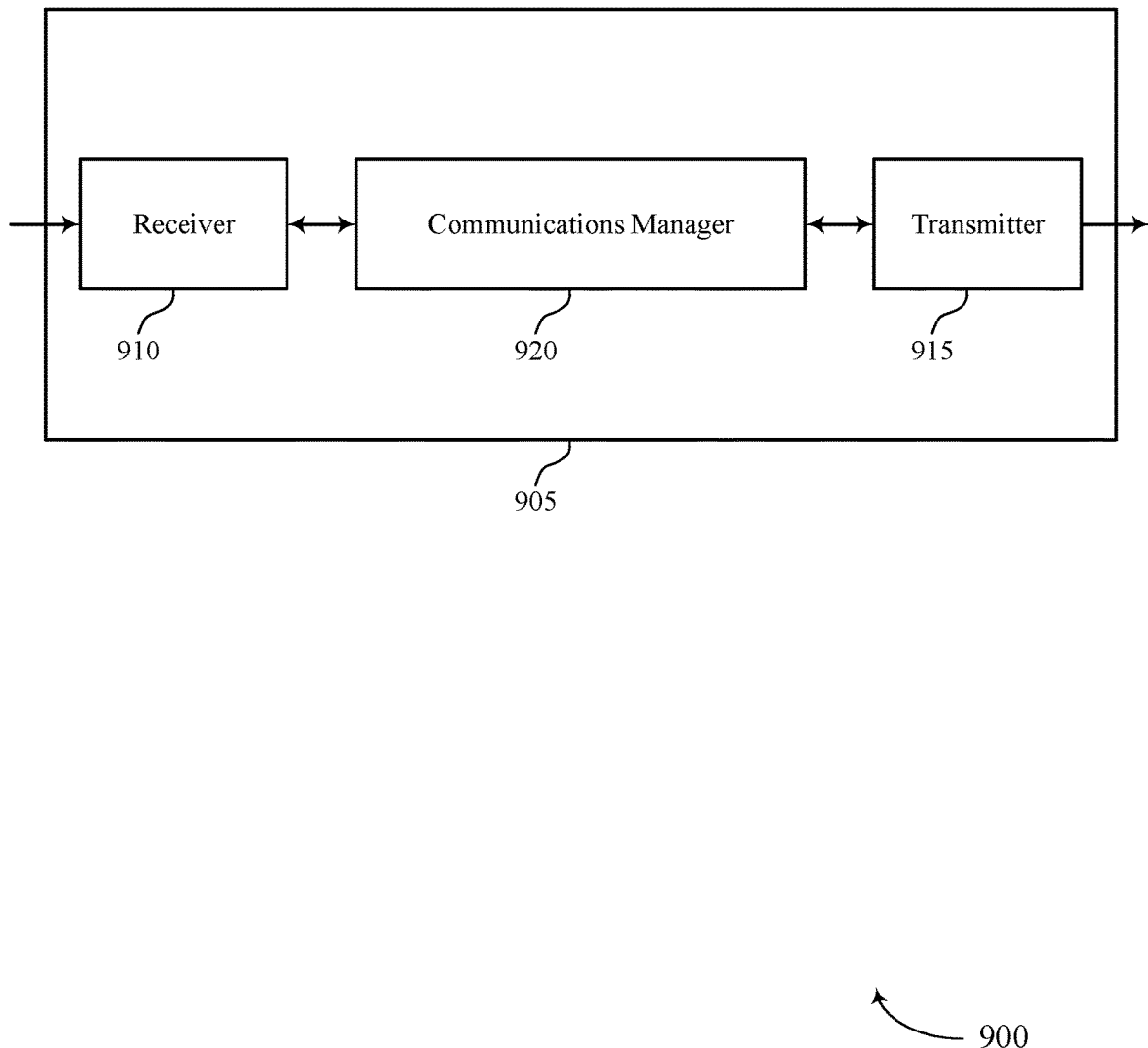
FIGS. 9 and 10 show block diagrams of devices that support techniques for control channel repetition for cross-carrier scheduling in accordance with aspects of the present disclosure.

FIG. 9 shows a block diagram 900 of a device 905 that supports techniques for control channel repetition for cross-carrier scheduling in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for control channel repetition for cross-carrier scheduling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for control channel repetition for cross-carrier scheduling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for control channel repetition for cross-carrier scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a base station, control signaling identifying a scheduling configuration indicating a first search space set and a second search space set of a scheduling component carrier for scheduling communications on a scheduled component carrier that is different from the scheduling component carrier. The communications manager 920 may be configured as or otherwise support a means for identifying a search space set linking configuration for a set of multiple search space sets of the scheduled component carrier based on the scheduling configuration. The communications manager 920 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The communications manager 920 may be configured as or otherwise support a means for receiving, from the base station and within at least one decoding candidate of the set of decoding candidates, at least one control message via the scheduling component carrier that schedules a communication between the base station and the UE via the scheduled component carrier. The communications manager 920 may be configured as or otherwise support a means for transmitting or receiving the communication with the base station via the scheduled component carrier based on the at least one control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 10:
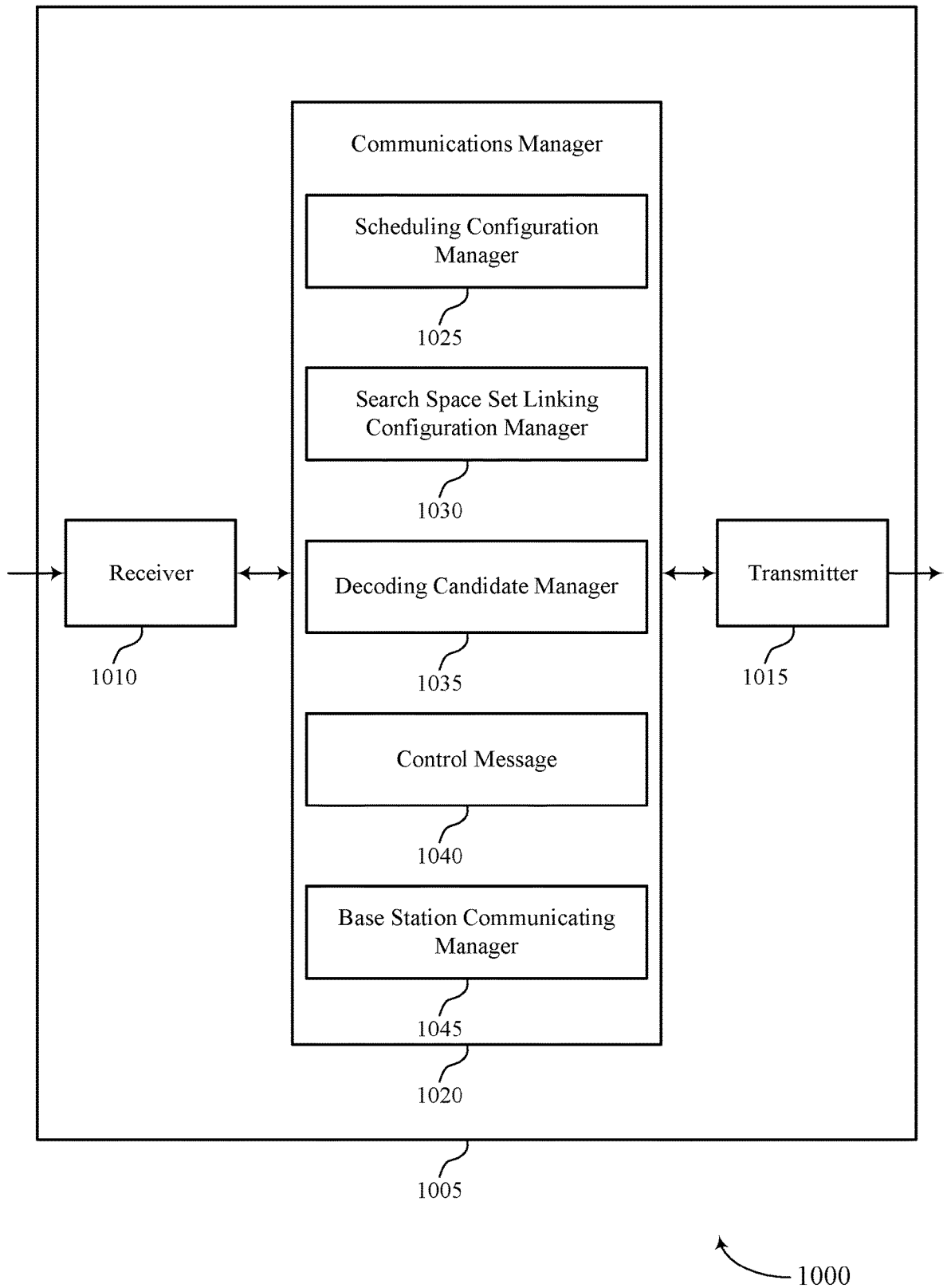

FIG. 10 shows a block diagram 1000 of a device 1005 that supports techniques for control channel repetition for cross-carrier scheduling in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for control channel repetition for cross-carrier scheduling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for control channel repetition for cross-carrier scheduling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for control channel repetition for cross-carrier scheduling as described herein. For example, the communications manager 1020 may include a scheduling configuration manager 1025, a search space set linking configuration manager 1030, a decoding candidate manager 1035, a control message 1040, a base station communicating manager 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The scheduling configuration manager 1025 may be configured as or otherwise support a means for receiving, from a base station, control signaling identifying a scheduling configuration indicating a first search space set and a second search space set of a scheduling component carrier for scheduling communications on a scheduled component carrier that is different from the scheduling component carrier. The search space set linking configuration manager 1030 may be configured as or otherwise support a means for identifying a search space set linking configuration for a set of multiple search space sets of the scheduled component carrier based on the scheduling configuration. The decoding candidate manager 1035 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The control message 1040 may be configured as or otherwise support a means for receiving, from the base station and within at least one decoding candidate of the set of decoding candidates, at least one control message via the scheduling component carrier that schedules a communication between the base station and the UE via the scheduled component carrier. The base station communicating manager 1045 may be configured as or otherwise support a means for transmitting or receiving the communication with the base station via the scheduled component carrier based on the at least one control message.

Figure 11:
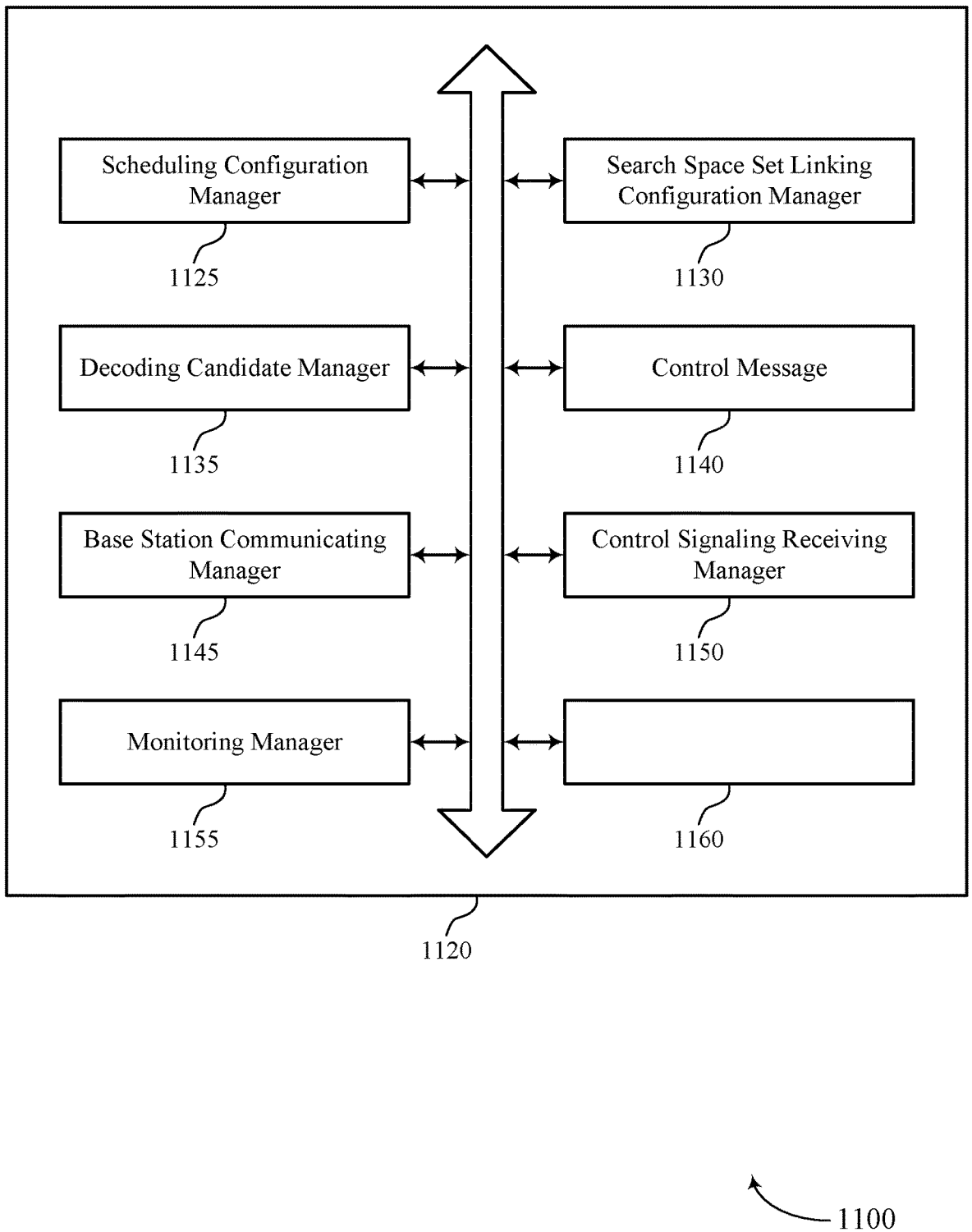
FIG. 11 shows a block diagram of a communications manager that supports techniques for control channel repetition for cross-carrier scheduling in accordance with aspects of the present disclosure.

FIG. 11 shows a block diagram 1100 of a communications manager 1120 that supports techniques for control channel repetition for cross-carrier scheduling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for control channel repetition for cross-carrier scheduling as described herein. For example, the communications manager 1120 may include a scheduling configuration manager 1125, a search space set linking configuration manager 1130, a decoding candidate manager 1135, a control message 1140, a base station communicating manager 1145, a control signaling receiving manager 1150, a monitoring manager 1155, or any combination thereof. Each of these components may communicate, directly or indirectly, with one another (e.g., via one or more buses).

The communications manager 1120 may support wireless communication at a UE in accordance with examples as disclosed herein. The scheduling configuration manager 1125 may be configured as or otherwise support a means for receiving, from a base station, control signaling identifying a scheduling configuration indicating a first search space set and a second search space set of a scheduling component carrier for scheduling communications on a scheduled component carrier that is different from the scheduling component carrier. The search space set linking configuration manager 1130 may be configured as or otherwise support a means for identifying a search space set linking configuration for a set of multiple search space sets of the scheduled component carrier based on the scheduling configuration. The decoding candidate manager 1135 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The control message 1140 may be configured as or otherwise support a means for receiving, from the base station and within at least one decoding candidate of the set of decoding candidates, at least one control message via the scheduling component carrier that schedules a communication between the base station and the UE via the scheduled component carrier. The base station communicating manager 1145 may be configured as or otherwise support a means for transmitting or receiving the communication with the base station via the scheduled component carrier based on the at least one control message.

In some examples, to support identifying the search space set linking configuration, the search space set linking configuration manager 1130 may be configured as or otherwise support a means for receiving, from the base station, additional control signaling indicating the search space set linking configuration. In some examples, to support identifying the search space set linking configuration, the search space set linking configuration manager 1130 may be configured as or otherwise support a means for identifying that at least two search space sets of the set of multiple search space sets of the scheduled component carrier are linked for control channel repetition based on the scheduling configuration indicating that the first search space set and the second search space set of the scheduling component carrier are linked for control channel repetition.

In some examples, the 1160 may be configured as or otherwise support a means for monitoring a first decoding candidate within the first search space set for a repetition of the control message and a second decoding candidate, that is linked to the first decoding candidate, within the second search space set for a repetition of the control message based on the at least two search space sets being linked for control channel repetition.

In some examples, to support identifying the search space set linking configuration, the search space set linking configuration manager 1130 may be configured as or otherwise support a means for identifying that at least two search space sets of the set of multiple search space sets of the scheduled component carrier are linked for control channel repetition based on the at least two search space sets being associated with first and second search space set indexes that are respectively the same as first and second search space set indexes of the first and second search space sets of the scheduling component carrier.

In some examples, to support identifying the search space set linking configuration, the search space set linking configuration manager 1130 may be configured as or otherwise support a means for identifying that at least two search space sets of the set of multiple search space sets of the scheduled component carrier are linked for control channel repetition based on the at least two search space sets being configured with a same quantity of decoding candidates per aggregation level.

In some examples, the at least one decoding candidate of the set of decoding candidates includes a pair of decoding candidates, and the decoding candidate manager 1135 may be configured as or otherwise support a means for identifying that the pair of decoding candidates are linked for control channel repetition based on the pair of the decoding candidates corresponding to a same CIF, a same candidate index, and a same aggregation level. In some examples, the decoding candidate manager 1135 may be configured as or otherwise support a means for identifying that a third set of monitoring occasions within the first search space set of the scheduling component carrier and a fourth set of monitoring occasions within the second search space set of the scheduling component carrier are unlinked for control channel repetition for intra-carrier scheduling.

In some examples, to support identifying the search space set linking configuration, the search space set linking configuration manager 1130 may be configured as or otherwise support a means for identifying that at least two search space sets of the set of multiple search space sets of the scheduled component carrier are unlinked for control channel repetition.

In some examples, the monitoring manager 1155 may be configured as or otherwise support a means for monitoring a first decoding candidate of the first search space set for the control message and a second decoding candidate of the second search space set for a second control message that differs from the control message based on identifying that the at least two search space sets of the set of multiple search space sets of the scheduled component carrier are unlinked for control channel repetition.

In some examples, the decoding candidate manager 1135 may be configured as or otherwise support a means for identifying, based on the search space set linking configuration, that a first decoding candidate of the first search space set is unlinked for control channel repetition to a second decoding candidate of the second search space set for cross-carrier scheduling on the scheduled component carrier. In some examples, the decoding candidate manager 1135 may be configured as or otherwise support a means for identifying, based on the search space set linking configuration, that a third decoding candidate of the first search space set is linked for control channel repetition to a fourth decoding candidate of the second search space set for intra-carrier scheduling on the scheduling component carrier.

In some examples, the scheduling configuration manager 1125 may be configured as or otherwise support a means for receiving the control signaling that indicates a first set of one or more monitoring occasions for the first search space set and a second set of one or more monitoring occasions for the second search space set. In some examples, to support receiving the control signaling identifying the scheduling configuration, the scheduling configuration manager 1125 may be configured as or otherwise support a means for receiving the control signaling indicating a first search space set index associated with the first search space set of the scheduling component carrier and a second search space set index associated with the second search space set of the scheduling component carrier.

In some examples, a third search space set and a fourth search space set of the set of multiple search space sets of the scheduled component carrier are associated with the first search space set index and the second search space set index, respectively. In some examples, the search space set linking configuration indicates that the third search space set and the fourth search space set are linked or unlinked for control channel repetition based on the first search space set and the second search space set being linked for control channel repetition.

In some examples, to support receiving the control signaling identifying the scheduling configuration, the scheduling configuration manager 1125 may be configured as or otherwise support a means for receiving the control signaling indicating that at least two search space sets of the set of multiple search space sets of the scheduled component carrier are configured within a first BWP of the scheduled component carrier and that the first search space set and the second search space set of the scheduling component carrier are configured within a second BWP of the scheduling component carrier.

In some examples, the control signaling receiving manager 1150 may be configured as or otherwise support a means for receiving additional control signaling indicating that a first BWP associated with the first search space set and the second search space set of the scheduling component carrier is active and that a second BWP associated with the set of multiple search space sets of the scheduled component carrier is active. In some examples, the monitoring manager 1155 may be configured as or otherwise support a means for monitoring a first decoding candidate of the first search space set and a second decoding candidate of the second search space set for one or more repetitions of the control message based on the first BWP and the second BWP being active.

In some examples, the monitoring manager 1155 may be configured as or otherwise support a means for monitoring a first decoding candidate of the first search space set for a second control message and a second decoding candidate of the second search space set for a repetition of the second control message based on the first search space set being linked for control channel repetition to the second search space set for intra-carrier scheduling on the scheduling component carrier, where the second control message schedules a second communication between the UE and the base station via the scheduling component carrier.

In some examples, where a first decoding candidate of the first search space set and a second decoding candidate of the second search space set are associated with a first CIF value that corresponds to the scheduling component carrier. In some examples, where a third decoding candidate of the first search space set and a fourth decoding candidate of the second search space set are associated with a second CIF value different from the first CIF value that corresponds to the scheduled component carrier.

In some examples, the control signaling receiving manager 1150 may be configured as or otherwise support a means for receiving, from the base station, additional control signaling indicating a set of multiple component carriers including the scheduled component carrier which are configured for cross-carrier scheduling via control channel repetition. In some examples, the decoding candidate manager 1135 may be configured as or otherwise support a means for identifying, based on the indication of the set of multiple component carriers, that a first decoding candidate of the first search space set is linked for control channel repetition to a second decoding candidate of the second search space set for cross-carrier scheduling on the scheduled component carrier.

In some examples, the control signaling receiving manager 1150 may be configured as or otherwise support a means for receiving, from the base station, additional control signaling indicating a set of multiple component carriers including the scheduled component carrier which are configured for cross-carrier scheduling via control channel repetition on the scheduling component carrier. In some examples, the decoding candidate manager 1135 may be configured as or otherwise support a means for identifying, based on the indication of the set of multiple component carriers, that a first decoding candidate of the first search space set is linked for control channel repetition to a second decoding candidate of the second search space set for cross-carrier scheduling on the scheduled component carrier.

In some examples, where the set of multiple search space sets of the scheduled component carrier include a third search space set and a fourth search space set. In some examples, where the first search space set of the scheduling component carrier and the third search space set of the scheduled component carrier are associated with a first search space set index. In some examples, where the second search space set of the scheduling component carrier and the fourth search space set of the scheduled component carrier are associated with a second search space set index different from the first search space set index.

Figure 12:
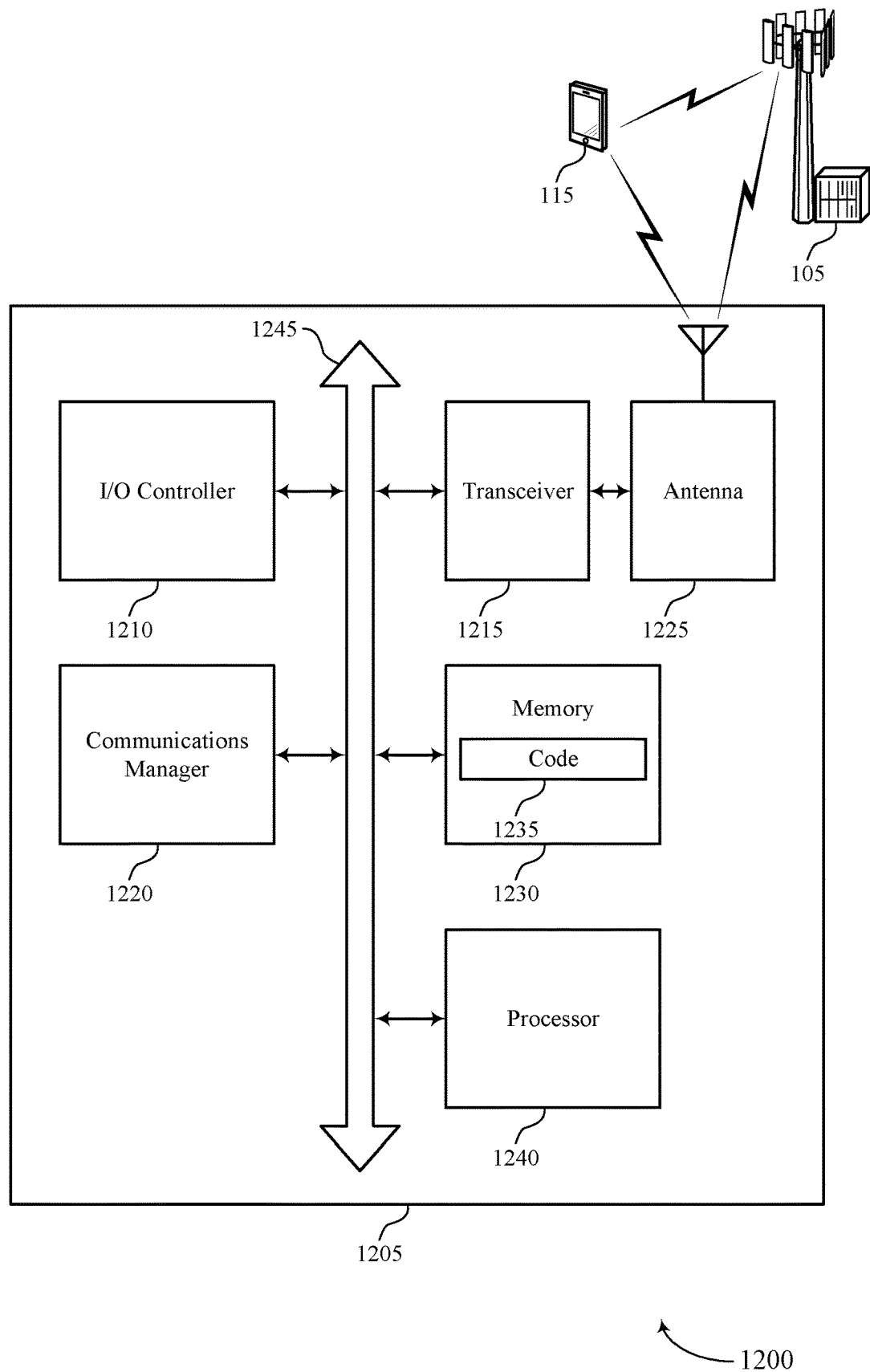
FIG. 12 shows a diagram of a system including a device that supports techniques for control channel repetition for cross-carrier scheduling in accordance with aspects of the present disclosure.

FIG. 12 shows a diagram of a system 1200 including a device 1205 that supports techniques for control channel repetition for cross-carrier scheduling in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for control channel repetition for cross-carrier scheduling). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a base station, control signaling identifying a scheduling configuration indicating a first search space set and a second search space set of a scheduling component carrier for scheduling communications on a scheduled component carrier that is different from the scheduling component carrier. The communications manager 1220 may be configured as or otherwise support a means for identifying a search space set linking configuration for a set of multiple search space sets of the scheduled component carrier based on the scheduling configuration. The communications manager 1220 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The communications manager 1220 may be configured as or otherwise support a means for receiving, from the base station and within at least one decoding candidate of the set of decoding candidates, at least one control message via the scheduling component carrier that schedules a communication between the base station and the UE via the scheduled component carrier. The communications manager 1220 may be configured as or otherwise support a means for transmitting or receiving the communication with the base station via the scheduled component carrier based on the at least one control message.

By including or configuring the communications manager 1220 in accordance with examples as described herein, the device 1205 may support techniques for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for control channel repetition for cross-carrier scheduling as described herein, or the processor 1240 and the memory 1230 may be otherwise configured to perform or support such operations.

Figure 13:
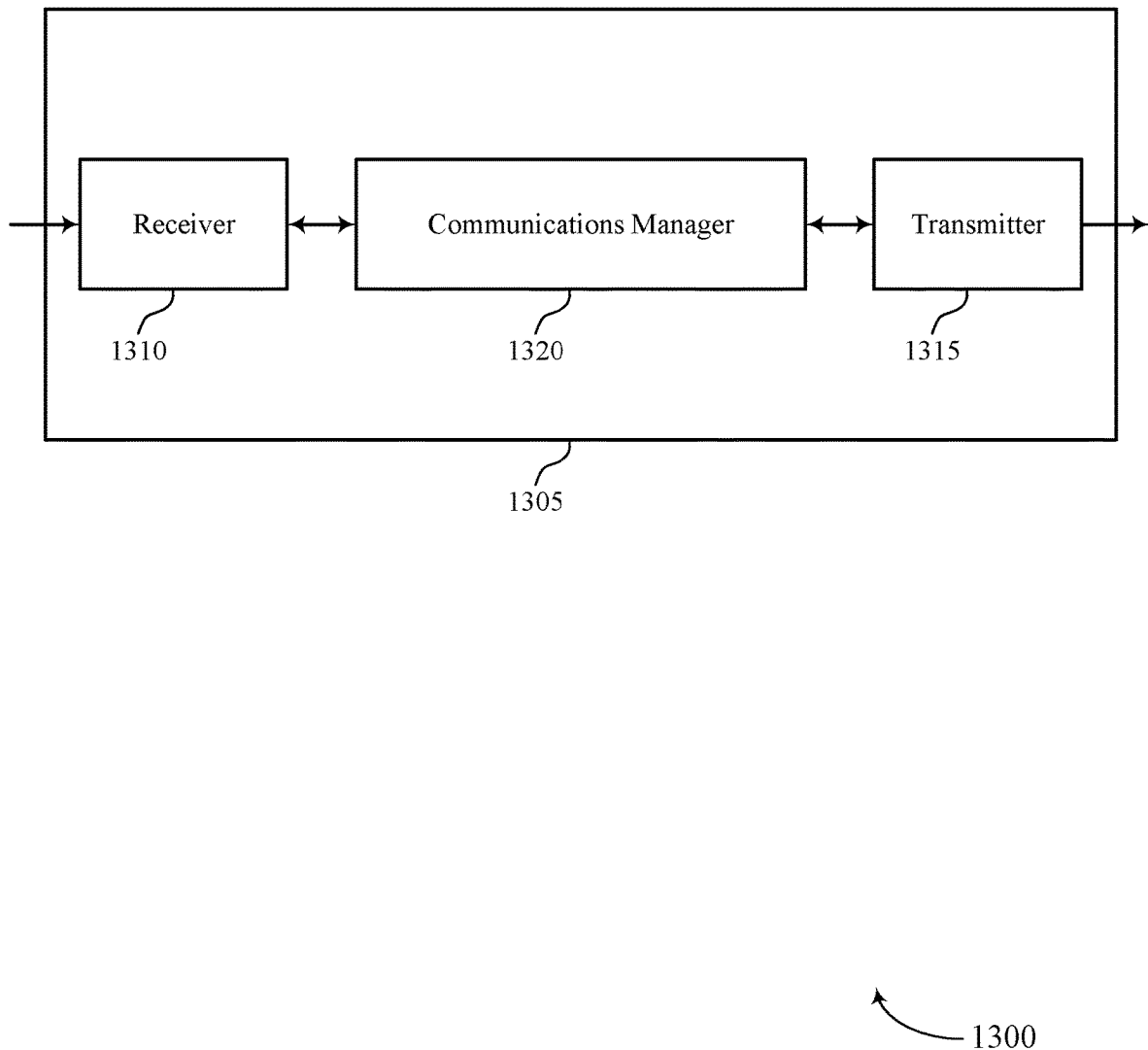
FIGS. 13 and 14 show block diagrams of devices that support techniques for control channel repetition for cross-carrier scheduling in accordance with aspects of the present disclosure.

FIG. 13 shows a block diagram 1300 of a device 1305 that supports techniques for control channel repetition for cross-carrier scheduling in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for control channel repetition for cross-carrier scheduling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for control channel repetition for cross-carrier scheduling). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for control channel repetition for cross-carrier scheduling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, control signaling identifying a scheduling configuration indicating a first search space set and a second search space set of a scheduling component carrier for scheduling communications on a scheduled component carrier that is different from the scheduling component carrier. The communications manager 1320 may be configured as or otherwise support a means for identifying a search space set linking configuration for a set of multiple search space sets of the scheduled component carrier based on the scheduling configuration. The communications manager 1320 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The communications manager 1320 may be configured as or otherwise support a means for transmitting, to the UE and within at least one decoding candidate of the set of decoding candidates, at least one control message via the scheduling component carrier that schedules a communication between the base station and the UE via the scheduled component carrier. The communications manager 1320 may be configured as or otherwise support a means for transmitting or receiving the communication with the UE via the scheduled component carrier based on the at least one control message.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 14:
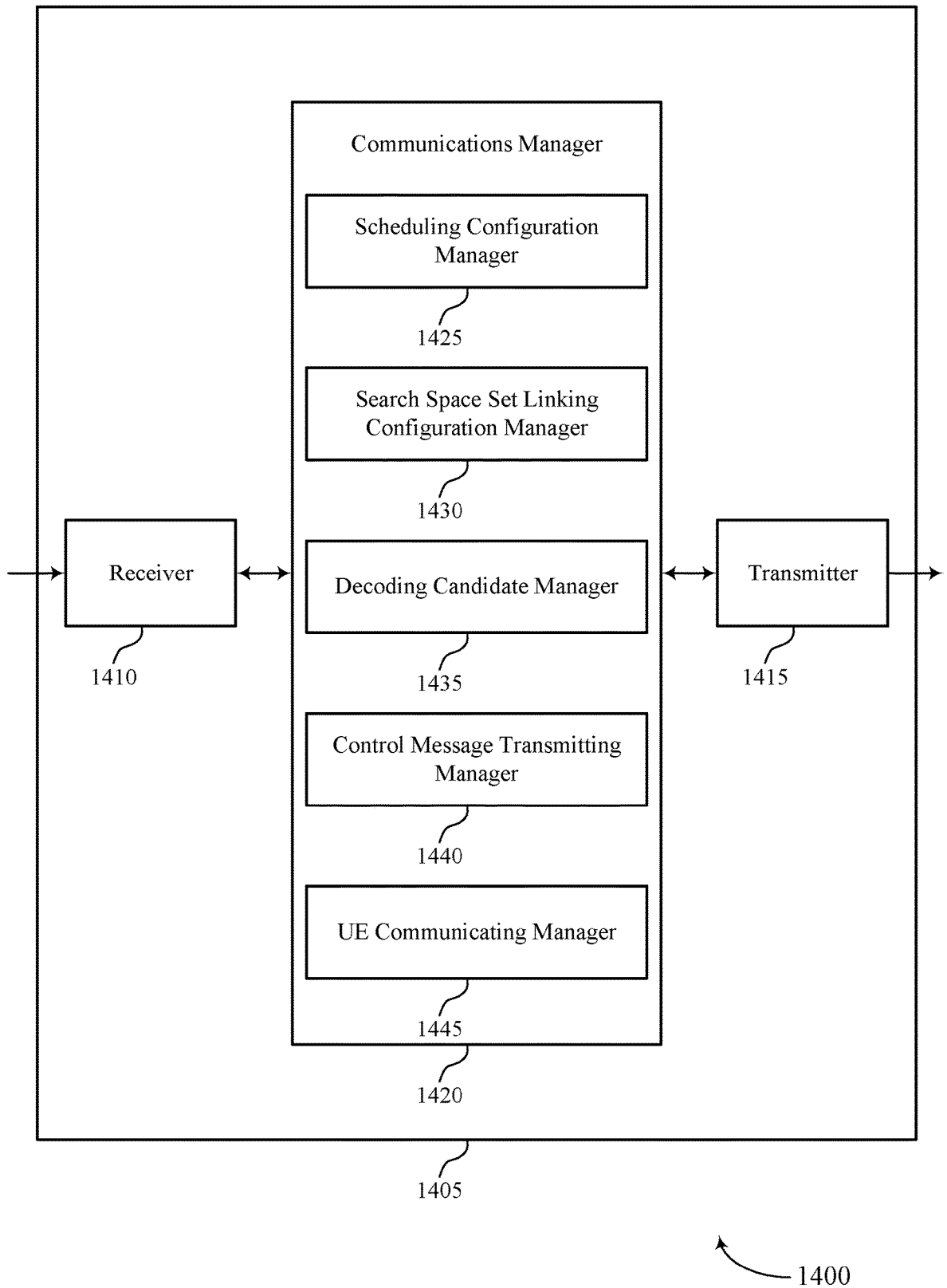

FIG. 14 shows a block diagram 1400 of a device 1405 that supports techniques for control channel repetition for cross-carrier scheduling in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for control channel repetition for cross-carrier scheduling). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for control channel repetition for cross-carrier scheduling). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for control channel repetition for cross-carrier scheduling as described herein. For example, the communications manager 1420 may include a scheduling configuration manager 1425, a search space set linking configuration manager 1430, a decoding candidate manager 1435, a control message transmitting manager 1440, a UE communicating manager 1445, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The scheduling configuration manager 1425 may be configured as or otherwise support a means for transmitting, to a UE, control signaling identifying a scheduling configuration indicating a first search space set and a second search space set of a scheduling component carrier for scheduling communications on a scheduled component carrier that is different from the scheduling component carrier. The search space set linking configuration manager 1430 may be configured as or otherwise support a means for identifying a search space set linking configuration for a set of multiple search space sets of the scheduled component carrier based on the scheduling configuration. The decoding candidate manager 1435 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The control message transmitting manager 1440 may be configured as or otherwise support a means for transmitting, to the UE and within at least one decoding candidate of the set of decoding candidates, at least one control message via the scheduling component carrier that schedules a communication between the base station and the UE via the scheduled component carrier. The UE communicating manager 1445 may be configured as or otherwise support a means for transmitting or receiving the communication with the UE via the scheduled component carrier based on the at least one control message.

Figure 15:
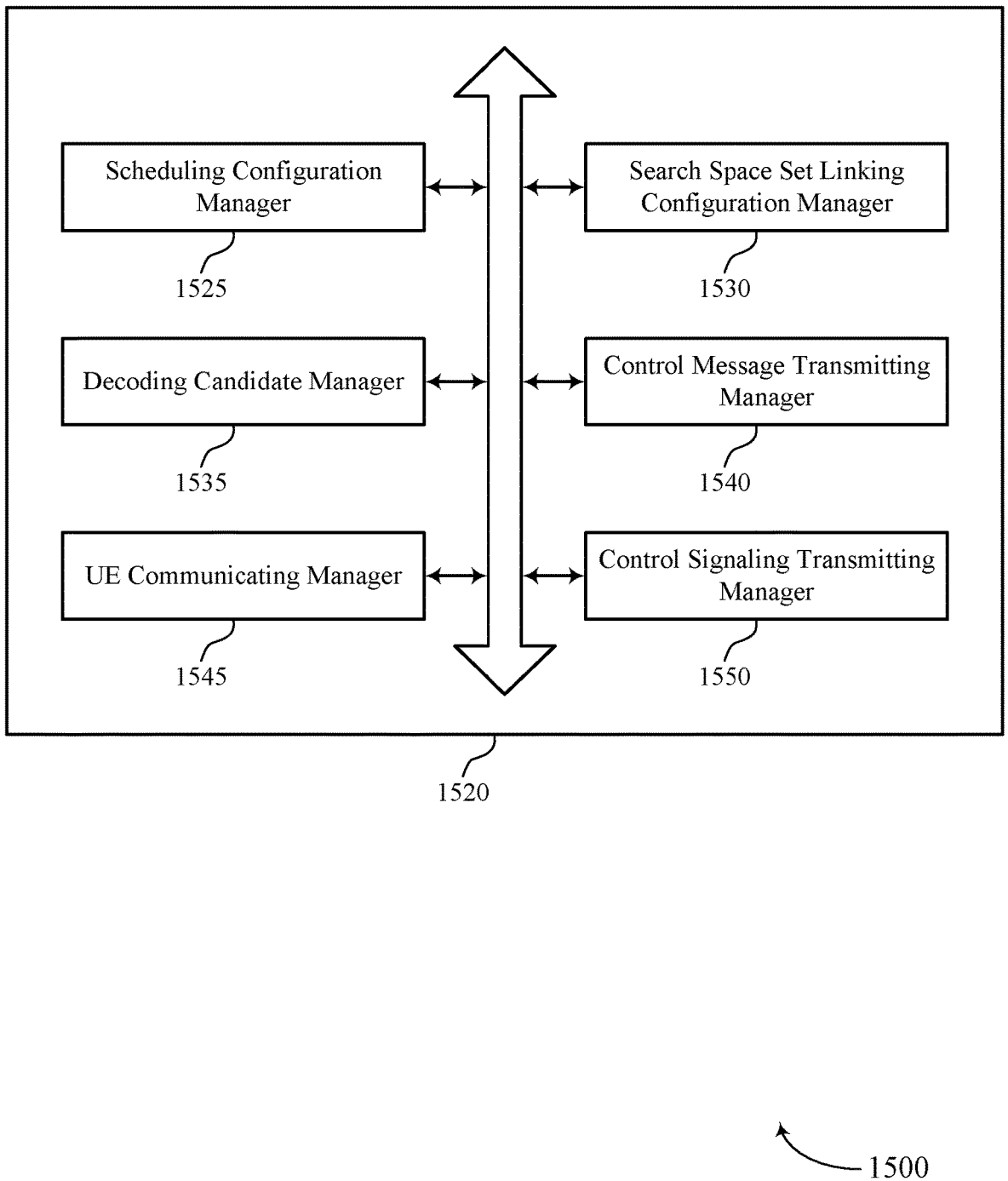
FIG. 15 shows a block diagram of a communications manager that supports techniques for control channel repetition for cross-carrier scheduling in accordance with aspects of the present disclosure.

FIG. 15 shows a block diagram 1500 of a communications manager 1520 that supports techniques for control channel repetition for cross-carrier scheduling in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of techniques for control channel repetition for cross-carrier scheduling as described herein. For example, the communications manager 1520 may include a scheduling configuration manager 1525, a search space set linking configuration manager 1530, a decoding candidate manager 1535, a control message transmitting manager 1540, a UE communicating manager 1545, a control signaling transmitting manager 1550, or any combination thereof. Each of these components may communicate, directly or indirectly, with one another (e.g., via one or more buses).

The communications manager 1520 may support wireless communication at a base station in accordance with examples as disclosed herein. The scheduling configuration manager 1525 may be configured as or otherwise support a means for transmitting, to a UE, control signaling identifying a scheduling configuration indicating a first search space set and a second search space set of a scheduling component carrier for scheduling communications on a scheduled component carrier that is different from the scheduling component carrier. The search space set linking configuration manager 1530 may be configured as or otherwise support a means for identifying a search space set linking configuration for a set of multiple search space sets of the scheduled component carrier based on the scheduling configuration.

The decoding candidate manager 1535 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The control message transmitting manager 1540 may be configured as or otherwise support a means for transmitting, to the UE and within at least one decoding candidate of the set of decoding candidates, at least one control message via the scheduling component carrier that schedules a communication between the base station and the UE via the scheduled component carrier. The UE communicating manager 1545 may be configured as or otherwise support a means for transmitting or receiving the communication with the UE via the scheduled component carrier based on the at least one control message.

In some examples, to support identifying the search space set linking configuration, the search space set linking configuration manager 1530 may be configured as or otherwise support a means for transmitting, to the UE, additional control signaling indicating the search space set linking configuration. In some examples, to support identifying the search space set linking configuration, the search space set linking configuration manager 1530 may be configured as or otherwise support a means for identifying that at least two search space sets of the set of multiple search space sets of the scheduled component carrier are linked for control channel repetition based on the scheduling configuration indicating that the first search space set and the second search space set of the scheduling component carrier are linked for control channel repetition.

In some examples, to support identifying the search space set linking configuration, the search space set linking configuration manager 1530 may be configured as or otherwise support a means for identifying that at least two search space sets of the set of multiple search space sets of the scheduled component carrier are linked for control channel repetition based on the at least two search space sets being associated with first and second search space set indexes that are respectively the same as first and second search space set indexes of the first and second search space sets of the scheduling component carrier.

In some examples, to support identifying the search space set linking configuration, the search space set linking configuration manager 1530 may be configured as or otherwise support a means for identifying that at least two search space sets of the set of multiple search space sets of the scheduled component carrier are linked for control channel repetition based on the at least two search space sets being configured with a same quantity of decoding candidates per aggregation level.

In some examples, to support identifying the search space set linking configuration, the search space set linking configuration manager 1530 may be configured as or otherwise support a means for identifying that at least two search space sets of the set of multiple search space sets of the scheduled component carrier are linked for control channel repetition based on each pair of decoding candidates across the first and second search space sets for two monitoring occasions being linked for control channel repetition, each pair of the decoding candidates being linked for control channel repetition corresponding to a same CIF, a same candidate index, and a same aggregation level.

In some examples, the search space set linking configuration manager 1530 may be configured as or otherwise support a means for identifying that a third set of monitoring occasions within the first search space set of the scheduling component carrier and a fourth set of monitoring occasions within the second search space set of the scheduling component carrier are unlinked for control channel repetition for intra-carrier scheduling. In some examples, to support identifying the search space set linking configuration, the search space set linking configuration manager 1530 may be configured as or otherwise support a means for identifying that at least two search space sets of the set of multiple search space sets of the scheduled component carrier are unlinked for control channel repetition.

In some examples, the decoding candidate manager 1535 may be configured as or otherwise support a means for identifying, based on the search space set linking configuration, that a first decoding candidate of the first search space set is unlinked for control channel repetition to a second decoding candidate of the second search space set for cross-carrier scheduling on the scheduled component carrier.

In some examples, the decoding candidate manager 1535 may be configured as or otherwise support a means for identifying, based on the search space set linking configuration, that a third decoding candidate of the first search space set is linked for control channel repetition to a fourth decoding candidate of the second search space set for intra-carrier scheduling on the scheduling component carrier.

In some examples, the scheduling configuration manager 1525 may be configured as or otherwise support a means for transmitting the control signaling that indicates a first set of one or more monitoring occasions for the first search space set and a second set of one or more monitoring occasions for the second search space set. In some examples, to support transmitting the control signaling identifying the scheduling configuration, the scheduling configuration manager 1525 may be configured as or otherwise support a means for transmitting the control signaling indicating a first search space set index associated with the first search space set of the scheduling component carrier and a second search space set index associated with the second search space set of the scheduling component carrier.

In some examples, a third search space set and a fourth search space set of the set of multiple search space sets of the scheduled component carrier are associated with the first search space set index and the second search space set index, respectively. In some examples, the search space set linking configuration indicates that the third search space set and the fourth search space set are linked or unlinked for control channel repetition based on the first search space set and the second search space set being linked for control channel repetition.

In some examples, to support transmitting the control signaling identifying the scheduling configuration, the scheduling configuration manager 1525 may be configured as or otherwise support a means for transmitting the control signaling indicating that at least two search space sets of the set of multiple search space sets of the scheduled component carrier are configured within a first BWP of the scheduled component carrier and that the first search space set and the second search space set of the scheduling component carrier are configured within a second BWP of the scheduling component carrier.

In some examples, the control signaling transmitting manager 1550 may be configured as or otherwise support a means for transmitting additional control signaling indicating that a first BWP associated with the first search space set and the second search space set of the scheduling component carrier is active and that a second BWP associated with the set of multiple search space sets of the scheduled component carrier is active, where transmitting the at least one control message is based on the first BWP and the second BWP being active.

In some examples, where a first decoding candidate of the first search space set and a second decoding candidate of the second search space set are associated with a first CIF value that corresponds to the scheduling component carrier. In some examples, where a third decoding candidate of the first search space set and a fourth decoding candidate of the second search space set are associated with a second CIF value different from the first CIF value that corresponds to the scheduled component carrier.

In some examples, the control signaling transmitting manager 1550 may be configured as or otherwise support a means for transmitting, to the UE, additional control signaling indicating a set of multiple component carriers including the scheduled component carrier which are configured for cross-carrier scheduling via control channel repetition. In some examples, the decoding candidate manager 1535 may be configured as or otherwise support a means for identifying, based on the indication of the set of multiple component carriers, that a first decoding candidate of the first search space set is linked for control channel repetition to a second decoding candidate of the second search space set for cross-carrier scheduling on the scheduled component carrier.

In some examples, the control signaling transmitting manager 1550 may be configured as or otherwise support a means for transmitting, to the UE, additional control signaling indicating a set of multiple component carriers including the scheduled component carrier which are configured for cross-carrier scheduling via control channel repetition on the scheduling component carrier. In some examples, the decoding candidate manager 1535 may be configured as or otherwise support a means for identifying, based on the indication of the set of multiple component carriers, that a first decoding candidate of the first search space set is linked for control channel repetition to a second decoding candidate of the second search space set for cross-carrier scheduling on the scheduled component carrier.

In some examples, where the set of multiple search space sets of the scheduled component carrier include a third search space set and a fourth search space set. In some examples, where the first search space set of the scheduling component carrier and the third search space set of the scheduled component carrier are associated with a first search space set index. In some examples, where the second search space set of the scheduling component carrier and the fourth search space set of the scheduled component carrier are associated with a second search space set index different from the first search space set index.

Figure 16:
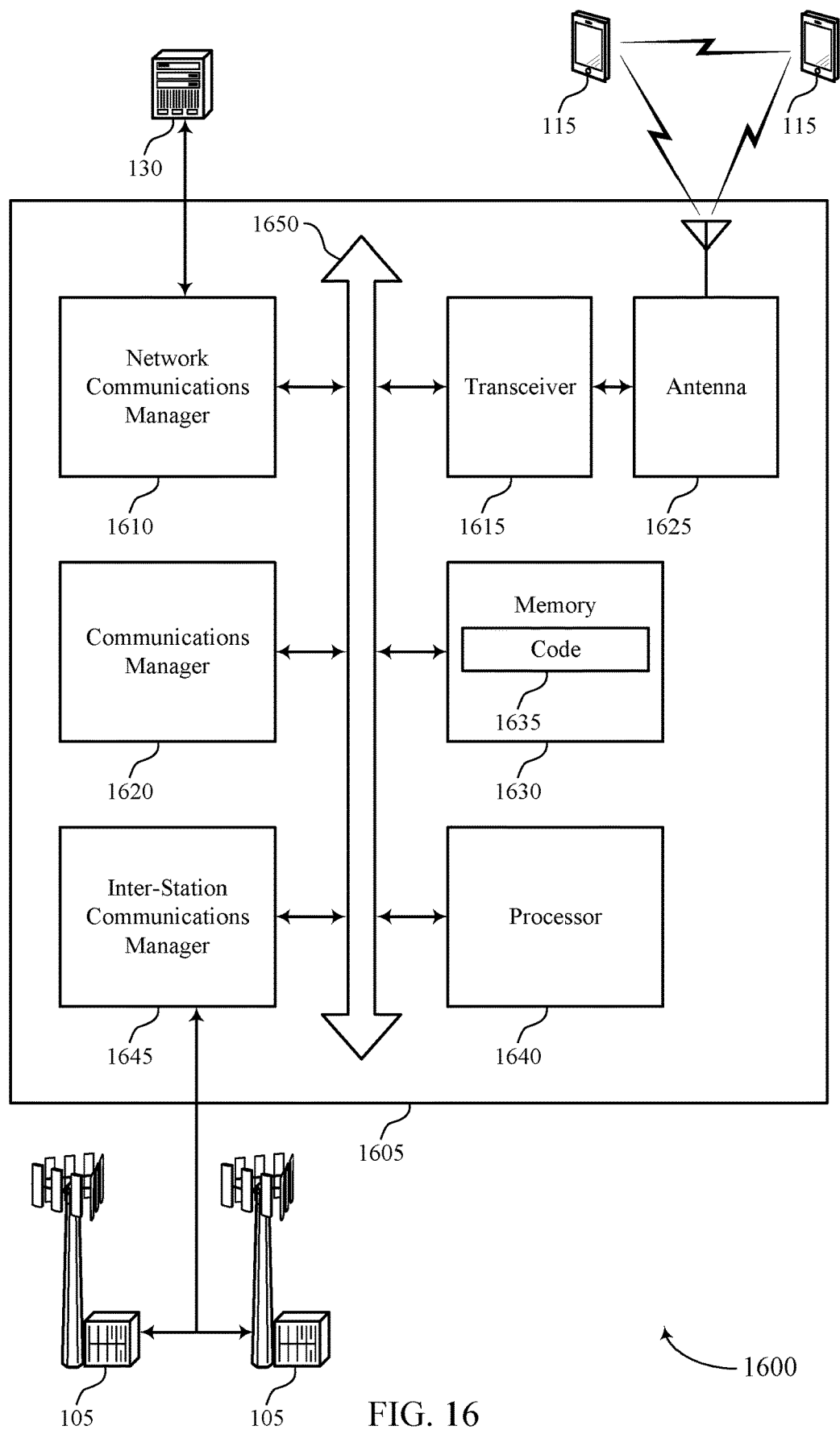
FIG. 16 shows a diagram of a system including a device that supports techniques for control channel repetition for cross-carrier scheduling in accordance with aspects of the present disclosure.

FIG. 16 shows a diagram of a system 1600 including a device 1605 that supports techniques for control channel repetition for cross-carrier scheduling in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for control channel repetition for cross-carrier scheduling). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, control signaling identifying a scheduling configuration indicating a first search space set and a second search space set of a scheduling component carrier for scheduling communications on a scheduled component carrier that is different from the scheduling component carrier. The communications manager 1620 may be configured as or otherwise support a means for identifying a search space set linking configuration for a set of multiple search space sets of the scheduled component carrier based on the scheduling configuration. The communications manager 1620 may be configured as or otherwise support a means for identifying, based on the search space set linking configuration, a set of decoding candidates within the first search space set and the second search space set of the scheduling component carrier which are allocated for cross-carrier scheduling of the scheduled component carrier. The communications manager 1620 may be configured as or otherwise support a means for transmitting, to the UE and within at least one decoding candidate of the set of decoding candidates, at least one control message via the scheduling component carrier that schedules a communication between the base station and the UE via the scheduled component carrier. The communications manager 1620 may be configured as or otherwise support a means for transmitting or receiving the communication with the UE via the scheduled component carrier based on the at least one control message.

By including or configuring the communications manager 1620 in accordance with examples as described herein, the device 1605 may support techniques for improved cross-carrier scheduling. In particular, techniques described herein may enable the use of PDCCH repetition in the context of cross-carrier scheduling, which may enable search space sets on a scheduled component carrier to be scheduled via signaling transmitted/received on linked search space sets of a scheduling component carrier. By enabling PDCCH repetition in the context of cross-carrier scheduling, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for control channel repetition for cross-carrier scheduling as described herein, or the processor 1640 and the memory 1630 may be otherwise configured to perform or support such operations.

Figure 17:
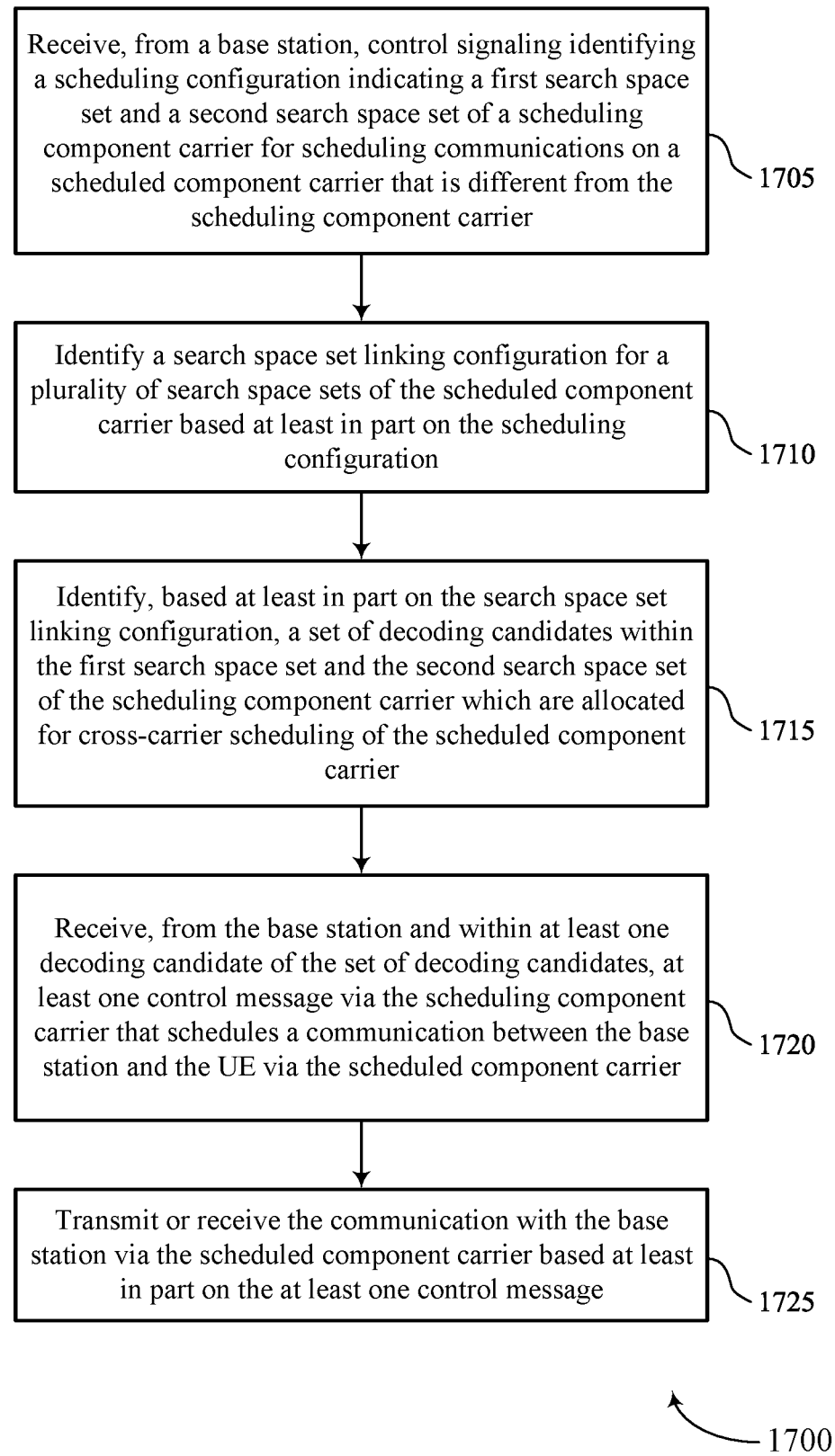
FIGS. 17 through 20 show flowcharts illustrating methods that support techniques for control channel repetition for cross-carrier scheduling in accordance with aspects of the present disclosure.

FIG. 17 shows a flowchart illustrating a method 1700 that supports techniques for control channel repetition for cross-carrier scheduling in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, control signaling identifying a scheduling configuration indicating a first search space set and a second search space set of a scheduling component carrier for scheduling communications on a scheduled component carrier that is different from the scheduling component carrier. The operations of 1705 may be performed in accordance with examples as disclosed herein. In some examples, aspects of the operations of 1705 may be performed by a scheduling configuration manager 1125 as described with reference to FIG. 11.

At 1710, the method may include identifying a search space set linking configuration for a set of multiple search space sets of the scheduled component carrier based on the scheduling configuration. The operations of 1710 may be performed in accordance with examples as disclosed herein. In some examples, aspects of the operations of 1710 may be performed by a search space set linking configuration manager 1130 as described with reference to FIG. 11.

At 1715, the method may include identifying, based on the search space set linking configuration, a set of decoding candidates within the first search space set and the second search space set of the scheduling component carrier which are allocated for cross-carrier scheduling of the scheduled component carrier. The operations of 1715 may be performed in accordance with examples as disclosed herein. In some examples, aspects of the operations of 1715 may be performed by a decoding candidate manager 1135 as described with reference to FIG. 11.

At 1720, the method may include receiving, from the base station and within at least one decoding candidate of the set of decoding candidates, at least one control message via the scheduling component carrier that schedules a communication between the base station and the UE via the scheduled component carrier. The operations of 1720 may be performed in accordance with examples as disclosed herein. In some examples, aspects of the operations of 1720 may be performed by a control message 1140 as described with reference to FIG. 11.

At 1725, the method may include transmitting or receiving the communication with the base station via the scheduled component carrier based on the at least one control message. The operations of 1725 may be performed in accordance with examples as disclosed herein. In some examples, aspects of the operations of 1725 may be performed by a base station communicating manager 1145 as described with reference to FIG. 11.

Figure 18:
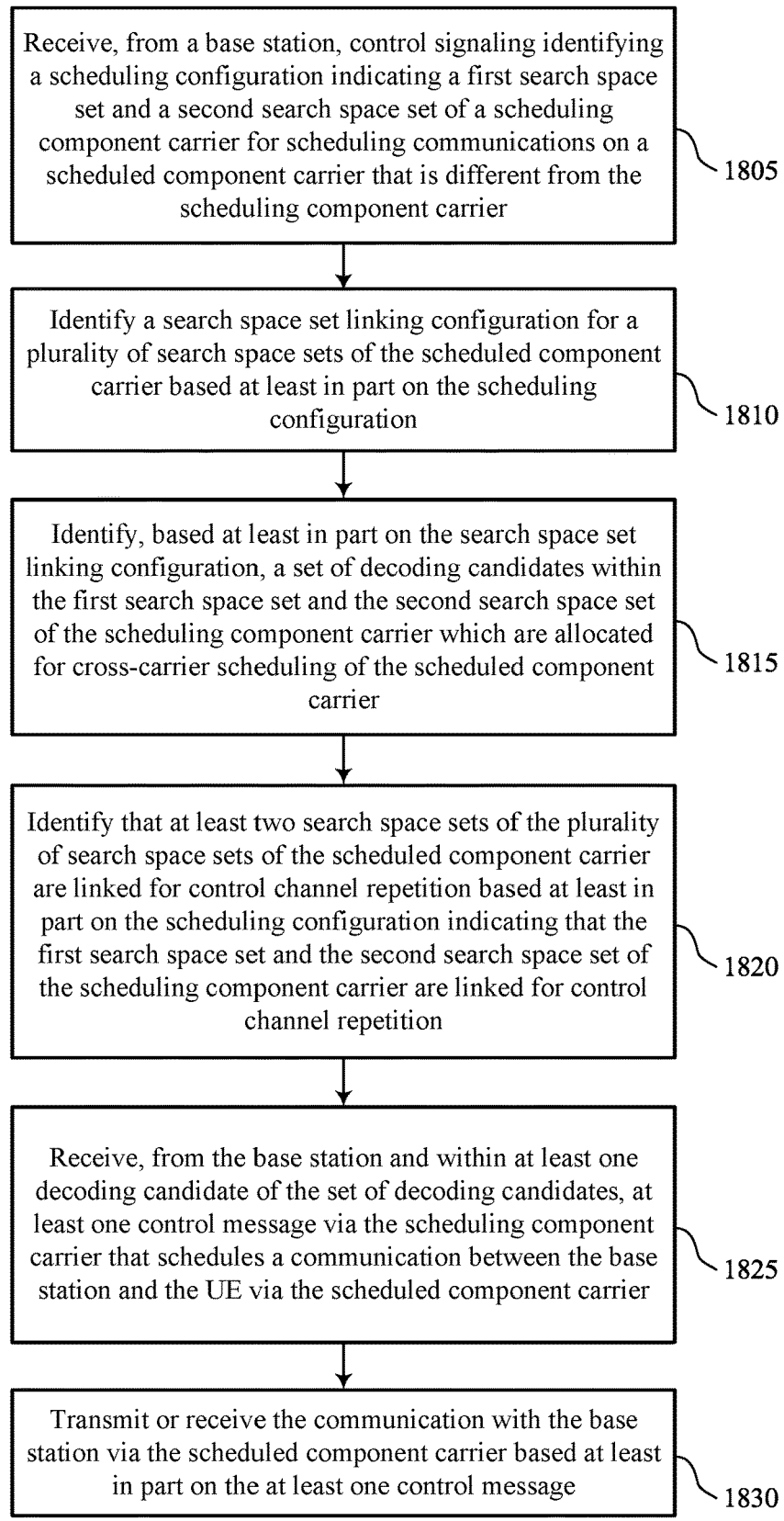

FIG. 18 shows a flowchart illustrating a method 1800 that supports techniques for control channel repetition for cross-carrier scheduling in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, control signaling identifying a scheduling configuration indicating a first search space set and a second search space set of a scheduling component carrier for scheduling communications on a scheduled component carrier that is different from the scheduling component carrier. The operations of 1805 may be performed in accordance with examples as disclosed herein. In some examples, aspects of the operations of 1805 may be performed by a scheduling configuration manager 1125 as described with reference to FIG. 11.

At 1810, the method may include identifying a search space set linking configuration for a set of multiple search space sets of the scheduled component carrier based on the scheduling configuration. The operations of 1810 may be performed in accordance with examples as disclosed herein. In some examples, aspects of the operations of 1810 may be performed by a search space set linking configuration manager 1130 as described with reference to FIG. 11.

At 1815, the method may include identifying, based on the search space set linking configuration, a set of decoding candidates within the first search space set and the second search space set of the scheduling component carrier which are allocated for cross-carrier scheduling of the scheduled component carrier. The operations of 1815 may be performed in accordance with examples as disclosed herein. In some examples, aspects of the operations of 1815 may be performed by a decoding candidate manager 1135 as described with reference to FIG. 11.

At 1820, the method may include identifying that at least two search space sets of the set of multiple search space sets of the scheduled component carrier are linked for control channel repetition based on the scheduling configuration indicating that the first search space set and the second search space set of the scheduling component carrier are linked for control channel repetition. The operations of 1820 may be performed in accordance with examples as disclosed herein. In some examples, aspects of the operations of 1820 may be performed by a search space set linking configuration manager 1130 as described with reference to FIG. 11.

At 1825, the method may include receiving, from the base station and within at least one decoding candidate of the set of decoding candidates, at least one control message via the scheduling component carrier that schedules a communication between the base station and the UE via the scheduled component carrier. The operations of 1825 may be performed in accordance with examples as disclosed herein. In some examples, aspects of the operations of 1825 may be performed by a control message 1140 as described with reference to FIG. 11.

At 1830, the method may include transmitting or receiving the communication with the base station via the scheduled component carrier based on the at least one control message. The operations of 1830 may be performed in accordance with examples as disclosed herein. In some examples, aspects of the operations of 1830 may be performed by a base station communicating manager 1145 as described with reference to FIG. 11.

Figure 19:
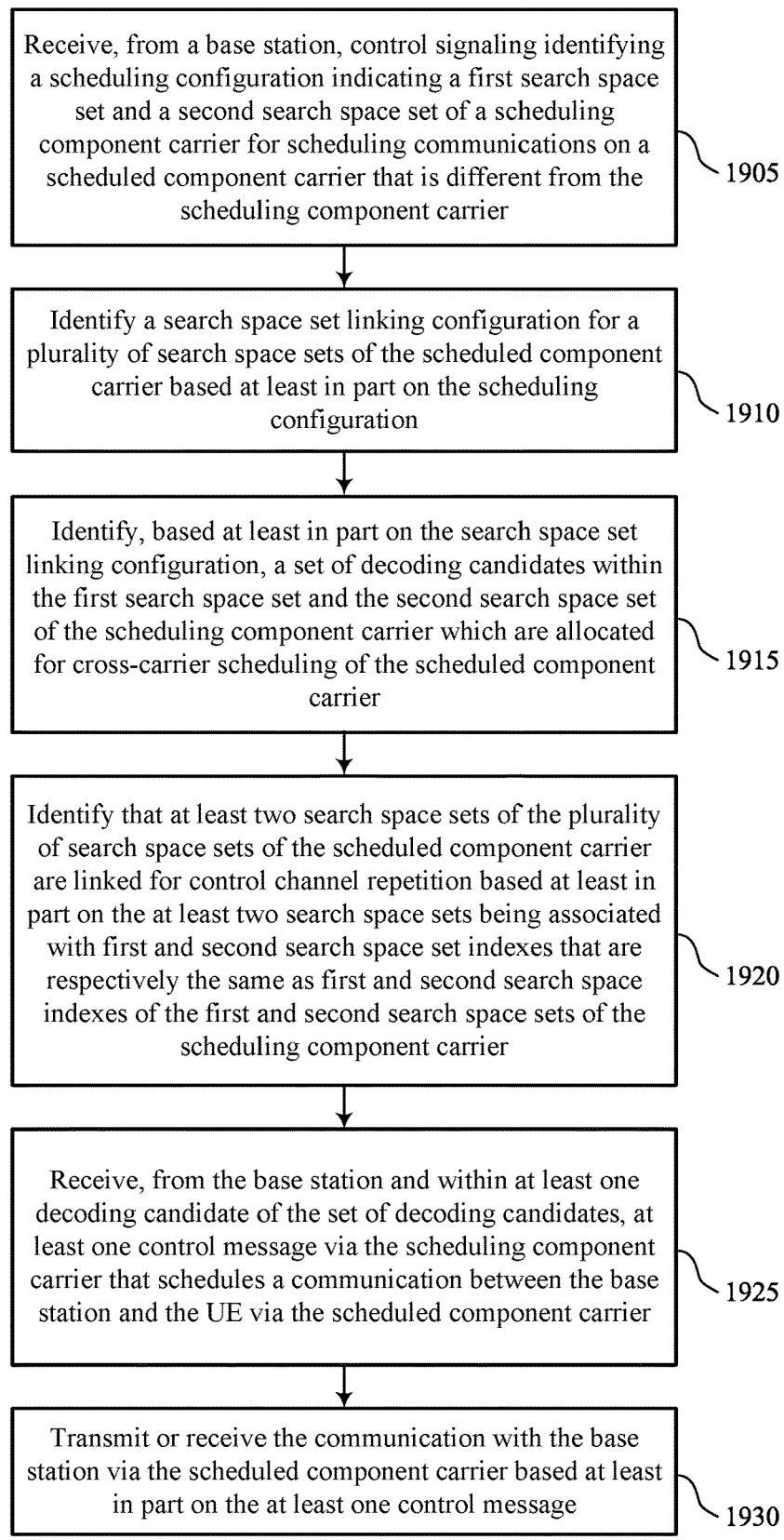

FIG. 19 shows a flowchart illustrating a method 1900 that supports techniques for control channel repetition for cross-carrier scheduling in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving, from a base station, control signaling identifying a scheduling configuration indicating a first search space set and a second search space set of a scheduling component carrier for scheduling communications on a scheduled component carrier that is different from the scheduling component carrier. The operations of 1905 may be performed in accordance with examples as disclosed herein. In some examples, aspects of the operations of 1905 may be performed by a scheduling configuration manager 1125 as described with reference to FIG. 11.

At 1910, the method may include identifying a search space set linking configuration for a set of multiple search space sets of the scheduled component carrier based on the scheduling configuration. The operations of 1910 may be performed in accordance with examples as disclosed herein. In some examples, aspects of the operations of 1910 may be performed by a search space set linking configuration manager 1130 as described with reference to FIG. 11.

At 1915, the method may include identifying, based on the search space set linking configuration, a set of decoding candidates within the first search space set and the second search space set of the scheduling component carrier which are allocated for cross-carrier scheduling of the scheduled component carrier. The operations of 1915 may be performed in accordance with examples as disclosed herein. In some examples, aspects of the operations of 1915 may be performed by a decoding candidate manager 1135 as described with reference to FIG. 11.

At 1920, the method may include identifying that at least two search space sets of the set of multiple search space sets of the scheduled component carrier are linked for control channel repetition based on the at least two search space sets being associated with first and second search space set indexes that are respectively the same as first and second search space set indexes of the first and second search space sets of the scheduling component carrier. The operations of 1920 may be performed in accordance with examples as disclosed herein. In some examples, aspects of the operations of 1920 may be performed by a search space set linking configuration manager 1130 as described with reference to FIG. 11.

At 1925, the method may include receiving, from the base station and within at least one decoding candidate of the set of decoding candidates, at least one control message via the scheduling component carrier that schedules a communication between the base station and the UE via the scheduled component carrier. The operations of 1925 may be performed in accordance with examples as disclosed herein. In some examples, aspects of the operations of 1925 may be performed by a control message 1140 as described with reference to FIG. 11.

At 1930, the method may include transmitting or receiving the communication with the base station via the scheduled component carrier based on the at least one control message. The operations of 1930 may be performed in accordance with examples as disclosed herein. In some examples, aspects of the operations of 1930 may be performed by a base station communicating manager 1145 as described with reference to FIG. 11.

Figure 20:
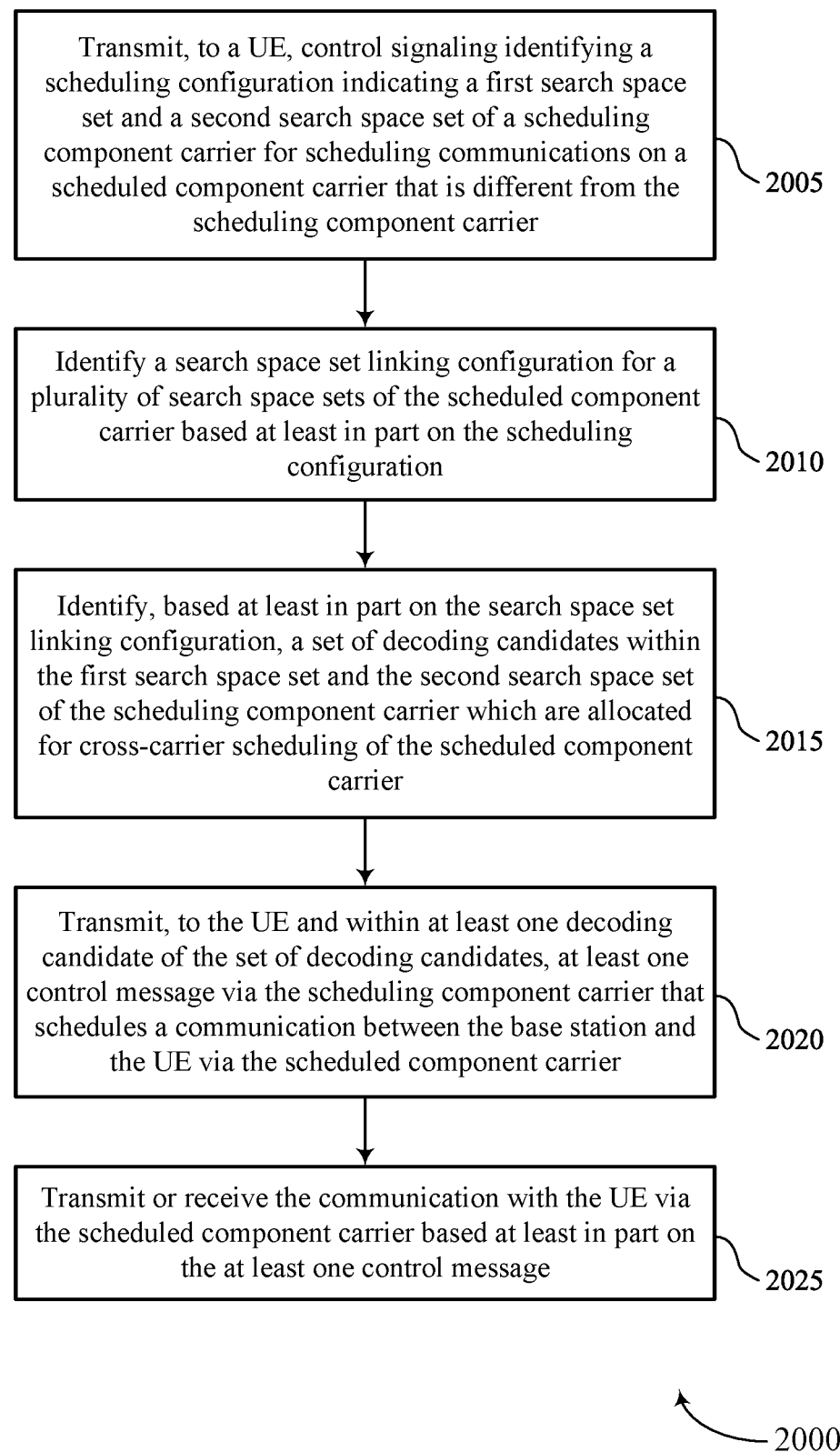

FIG. 20 shows a flowchart illustrating a method 2000 that supports techniques for control channel repetition for cross-carrier scheduling in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2005, the method may include transmitting, to a UE, control signaling identifying a scheduling configuration indicating a first search space set and a second search space set of a scheduling component carrier for scheduling communications on a scheduled component carrier that is different from the scheduling component carrier. The operations of 2005 may be performed in accordance with examples as disclosed herein. In some examples, aspects of the operations of 2005 may be performed by a scheduling configuration manager 1525 as described with reference to FIG. 15.

At 2010, the method may include identifying a search space set linking configuration for a set of multiple search space sets of the scheduled component carrier based on the scheduling configuration. The operations of 2010 may be performed in accordance with examples as disclosed herein. In some examples, aspects of the operations of 2010 may be performed by a search space set linking configuration manager 1530 as described with reference to FIG. 15.

At 2015, the method may include identifying, based on the search space set linking configuration, a set of decoding candidates within the first search space set and the second search space set of the scheduling component carrier which are allocated for cross-carrier scheduling of the scheduled component carrier. The operations of 2015 may be performed in accordance with examples as disclosed herein. In some examples, aspects of the operations of 2015 may be performed by a decoding candidate manager 1535 as described with reference to FIG. 15.

At 2020, the method may include transmitting, to the UE and within at least one decoding candidate of the set of decoding candidates, at least one control message via the scheduling component carrier that schedules a communication between the base station and the UE via the scheduled component carrier. The operations of 2020 may be performed in accordance with examples as disclosed herein. In some examples, aspects of the operations of 2020 may be performed by a control message transmitting manager 1540 as described with reference to FIG. 15.

At 2025, the method may include transmitting or receiving the communication with the UE via the scheduled component carrier based on the at least one control message. The operations of 2025 may be performed in accordance with examples as disclosed herein. In some examples, aspects of the operations of 2025 may be performed by a UE communicating manager 1545 as described with reference to FIG. 15.

The following provides an overview of aspects of the present disclosure:

Aspect 1: A method for wireless communication at a UE, comprising: receiving, from a base station, control signaling identifying a scheduling configuration indicating a first search space set and a second search space set of a scheduling component carrier for scheduling communications on a scheduled component carrier that is different from the scheduling component carrier; identifying a search space set linking configuration for a plurality of search space sets of the scheduled component carrier based at least in part on the scheduling configuration; identifying, based at least in part on the search space set linking configuration, a set of decoding candidates within the first search space set and the second search space set of the scheduling component carrier which are allocated for cross-carrier scheduling of the scheduled component carrier; receiving, from the base station and within at least one decoding candidate of the set of decoding candidates, at least one control message via the scheduling component carrier that schedules a communication between the base station and the UE via the scheduled component carrier; and transmitting or receiving the communication with the base station via the scheduled component carrier based at least in part on the at least one control message.

Aspect 2: The method of aspect 1, wherein identifying the search space set linking configuration comprises: receiving, from the base station, additional control signaling indicating the search space set linking configuration.

Aspect 3: The method of any of aspects 1 through 2, wherein identifying the search space set linking configuration comprises: identifying that at least two search space sets of the plurality of search space sets of the scheduled component carrier are linked for control channel repetition based at least in part on the scheduling configuration indicating that the first search space set and the second search space set of the scheduling component carrier are linked for control channel repetition.

Aspect 4: The method of aspect 3, further comprising: monitoring a first decoding candidate within the first search space set for a repetition of the control message and a second decoding candidate, that is linked to the first decoding candidate, within the second search space set for a repetition of the control message based at least in part on the at least two search space sets being linked for control channel repetition.

Aspect 5: The method of any of aspects 1 through 4, wherein identifying the search space set linking configuration comprises: identifying that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

Aspect 6: The method of any of aspects 1 through 5, wherein identifying the search space set linking configuration comprises: identifying that at least two search space sets of the plurality of search space sets of the scheduled component carrier are linked for control channel repetition based at least in part on the at least two search space sets being configured with a same quantity of decoding candidates per aggregation level.

Aspect 7: The method of any of aspects 1 through 6, wherein the at least one decoding candidate of the set of decoding candidates comprises a pair of decoding candidates, the method further comprising: identifying that the pair of decoding candidates are linked for control channel repetition based at least in part on the pair of the decoding candidates corresponding to a same CIF, a same candidate index, and a same aggregation level.

Aspect 8: The method of aspect 7, further comprising: identifying that a third set of monitoring occasions within the first search space set of the scheduling component carrier and a fourth set of monitoring occasions within the second search space set of the scheduling component carrier are unlinked for control channel repetition for intra-carrier scheduling.

Aspect 9: The method of any of aspects 1 through 8, wherein identifying the search space set linking configuration comprises: identifying that at least two search space sets of the plurality of search space sets of the scheduled component carrier are unlinked for control channel repetition.

Aspect 10: The method of aspect 9, further comprising: monitoring a first decoding candidate of the first search space set for the control message and a second decoding candidate of the second search space set for a second control message that differs from the control message based at least in part on identifying that the at least two search space sets of the plurality of search space sets of the scheduled component carrier are unlinked for control channel repetition.

Aspect 11: The method of any of aspects 9 through 10, further comprising: identifying, based at least in part on the search space set linking configuration, that a first decoding candidate of the first search space set is unlinked for control channel repetition to a second decoding candidate of the second search space set for cross-carrier scheduling on the scheduled component carrier.

Aspect 12: The method of aspect 11, further comprising: identifying, based at least in part on the search space set linking configuration, that a third decoding candidate of the first search space set is linked for control channel repetition to a fourth decoding candidate of the second search space set for intra-carrier scheduling on the scheduling component carrier.

Aspect 13: The method of any of aspects 1 through 12, further comprising: receiving the control signaling that indicates a first set of one or more monitoring occasions for the first search space set and a second set of one or more monitoring occasions for the second search space set.

Aspect 14: The method of any of aspects 1 through 13, wherein receiving the control signaling identifying the scheduling configuration comprises: receiving the control signaling indicating a first search space set index associated with the first search space set of the scheduling component carrier and a second search space set index associated with the second search space set of the scheduling component carrier.

Aspect 15: The method of aspect 14, wherein a third search space set and a fourth search space set of the plurality of search space sets of the scheduled component carrier are associated with the first search space set index and the second search space set index, respectively, and the search space set linking configuration indicates that the third search space set and the fourth search space set are linked or unlinked for control channel repetition based at least in part on the first search space set and the second search space set being linked for control channel repetition.

Aspect 16: The method of any of aspects 1 through 15, wherein receiving the control signaling identifying the scheduling configuration comprises: receiving the control signaling indicating that at least two search space sets of the plurality of search space sets of the scheduled component carrier are configured within a first BWP of the scheduled component carrier and that the first search space set and the second search space set of the scheduling component carrier are configured within a second BWP of the scheduling component carrier.

Aspect 17: The method of any of aspects 1 through 16, further comprising: receiving additional control signaling indicating that a first BWP associated with the first search space set and the second search space set of the scheduling component carrier is active and that a second BWP associated with the plurality of search space sets of the scheduled component carrier is active; and monitoring a first decoding candidate of the first search space set and a second decoding candidate of the second search space set for one or more repetitions of the control message based at least in part on the first BWP and the second BWP being active.

Aspect 18: The method of any of aspects 1 through 17, further comprising: monitoring a first decoding candidate of the first search space set for a second control message and a second decoding candidate of the second search space set for a repetition of the second control message based at least in part on the first search space set being linked for control channel repetition to the second search space set for intra-carrier scheduling on the scheduling component carrier, wherein the second control message schedules a second communication between the UE and the base station via the scheduling component carrier.

Aspect 19: The method of any of aspects 1 through 18, wherein a first decoding candidate of the first search space set and a second decoding candidate of the second search space set are associated with a first CIF value that corresponds to the scheduling component carrier, and wherein a third decoding candidate of the first search space set and a fourth decoding candidate of the second search space set are associated with a second CIF value different from the first CIF value that corresponds to the scheduled component carrier Aspect 20: The method of any of aspects 1 through 19, further comprising: receiving, from the base station, additional control signaling indicating a plurality of component carriers including the scheduled component carrier which are configured for cross-carrier scheduling via control channel repetition; and identifying, based at least in part on the indication of the plurality of component carriers, that a first decoding candidate of the first search space set is linked for control channel repetition to a second decoding candidate of the second search space set for cross-carrier scheduling on the scheduled component carrier.

Aspect 21: The method of any of aspects 1 through 20, further comprising: receiving, from the base station, additional control signaling indicating a plurality of component carriers including the scheduled component carrier which are configured for cross-carrier scheduling via control channel repetition on the scheduling component carrier; and identifying, based at least in part on the indication of the plurality of component carriers, that a first decoding candidate of the first search space set is linked for control channel repetition to a second decoding candidate of the second search space set for cross-carrier scheduling on the scheduled component carrier.

Aspect 22: The method of any of aspects 1 through 21, wherein the plurality of search space sets of the scheduled component carrier comprise a third search space set and a fourth search space set, wherein the first search space set of the scheduling component carrier and the third search space set of the scheduled component carrier are associated with a first search space set index, and wherein the second search space set of the scheduling component carrier and the fourth search space set of the scheduled component carrier are associated with a second search space set index different from the first search space set index Aspect 23: A method for wireless communication at a base station, comprising: transmitting, to a UE, control signaling identifying a scheduling configuration indicating a first search space set and a second search space set of a scheduling component carrier for scheduling communications on a scheduled component carrier that is different from the scheduling component carrier; identifying a search space set linking configuration for a plurality of search space sets of the scheduled component carrier based at least in part on the scheduling configuration; identifying, based at least in part on the search space set linking configuration, a set of decoding candidates within the first search space set and the second search space set of the scheduling component carrier which are allocated for cross-carrier scheduling of the scheduled component carrier; transmitting, to the UE and within at least one decoding candidate of the set of decoding candidates, at least one control message via the scheduling component carrier that schedules a communication between the base station and the UE via the scheduled component carrier; and transmitting or receiving the communication with the UE via the scheduled component carrier based at least in part on the at least one control message.

Aspect 24: The method of aspect 23, wherein identifying the search space set linking configuration comprises: transmitting, to the UE, additional control signaling indicating the search space set linking configuration.

Aspect 25: The method of any of aspects 23 through 24, wherein identifying the search space set linking configuration comprises: identifying that at least two search space sets of the plurality of search space sets of the scheduled component carrier are linked for control channel repetition based at least in part on the scheduling configuration indicating that the first search space set and the second search space set of the scheduling component carrier are linked for control channel repetition.

Aspect 26: The method of any of aspects 23 through 25, wherein identifying the search space set linking configuration comprises: identifying that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

Aspect 27: The method of any of aspects 23 through 26, wherein identifying the search space set linking configuration comprises: identifying that at least two search space sets of the plurality of search space sets of the scheduled component carrier are linked for control channel repetition based at least in part on the at least two search space sets being configured with a same quantity of decoding candidates per aggregation level.

Aspect 28: The method of any of aspects 23 through 27, wherein identifying the search space set linking configuration comprises: identifying that at least two search space sets of the plurality of search space sets of the scheduled component carrier are linked for control channel repetition based at least in part on each pair of decoding candidates across the first and second search space sets for two measurement monitoring occasions being linked for control channel repetition, each pair of the decoding candidates being linked for control channel repetition corresponding to a same CIF, a same candidate index, and a same aggregation level.

Aspect 29: The method of aspect 28, further comprising: identifying that a third set of monitoring occasions within the first search space set of the scheduling component carrier and a fourth set of monitoring occasions within the second search space set of the scheduling component carrier are unlinked for control channel repetition for intra-carrier scheduling.

Aspect 30: The method of any of aspects 23 through 29, wherein identifying the search space set linking configuration comprises: identifying that at least two search space sets of the plurality of search space sets of the scheduled component carrier are unlinked for control channel repetition.

Aspect 31: The method of aspect 30, further comprising: identifying, based at least in part on the search space set linking configuration, that a first decoding candidate of the first search space set is unlinked for control channel repetition to a second decoding candidate of the second search space set for cross-carrier scheduling on the scheduled component carrier.

Aspect 32: The method of aspect 31, further comprising: identifying, based at least in part on the search space set linking configuration, that a third decoding candidate of the first search space set is linked for control channel repetition to a fourth decoding candidate of the second search space set for intra-carrier scheduling on the scheduling component carrier.

Aspect 33: The method of any of aspects 23 through 32, further comprising: transmitting the control signaling that indicates a first set of one or more monitoring occasions for the first search space set and a second set of one or more monitoring occasions for the second search space set.

Aspect 34: The method of any of aspects 23 through 33, wherein transmitting the control signaling identifying the scheduling configuration comprises: transmitting the control signaling indicating a first search space set index associated with the first search space set of the scheduling component carrier and a second search space set index associated with the second search space set of the scheduling component carrier.

Aspect 35: The method of aspect 34, wherein a third search space set and a fourth search space set of the plurality of search space sets of the scheduled component carrier are associated with the first search space set index and the second search space set index, respectively, and the search space set linking configuration indicates that the third search space set and the fourth search space set are linked or unlinked for control channel repetition based at least in part on the first search space set and the second search space set being linked for control channel repetition.

Aspect 36: The method of any of aspects 23 through 35, wherein transmitting the control signaling identifying the scheduling configuration comprises: transmitting the control signaling indicating that at least two search space sets of the plurality of search space sets of the scheduled component carrier are configured within a first BWP of the scheduled component carrier and that the first search space set and the second search space set of the scheduling component carrier are configured within a second BWP of the scheduling component carrier.

Aspect 37: The method of any of aspects 23 through 36, further comprising: transmitting additional control signaling indicating that a first BWP associated with the first search space set and the second search space set of the scheduling component carrier is active and that a second BWP associated with the plurality of search space sets of the scheduled component carrier is active, wherein transmitting the at least one control message is based at least in part on the first BWP and the second BWP being active.

Aspect 38: The method of any of aspects 23 through 37, wherein a first decoding candidate of the first search space set and a second decoding candidate of the second search space set are associated with a first CIF value that corresponds to the scheduling component carrier, and wherein a third decoding candidate of the first search space set and a fourth decoding candidate of the second search space set are associated with a second CIF value different from the first CIF value that corresponds to the scheduled component carrier Aspect 39: The method of any of aspects 23 through 38, further comprising: transmitting, to the UE, additional control signaling indicating a plurality of component carriers including the scheduled component carrier which are configured for cross-carrier scheduling via control channel repetition; and identifying, based at least in part on the indication of the plurality of component carriers, that a first decoding candidate of the first search space set is linked for control channel repetition to a second decoding candidate of the second search space set for cross-carrier scheduling on the scheduled component carrier.

Aspect 40: The method of any of aspects 23 through 39, further comprising: transmitting, to the UE, additional control signaling indicating a plurality of component carriers including the scheduled component carrier which are configured for cross-carrier scheduling via control channel repetition on the scheduling component carrier; and identifying, based at least in part on the indication of the plurality of component carriers, that a first decoding candidate of the first search space set is linked for control channel repetition to a second decoding candidate of the second search space set for cross-carrier scheduling on the scheduled component carrier.

Aspect 41: The method of any of aspects 23 through 40, wherein the plurality of search space sets of the scheduled component carrier comprise a third search space set and a fourth search space set, wherein the first search space set of the scheduling component carrier and the third search space set of the scheduled component carrier are associated with a first search space set index, and wherein the second search space set of the scheduling component carrier and the fourth search space set of the scheduled component carrier are associated with a second search space set index different from the first search space set index Aspect 42: An apparatus for wireless communication at a UE, comprising a processor; memory coupled with the processor; and instructions stored in the memory and executable by the processor to cause the apparatus to perform a method of any of aspects 1 through 22.

Aspect 43: An apparatus for wireless communication at a UE, comprising at least one means for performing a method of any of aspects 1 through 22.

Aspect 44: A non-transitory computer-readable medium storing code for wireless communication at a UE, the code comprising instructions executable by a processor to perform a method of any of aspects 1 through 22.

Aspect 45: An apparatus for wireless communication at a base station, comprising a processor; memory coupled with the processor; and instructions stored in the memory and executable by the processor to cause the apparatus to perform a method of any of aspects 23 through 41.

Aspect 46: An apparatus for wireless communication at a base station, comprising at least one means for performing a method of any of aspects 23 through 41.

Aspect 47: A non-transitory computer-readable medium storing code for wireless communication at a base station, the code comprising instructions executable by a processor to perform a method of any of aspects 23 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from a base station, control signaling identifying a scheduling configuration indicating a first search space set and a second search space set of a scheduling component carrier for scheduling communications on a scheduled component carrier that is different from the scheduling component carrier;
      identify a search space set linking configuration for a plurality of search space sets of the scheduled component carrier based at least in part on the scheduling configuration;
      identify, based at least in part on the search space set linking configuration, a set of decoding candidates within the first search space set and the second search space set of the scheduling component carrier which are allocated for cross-carrier scheduling of the scheduled component carrier;
      receive, from the base station and within at least one decoding candidate of the set of decoding candidates, at least one control message via the scheduling component carrier that schedules a communication between the base station and the UE via the scheduled component carrier; and
      transmit or receive the communication with the base station via the scheduled component carrier based at least in part on the at least one control message.

2. The apparatus of claim 1, wherein the instructions to identify the search space set linking configuration are executable by the processor to cause the apparatus to:
   identify that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

3. The apparatus of claim 1, wherein the instructions to identify the search space set linking configuration are executable by the processor to cause the apparatus to:
   identify that at least two search space sets of the plurality of search space sets of the scheduled component carrier are linked for control channel repetition based at least in part on the at least two search space sets being configured with a same quantity of decoding candidates per aggregation level.

4. The apparatus of claim 1, wherein the instructions to identify the search space set linking configuration are executable by the processor to cause the apparatus to:
   identify that at least two search space sets of the plurality of search space sets of the scheduled component carrier are linked for control channel repetition; and
   identify that the at least two search space sets are configured with a same quantity of decoding candidates per aggregation level based at least in part on the at least two search space sets being linked for control channel repetition.

5. The apparatus of claim 1, wherein the at least one decoding candidate of the set of decoding candidates comprises a pair of decoding candidates, and the instructions are further executable by the processor to cause the apparatus to:
identify that the pair of decoding candidates are linked for control channel repetition based at least in part on the pair of the decoding candidates corresponding to a same carrier indicator field, a same candidate index, and a same aggregation level.

6. The apparatus of claim 1, wherein the instructions to receive the control signaling identifying the scheduling configuration are executable by the processor to cause the apparatus to:
receive the control signaling indicating a first search space set index associated with the first search space set of the scheduling component carrier and a second search space set index associated with the second search space set of the scheduling component carrier.

7. The apparatus of claim 6, wherein a third search space set and a fourth search space set of the plurality of search space sets of the scheduled component carrier are associated with the first search space set index and the second search space set index, respectively, and wherein the search space set linking configuration indicates that the third search space set and the fourth search space set are linked or unlinked for control channel repetition based at least in part on the first search space set and the second search space set being linked for control channel repetition.

8. The apparatus of claim 1, wherein the instructions to identify the search space set linking configuration are executable by the processor to cause the apparatus to:
receive, from the base station, additional control signaling indicating the search space set linking configuration.

9. The apparatus of claim 1, wherein the instructions to identify the search space set linking configuration are executable by the processor to cause the apparatus to:
identify that at least two search space sets of the plurality of search space sets of the scheduled component carrier are linked for control channel repetition based at least in part on the scheduling configuration indicating that the first search space set and the second search space set of the scheduling component carrier are linked for control channel repetition.

10. The apparatus of claim 9, wherein the instructions are further executable by the processor to cause the apparatus to:
monitor a first decoding candidate within the first search space set for a repetition of the control message and a second decoding candidate, that is linked to the first decoding candidate, within the second search space set for a repetition of the control message based at least in part on the at least two search space sets being linked for control channel repetition.

11. The apparatus of claim 9, wherein the instructions are further executable by the processor to cause the apparatus to:
identify that a third set of monitoring occasions within the first search space set of the scheduling component carrier and a fourth set of monitoring occasions within the second search space set of the scheduling component carrier are unlinked for control channel repetition for intra-carrier scheduling.

12. The apparatus of claim 1, wherein the instructions to identify the search space set linking configuration are executable by the processor to cause the apparatus to:
identify that at least two search space sets of the plurality of search space sets of the scheduled component carrier are unlinked for control channel repetition.

13. The apparatus of claim 12, wherein the instructions are further executable by the processor to cause the apparatus to:
monitor a first decoding candidate of the first search space set for the control message and a second decoding candidate of the second search space set for a second control message that differs from the control message based at least in part on identifying that the at least two search space sets of the plurality of search space sets of the scheduled component carrier are unlinked for control channel repetition.

14. The apparatus of claim 12, wherein the instructions are further executable by the processor to cause the apparatus to:
identify, based at least in part on the search space set linking configuration, that a first decoding candidate of the first search space set is unlinked for control channel repetition to a second decoding candidate of the second search space set for cross-carrier scheduling on the scheduled component carrier.

15. The apparatus of claim 14, wherein the instructions are further executable by the processor to cause the apparatus to:
identify, based at least in part on the search space set linking configuration, that a third decoding candidate of the first search space set is linked for control channel repetition to a fourth decoding candidate of the second search space set for intra-carrier scheduling on the scheduling component carrier.

16. The apparatus of claim 1, wherein the instructions are further executable by the processor to cause the apparatus to:
receive the control signaling that indicates a first set of one or more monitoring occasions for the first search space set and a second set of one or more monitoring occasions for the second search space set.

17. The apparatus of claim 1, wherein the instructions to receive the control signaling identifying the scheduling configuration are executable by the processor to cause the apparatus to:
receive the control signaling indicating that at least two search space sets of the plurality of search space sets of the scheduled component carrier are configured within a first bandwidth part of the scheduled component carrier and that the first search space set and the second search space set of the scheduling component carrier are configured within a second bandwidth part of the scheduling component carrier.

18. The apparatus of claim 1, wherein the instructions are further executable by the processor to cause the apparatus to:
receive additional control signaling indicating that a first bandwidth part associated with the first search space set and the second search space set of the scheduling component carrier is active and that a second bandwidth part associated with the plurality of search space sets of the scheduled component carrier is active; and
monitor a first decoding candidate of the first search space set and a second decoding candidate of the second search space set for one or more repetitions of the control message based at least in part on the first bandwidth part and the second bandwidth part being active.

19. The apparatus of claim 1, wherein the instructions are further executable by the processor to cause the apparatus to:
monitor a first decoding candidate of the first search space set for a second control message and a second decoding candidate of the second search space set for a repetition of the second control message based at least in part on the first search space set being linked for control channel repetition to the second search space set for intra-carrier scheduling on the scheduling component carrier, wherein the second control message schedules a second communication between the UE and the base station via the scheduling component carrier.

20. The apparatus of claim 1,
wherein a first decoding candidate of the first search space set and a second decoding candidate of the second search space set are associated with a first carrier indicator field value that corresponds to the scheduling component carrier, and
wherein a third decoding candidate of the first search space set and a fourth decoding candidate of the second search space set are associated with a second carrier indicator field value different from the first carrier indicator field value that corresponds to the scheduled component carrier.

21. The apparatus of claim 1, wherein the instructions are further executable by the processor to cause the apparatus to:
receive, from the base station, additional control signaling indicating a plurality of component carriers including the scheduled component carrier which are configured for cross-carrier scheduling via control channel repetition; and
identify, based at least in part on the indication of the plurality of component carriers, that a first decoding candidate of the first search space set is linked for control channel repetition to a second decoding candidate of the second search space set for cross-carrier scheduling on the scheduled component carrier.

22. The apparatus of claim 1, wherein the instructions are further executable by the processor to cause the apparatus to:
receive, from the base station, additional control signaling indicating a plurality of component carriers including the scheduled component carrier which are configured for cross-carrier scheduling via control channel repetition on the scheduling component carrier; and
identify, based at least in part on the indication of the plurality of component carriers, that a first decoding candidate of the first search space set is linked for control channel repetition to a second decoding candidate of the second search space set for cross-carrier scheduling on the scheduled component carrier.

23. The apparatus of claim 1,
wherein the plurality of search space sets of the scheduled component carrier comprise a third search space set and a fourth search space set,
wherein the first search space set of the scheduling component carrier and the third search space set of the scheduled component carrier are associated with a first search space set index, and
wherein the second search space set of the scheduling component carrier and the fourth search space set of the scheduled component carrier are associated with a second search space set index different from the first search space set index.

24. An apparatus for wireless communication at a base station, comprising:
a processor;
memory coupled with the processor; and
instructions stored in the memory and executable by the processor to cause the apparatus to:
transmit, to a user equipment (UE), control signaling identifying a scheduling configuration indicating a first search space set and a second search space set of a scheduling component carrier for scheduling communications on a scheduled component carrier that is different from the scheduling component carrier;
identify a search space set linking configuration for a plurality of search space sets of the scheduled component carrier based at least in part on the scheduling configuration;
identify, based at least in part on the search space set linking configuration, a set of decoding candidates within the first search space set and the second search space set of the scheduling component carrier which are allocated for cross-carrier scheduling of the scheduled component carrier;
transmit, to the UE and within at least one decoding candidate of the set of decoding candidates, at least one control message via the scheduling component carrier that schedules a communication between the base station and the UE via the scheduled component carrier; and
transmit or receive the communication with the UE via the scheduled component carrier based at least in part on the at least one control message.

25. The apparatus of claim 24, wherein the instructions to identify the search space set linking configuration are executable by the processor to cause the apparatus to:
identify that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

26. The apparatus of claim 24, wherein the instructions to identify the search space set linking configuration are executable by the processor to cause the apparatus to:
identify that at least two search space sets of the plurality of search space sets of the scheduled component carrier are linked for control channel repetition based at least in part on the at least two search space sets being configured with a same quantity of decoding candidates per aggregation level.

27. The apparatus of claim 24, wherein the instructions to identify the search space set linking configuration are executable by the processor to cause the apparatus to:
identify that at least two search space sets of the plurality of search space sets of the scheduled component carrier are linked for control channel repetition; and
identify that the at least two search space sets are configured with a same quantity of decoding candidates per aggregation level based at least in part on the at least two search space sets being linked for control channel repetition.

28. The apparatus of claim 24, wherein the instructions to identify the search space set linking configuration are executable by the processor to cause the apparatus to:
identify that at least two search space sets of the plurality of search space sets of the scheduled component carrier are linked for control channel repetition based at least in part on each pair of decoding candidates across the first and second search space sets for two monitoring occasions being linked for control channel repetition, each pair of the decoding candidates being linked for control channel repetition corresponding to a same carrier indicator field, a same candidate index, and a same aggregation level.

29. The apparatus of claim 24, wherein the instructions to transmit the control signaling identifying the scheduling configuration are executable by the processor to cause the apparatus to:
transmit the control signaling indicating a first search space set index associated with the first search space set of the scheduling component carrier and a second search space set index associated with the second search space set of the scheduling component carrier.

30. The apparatus of claim 29, wherein a third search space set and a fourth search space set of the plurality of search space sets of the scheduled component carrier are associated with the first search space set index and the second search space set index, respectively, and wherein the search space set linking configuration indicates that the third search space set and the fourth search space set are linked or unlinked for control channel repetition based at least in part on the first search space set and the second search space set being linked for control channel repetition.

31. The apparatus of claim 24, wherein the instructions to identify the search space set linking configuration are executable by the processor to cause the apparatus to:
transmit, to the UE, additional control signaling indicating the search space set linking configuration.

32. The apparatus of claim 24, wherein the instructions to identify the search space set linking configuration are executable by the processor to cause the apparatus to:
identify that at least two search space sets of the plurality of search space sets of the scheduled component carrier are linked for control channel repetition based at least in part on the scheduling configuration indicating that the first search space set and the second search space set of the scheduling component carrier are linked for control channel repetition.

33. The apparatus of claim 24, wherein the instructions are further executable by the processor to cause the apparatus to:
identify that a third set of monitoring occasions within the first search space set of the scheduling component carrier and a fourth set of monitoring occasions within the second search space set of the scheduling component carrier are unlinked for control channel repetition for intra-carrier scheduling.

34. The apparatus of claim 24, wherein the instructions to identify the search space set linking configuration are executable by the processor to cause the apparatus to:
identify that at least two search space sets of the plurality of search space sets of the scheduled component carrier are unlinked for control channel repetition.

35. The apparatus of claim 34, wherein the instructions are further executable by the processor to cause the apparatus to:
identify, based at least in part on the search space set linking configuration, that a first decoding candidate of the first search space set is unlinked for control channel repetition to a second decoding candidate of the second search space set for cross-carrier scheduling on the scheduled component carrier.

36. The apparatus of claim 35, wherein the instructions are further executable by the processor to cause the apparatus to:
identify, based at least in part on the search space set linking configuration, that a third decoding candidate of the first search space set is linked for control channel repetition to a fourth decoding candidate of the second search space set for intra-carrier scheduling on the scheduling component carrier.

37. The apparatus of claim 24, wherein the instructions are further executable by the processor to cause the apparatus to:
transmit the control signaling that indicates a first set of one or more monitoring occasions for the first search space set and a second set of one or more monitoring occasions for the second search space set.

38. The apparatus of claim 24, wherein the instructions to transmit the control signaling identifying the scheduling configuration are executable by the processor to cause the apparatus to:
transmit the control signaling indicating that at least two search space sets of the plurality of search space sets of the scheduled component carrier are configured within a first bandwidth part of the scheduled component carrier and that the first search space set and the second search space set of the scheduling component carrier are configured within a second bandwidth part of the scheduling component carrier.

39. The apparatus of claim 24, wherein the instructions are further executable by the processor to cause the apparatus to:
transmit additional control signaling indicating that a first bandwidth part associated with the first search space set and the second search space set of the scheduling component carrier is active and that a second bandwidth part associated with the plurality of search space sets of the scheduled component carrier is active, wherein transmitting the at least one control message is based at least in part on the first bandwidth part and the second bandwidth part being active.

40. The apparatus of claim 24,
wherein a first decoding candidate of the first search space set and a second decoding candidate of the second search space set are associated with a first carrier indicator field value that corresponds to the scheduling component carrier, and
wherein a third decoding candidate of the first search space set and a fourth decoding candidate of the second search space set are associated with a second carrier indicator field value different from the first carrier indicator field value that corresponds to the scheduled component carrier.

41. The apparatus of claim 24, wherein the instructions are further executable by the processor to cause the apparatus to:
transmit, to the UE, additional control signaling indicating a plurality of component carriers including the scheduled component carrier which are configured for cross-carrier scheduling via control channel repetition; and
identify, based at least in part on the indication of the plurality of component carriers, that a first decoding candidate of the first search space set is linked for control channel repetition to a second decoding candidate of the second search space set for cross-carrier scheduling on the scheduled component carrier.

42. The apparatus of claim 24, wherein the instructions are further executable by the processor to cause the apparatus to:
transmit, to the UE, additional control signaling indicating a plurality of component carriers including the scheduled component carrier which are configured for cross-carrier scheduling via control channel repetition on the scheduling component carrier; and
identify, based at least in part on the indication of the plurality of component carriers, that a first decoding candidate of the first search space set is linked for control channel repetition to a second decoding candidate of the second search space set for cross-carrier scheduling on the scheduled component carrier.

43. The apparatus of claim 24,
wherein the plurality of search space sets of the scheduled component carrier comprise a third search space set and a fourth search space set,
wherein the first search space set of the scheduling component carrier and the third search space set of the scheduled component carrier are associated with a first search space set index, and
wherein the second search space set of the scheduling component carrier and the fourth search space set of the scheduled component carrier are associated with a second search space set index different from the first search space set index.

44. A method for wireless communication at a user equipment (UE), comprising:
receiving, from a base station, control signaling identifying a scheduling configuration indicating a first search space set and a second search space set of a scheduling component carrier for scheduling communications on a scheduled component carrier that is different from the scheduling component carrier;
identifying a search space set linking configuration for a plurality of search space sets of the scheduled component carrier based at least in part on the scheduling configuration;
identifying, based at least in part on the search space set linking configuration, a set of decoding candidates within the first search space set and the second search space set of the scheduling component carrier which are allocated for cross-carrier scheduling of the scheduled component carrier;
receiving, from the base station and within at least one decoding candidate of the set of decoding candidates, at least one control message via the scheduling component carrier that schedules a communication between the base station and the UE via the scheduled component carrier; and
transmitting or receiving the communication with the base station via the scheduled component carrier based at least in part on the at least one control message.

45. The method of claim 44, wherein identifying the search space set linking configuration comprises:
identifying that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

46. The method of claim 44, wherein identifying the search space set linking configuration comprises:
identifying that at least two search space sets of the plurality of search space sets of the scheduled component carrier are linked for control channel repetition based at least in part on the at least two search space sets being configured with a same quantity of decoding candidates per aggregation level.

47. The method of claim 44, wherein identifying the search space set linking configuration comprises:
identifying that at least two search space sets of the plurality of search space sets of the scheduled component carrier are linked for control channel repetition; and
identifying that the at least two search space sets are configured with a same quantity of decoding candidates per aggregation level based at least in part on the at least two search space sets being linked for control channel repetition.

48. The method of claim 44, wherein the at least one decoding candidate of the set of decoding candidates comprises a pair of decoding candidates, the method further comprising:
identifying that the pair of decoding candidates are linked for control channel repetition based at least in part on the pair of the decoding candidates corresponding to a same carrier indicator field, a same candidate index, and a same aggregation level.

49. The method of claim 44, wherein receiving the control signaling identifying the scheduling configuration comprises:
receiving the control signaling indicating a first search space set index associated with the first search space set of the scheduling component carrier and a second search space set index associated with the second search space set of the scheduling component carrier.

50. The method of claim 49, wherein a third search space set and a fourth search space set of the plurality of search space sets of the scheduled component carrier are associated with the first search space set index and the second search space set index, respectively, and wherein the search space set linking configuration indicates that the third search space set and the fourth search space set are linked or unlinked for control channel repetition based at least in part on the first search space set and the second search space set being linked for control channel repetition.

51. The method of claim 44, wherein identifying the search space set linking configuration comprises:
receiving, from the base station, additional control signaling indicating the search space set linking configuration.

52. The method of claim 44, wherein identifying the search space set linking configuration comprises:
identifying that at least two search space sets of the plurality of search space sets of the scheduled component carrier are linked for control channel repetition based at least in part on the scheduling configuration indicating that the first search space set and the second search space set of the scheduling component carrier are linked for control channel repetition.

53. The method of claim 52, further comprising:
monitoring a first decoding candidate within the first search space set for a repetition of the control message and a second decoding candidate, that is linked to the first decoding candidate, within the second search space set for a repetition of the control message based at least in part on the at least two search space sets being linked for control channel repetition.

54. The method of claim 44, further comprising:
identifying that a third set of monitoring occasions within the first search space set of the scheduling component carrier and a fourth set of monitoring occasions within the second search space set of the scheduling component carrier are unlinked for control channel repetition for intra-carrier scheduling.

55. The method of claim 44, wherein identifying the search space set linking configuration comprises:

identifying that at least two search space sets of the plurality of search space sets of the scheduled component carrier are unlinked for control channel repetition.

56. The method of claim 55, further comprising:
monitoring a first decoding candidate of the first search space set for the control message and a second decoding candidate of the second search space set for a second control message that differs from the control message based at least in part on identifying that the at least two search space sets of the plurality of search space sets of the scheduled component carrier are unlinked for control channel repetition.

57. The method of claim 55, further comprising:
identifying, based at least in part on the search space set linking configuration, that a first decoding candidate of the first search space set is unlinked for control channel repetition to a second decoding candidate of the second search space set for cross-carrier scheduling on the scheduled component carrier.

58. The method of claim 57, further comprising:
identifying, based at least in part on the search space set linking configuration, that a third decoding candidate of the first search space set is linked for control channel repetition to a fourth decoding candidate of the second search space set for intra-carrier scheduling on the scheduling component carrier.

59. The method of claim 44, further comprising:
receiving the control signaling that indicates a first set of one or more monitoring occasions for the first search space set and a second set of one or more monitoring occasions for the second search space set.

60. The method of claim 44, wherein receiving the control signaling identifying the scheduling configuration comprises:
receiving the control signaling indicating that at least two search space sets of the plurality of search space sets of the scheduled component carrier are configured within a first bandwidth part of the scheduled component carrier and that the first search space set and the second search space set of the scheduling component carrier are configured within a second bandwidth part of the scheduling component carrier.

61. The method of claim 44, further comprising:
receiving additional control signaling indicating that a first bandwidth part associated with the first search space set and the second search space set of the scheduling component carrier is active and that a second bandwidth part associated with the plurality of search space sets of the scheduled component carrier is active; and
monitoring a first decoding candidate of the first search space set and a second decoding candidate of the second search space set for one or more repetitions of the control message based at least in part on the first bandwidth part and the second bandwidth part being active.

62. The method of claim 44, further comprising:
monitoring a first decoding candidate of the first search space set for a second control message and a second decoding candidate of the second search space set for a repetition of the second control message based at least in part on the first search space set being linked for control channel repetition to the second search space set for intra-carrier scheduling on the scheduling component carrier, wherein the second control message schedules a second communication between the UE and the base station via the scheduling component carrier.

63. The method of claim 44,
wherein a first decoding candidate of the first search space set and a second decoding candidate of the second search space set are associated with a first carrier indicator field value that corresponds to the scheduling component carrier, and
wherein a third decoding candidate of the first search space set and a fourth decoding candidate of the second search space set are associated with a second carrier indicator field value different from the first carrier indicator field value that corresponds to the scheduled component carrier.

64. The method of claim 44, further comprising:
receiving, from the base station, additional control signaling indicating a plurality of component carriers including the scheduled component carrier which are configured for cross-carrier scheduling via control channel repetition; and
identifying, based at least in part on the indication of the plurality of component carriers, that a first decoding candidate of the first search space set is linked for control channel repetition to a second decoding candidate of the second search space set for cross-carrier scheduling on the scheduled component carrier.

65. The method of claim 44, further comprising:
receiving, from the base station, additional control signaling indicating a plurality of component carriers including the scheduled component carrier which are configured for cross-carrier scheduling via control channel repetition on the scheduling component carrier; and
identifying, based at least in part on the indication of the plurality of component carriers, that a first decoding candidate of the first search space set is linked for control channel repetition to a second decoding candidate of the second search space set for cross-carrier scheduling on the scheduled component carrier.

66. The method of claim 44,
wherein the plurality of search space sets of the scheduled component carrier comprise a third search space set and a fourth search space set,
wherein the first search space set of the scheduling component carrier and the third search space set of the scheduled component carrier are associated with a first search space set index, and
wherein the second search space set of the scheduling component carrier and the fourth search space set of the scheduled component carrier are associated with a second search space set index different from the first search space set index.

67. A method for wireless communication at a base station, comprising:
transmitting, to a user equipment (UE), control signaling identifying a scheduling configuration indicating a first search space set and a second search space set of a scheduling component carrier for scheduling communications on a scheduled component carrier that is different from the scheduling component carrier;
identifying a search space set linking configuration for a plurality of search space sets of the scheduled component carrier based at least in part on the scheduling configuration;
identifying, based at least in part on the search space set linking configuration, a set of decoding candidates within the first search space set and the second search space set of the scheduling component carrier which are allocated for cross-carrier scheduling of the scheduled component carrier;

transmitting, to the UE and within at least one decoding candidate of the set of decoding candidates, at least one control message via the scheduling component carrier that schedules a communication between the base station and the UE via the scheduled component carrier; and transmitting or receiving the communication with the UE via the scheduled component carrier based at least in part on the at least one control message.

68. The method of claim 67, wherein identifying the search space set linking configuration comprises:
identifying that at least two search space sets of the plurality of search space sets of the scheduled component carrier are linked for control channel repetition based at least in part on the at least two search space sets being associated with first and second search space set indexes that are respectively the same as first and second search space set indexes of the first and second search space sets of the scheduling component carrier.

69. The method of claim 67, wherein identifying the search space set linking configuration comprises:
identifying that at least two search space sets of the plurality of search space sets of the scheduled component carrier are linked for control channel repetition based at least in part on the at least two search space sets being configured with a same quantity of decoding candidates per aggregation level.

70. The method of claim 67, wherein the instructions to identify the search space set linking configuration are executable by the processor to cause the apparatus to:
identify that at least two search space sets of the plurality of search space sets of the scheduled component carrier are linked for control channel repetition; and
identify that the at least two search space sets are configured with a same quantity of decoding candidates per aggregation level based at least in part on the at least two search space sets being linked for control channel repetition.

71. The method of claim 67, wherein identifying the search space set linking configuration comprises:
identifying that at least two search space sets of the plurality of search space sets of the scheduled component carrier are linked for control channel repetition based at least in part on each pair of decoding candidates across the first and second search space sets for two monitoring occasions being linked for control channel repetition, each pair of the decoding candidates being linked for control channel repetition corresponding to a same carrier indicator field, a same candidate index, and a same aggregation level.

72. The method of claim 67, wherein transmitting the control signaling identifying the scheduling configuration comprises:
transmitting the control signaling indicating a first search space set index associated with the first search space set of the scheduling component carrier and a second search space set index associated with the second search space set of the scheduling component carrier.

73. The method of claim 72, wherein a third search space set and a fourth search space set of the plurality of search space sets of the scheduled component carrier are associated with the first search space set index and the second search space set index, respectively, and wherein the search space set linking configuration indicates that the third search space set and the fourth search space set are linked or unlinked for control channel repetition based at least in part on the first search space set and the second search space set being linked for control channel repetition.

74. The method of claim 67, wherein identifying the search space set linking configuration comprises:
transmitting, to the UE, additional control signaling indicating the search space set linking configuration.

75. The method of claim 67, wherein identifying the search space set linking configuration comprises:
identifying that at least two search space sets of the plurality of search space sets of the scheduled component carrier are linked for control channel repetition based at least in part on the scheduling configuration indicating that the first search space set and the second search space set of the scheduling component carrier are linked for control channel repetition.

76. The method of claim 67, further comprising:
identifying that a third set of monitoring occasions within the first search space set of the scheduling component carrier and a fourth set of monitoring occasions within the second search space set of the scheduling component carrier are unlinked for control channel repetition for intra-carrier scheduling.

77. The method of claim 67, wherein identifying the search space set linking configuration comprises:
identifying that at least two search space sets of the plurality of search space sets of the scheduled component carrier are unlinked for control channel repetition.

78. The method of claim 77, further comprising:
identifying, based at least in part on the search space set linking configuration, that a first decoding candidate of the first search space set is unlinked for control channel repetition to a second decoding candidate of the second search space set for cross-carrier scheduling on the scheduled component carrier.

79. The method of claim 78, further comprising:
identifying, based at least in part on the search space set linking configuration, that a third decoding candidate of the first search space set is linked for control channel repetition to a fourth decoding candidate of the second search space set for intra-carrier scheduling on the scheduling component carrier.

80. The method of claim 67, further comprising:
transmitting the control signaling that indicates a first set of one or more monitoring occasions for the first search space set and a second set of one or more monitoring occasions for the second search space set.

81. The method of claim 67, wherein transmitting the control signaling identifying the scheduling configuration comprises:
transmitting the control signaling indicating that at least two search space sets of the plurality of search space sets of the scheduled component carrier are configured within a first bandwidth part of the scheduled component carrier and that the first search space set and the second search space set of the scheduling component carrier are configured within a second bandwidth part of the scheduling component carrier.

82. The method of claim 67, further comprising:
transmitting additional control signaling indicating that a first bandwidth part associated with the first search space set and the second search space set of the scheduling component carrier is active and that a second bandwidth part associated with the plurality of search space sets of the scheduled component carrier is active, wherein transmitting the at least one control message is based at least in part on the first bandwidth part and the second bandwidth part being active.

83. The method of claim 67,
wherein a first decoding candidate of the first search space set and a second decoding candidate of the second search space set are associated with a first carrier indicator field value that corresponds to the scheduling component carrier, and
wherein a third decoding candidate of the first search space set and a fourth decoding candidate of the second search space set are associated with a second carrier indicator field value different from the first carrier indicator field value that corresponds to the scheduled component carrier.

84. The method of claim 67, further comprising:
transmitting, to the UE, additional control signaling indicating a plurality of component carriers including the scheduled component carrier which are configured for cross-carrier scheduling via control channel repetition; and
identifying, based at least in part on the indication of the plurality of component carriers, that a first decoding candidate of the first search space set is linked for control channel repetition to a second decoding candidate of the second search space set for cross-carrier scheduling on the scheduled component carrier.

85. The method of claim 67, further comprising:
transmitting, to the UE, additional control signaling indicating a plurality of component carriers including the scheduled component carrier which are configured for cross-carrier scheduling via control channel repetition on the scheduling component carrier; and
identifying, based at least in part on the indication of the plurality of component carriers, that a first decoding candidate of the first search space set is linked for control channel repetition to a second decoding candidate of the second search space set for cross-carrier scheduling on the scheduled component carrier.

86. The method of claim 67,
wherein the plurality of search space sets of the scheduled component carrier comprise a third search space set and a fourth search space set,
wherein the first search space set of the scheduling component carrier and the third search space set of the scheduled component carrier are associated with a first search space set index, and
wherein the second search space set of the scheduling component carrier and the fourth search space set of the scheduled component carrier are associated with a second search space set index different from the first search space set index.

* * * * *